(12) United States Patent
Morishima et al.

(10) Patent No.: US 8,623,476 B2
(45) Date of Patent: Jan. 7, 2014

(54) POLARIZING ELEMENT AND METHOD OF PRODUCING THE SAME

(75) Inventors: Shinichi Morishima, Minami-ashigara (JP); Eri Utagawa, Minami-ashigara (JP)

(73) Assignee: FUJIFILM Corporation, Minato-Ku, Tokyo (JP)

(*) Notice: Subject to any disclaimer, the term of this patent is extended or adjusted under 35 U.S.C. 154(b) by 780 days.

(21) Appl. No.: 12/625,830

(22) Filed: Nov. 25, 2009

(65) Prior Publication Data

US 2010/0134726 A1 Jun. 3, 2010

(30) Foreign Application Priority Data

Nov. 28, 2008 (JP) ................. 2008-304985

(51) Int. Cl.
- *G02B 5/30* (2006.01)
- *C09K 19/60* (2006.01)
- *C09K 19/22* (2006.01)
- *C09K 19/24* (2006.01)
- *C09K 19/38* (2006.01)

(52) U.S. Cl.
USPC .... 428/1.31; 428/1.1; 252/299.1; 252/299.68

(58) Field of Classification Search
USPC .................. 428/1.1, 1.31; 252/299.01, 299.1, 252/299.68; 534/738, 816
See application file for complete search history.

(56) References Cited

U.S. PATENT DOCUMENTS

| | | | |
|---|---|---|---|
| 2005/0142302 A1* | 6/2005 | Nakamura | 428/1.2 |
| 2007/0285603 A1 | 12/2007 | Nakayama et al. | |
| 2009/0274853 A1* | 11/2009 | Morishima | 428/1.31 |
| 2010/0182543 A1* | 7/2010 | Goto et al. | 349/74 |
| 2011/0177315 A1* | 7/2011 | Iwahashi et al. | 428/220 |

FOREIGN PATENT DOCUMENTS

| | | |
|---|---|---|
| CN | 1721941 A | 1/2006 |
| CN | 101087853 A | 12/2007 |
| CN | 101101411 A | 1/2008 |
| JP | 56-64301 A | 6/1981 |
| JP | 8-511109 A | 11/1996 |
| JP | 2002-180052 A | 6/2002 |
| JP | 2002-528758 A | 9/2002 |
| JP | 2002-338838 A | 11/2002 |
| JP | 2003232919 A * | 8/2003 |

OTHER PUBLICATIONS

English translation by computer for JP 2003-232919, http://www4.ipdl.inpit.go.jp/Tokujitu/PAJdetail.ipdl?N0000=60&N0120=01&N2001=2&N3001=2003-232919.*
John F. Dreyer, "Light Polarization From Films of Lyotropic Nematic Liquid Crystals", Journal De Physique, 1969, p. 114-116.
Office Action from the State Intellectual Property Office (SIPO) of the People's Republic of China dated Jan. 16, 2013, issued in corresponding Chinese Patent Application No. 200910246377.4, with English translation thereof.
Office Action issued in corresponding Chinese Patent Application No. 200910246377.4 dated Aug. 26, 2013 with an English translation.

* cited by examiner

*Primary Examiner* — Shean C Wu
(74) *Attorney, Agent, or Firm* — Buchanan Ingersoll & Rooney PC

(57) ABSTRACT

A polarizing element, containing: a transparent support; a light absorption anisotropic layer formed of a dichroic dye composition; and a transparent resin cured layer, with the layers being laminated in this order on the support, and with the composition containing at least one dichroic dye of formula (I) which has nematic mesomorphism but containing no liquid crystalline achromatic compound:

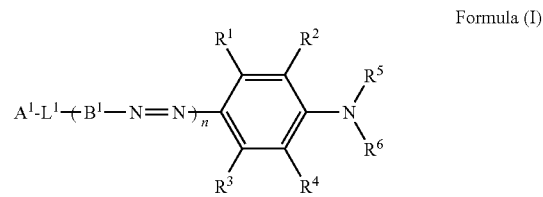

Formula (I)

wherein $R^1$ to $R^4$ are a hydrogen atom or a substituent; $R^5$ and $R^6$ are a hydrogen atom or an alkyl group; $L^1$ represents —N=N—, —CH=N—, —N=CH—, —C(=O)O—, —OC(=O)— or —CH=CH—; $A^1$ represents a phenyl, naphthyl or aromatic heterocyclic group; $B^1$ represents a divalent aromatic hydrocarbon or divalent aromatic heterocyclic group; and n is an integer from 1 to 5.

13 Claims, No Drawings

POLARIZING ELEMENT AND METHOD OF PRODUCING THE SAME

FIELD OF THE INVENTION

The present invention relates to a polarizing element containing a dichroic azo dye, and to a method of producing the same. Further, the present invention relates to a liquid crystal display device having the polarizing element.

BACKGROUND OF THE INVENTION

When a function such as an attenuation function, a polarization function, a scattering function and a light-shielding function is required to effect for an irradiated light including a laser light and a natural light employed, hitherto, an apparatus or device which operates based on a different principle was adapted depending on the function required. Accordingly, products corresponding to the functions were prepared respectively by production processes that were different depending on the respective functions.

For example, in LCD (liquid crystal display), linear polarizing plates or circular polarizing plates are used to control optical rotation or birefringence in display. Also in OLED (organic electroluminescence device), circular polarizing plates are used to prevent reflection of external outside light. Heretofore, for such polarizing plates (polarizing elements), iodine has been widely used as a dichroic substance. However, if iodine is used for a polarizing plate, its heat resistance or light fastness is insufficient since iodine is highly sublimable. Further, the extinction color becomes dark grayish blue, and an ideal achromatic color polarizing plate for the entire visible spectral region cannot necessarily be obtained.

Therefore, a polarizing element has been studied in which an organic dye is used as a dichroic substance which replaces iodine. However, such an organic dye has a problem such that only polarizing elements are obtainable which are distinctly inferior to those employing iodine for dichroic property. Particularly, a polarizing element is an important constituent in LCD employing, as the display principle, optical rotation or birefringence of light, and a new polarizing element has been developed for the purpose of improving display performance and the like in recent years.

As one method of forming such a polarizing element, a method is proposed in which, in the same manner as in the case of a polarizing film containing iodine, an organic dye having dichroism (dichroic dye) is dissolved or adsorbed in a polymer material such as a polyvinyl alcohol, and the thus-obtained film is stretched in one direction into a film so that the dichroic dye is oriented or aligned. However, this method had such a problem that a long time period and efforts are required for e.g. the stretching step.

Thus, other methods attract attention in recent years, and as such methods, Dreyer, J. F., Journal de Physique, 1969, 4, 114, "Light Polarization From Films of Lyotropic Nematic Liquid Crystals" discloses a method of aligning a dichroic dye on a substrate such as glass or a transparent film utilizing e.g. intermolecular interaction of organic dye molecules, to form a polarizing film (anisotropic dye film). However, it was known that there was a problem for heat resistance of the film obtained by the method by Dreyer.

Further, the alignment of a dichroic dye on a substrate such as glass or a transparent film utilizing e.g. intermolecular interaction of organic dye molecules, is attained by a wet system film-forming method. In the case where an anisotropic dye film is prepared by the wet system film-forming method, the dye molecules to be used for the dye film are required not only to show high degree of dichroism but also to be a dye suitable for the process for the wet system film-forming method. Examples of the process in the wet film-forming method include a process of causing sedimentation and alignment of the dye on a substrate, or a process of controlling the alignment. Thus, there are many cases that even the conventional dyes that can be employed for the polarizing elements passing through the above-mentioned stretching treatment are not suitable for the wet film-forming method. On the other hand, JP-A-2002-180052 ("JP-A" means unexamined published Japanese patent application), JP-A-2002-528758 and JP-A-2002-338838 propose materials suitable for the process of the wet system film-forming method. However, although such materials are suitable for the process, they have had such a drawback that they cannot show high dichroism.

Further, JP-T-8-511109 ("JP-T" means published searched patent publication) proposes a dye represented by chromogen $(SO_3M)_n$ as a material suitable for the process. In JP-T-8-511109, the achromatic color is given by combining several kinds of dichroic dyes each other. However, when an anisotropic dye film is obtained by combining the several kinds of dichroic dyes each other, a molecular alignment for mixing different molecules is disturbed and there was a problem that achieving a high dichroism is difficult.

Also, JP-A-56-64301 describes that a dichroic dye having a vinyl group is used as a dichroic dye, to produce a polarizing film high in fastness. However, a process such as stretching treatment is required in the method described in JP-A-56-64301, similar to the above.

SUMMARY OF THE INVENTION

The present invention resides in a polarizing element, which comprises: a transparent support; a light absorption anisotropic layer formed of a dichroic dye composition; and a transparent resin cured layer, with the light absorption anisotropic layer and the transparent resin cured layer being laminated in this order on the transparent support, and with the dichroic dye composition containing at least one dichroic dye, which is represented by formula (I) and which has nematic mesomorphism, but containing no liquid crystalline achromatic compound:

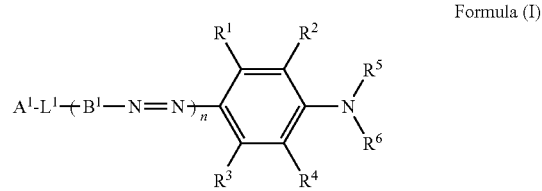

Formula (I)

wherein $R^1$, $R^2$, $R^3$, and $R^4$ each independently represent a hydrogen atom or a substituent; $R^5$ and $R^6$ each independently represent a hydrogen atom or an alkyl group which may have a substituent; $L^1$ represents —N=N—, —CH=N—, —N=CH—, —C(=O)O—, —OC(=O)— or —CH=CH—; $A^1$ represents a phenyl group, a naphthyl group or an aromatic heterocyclic group, each of which may have a substituent; $B^1$ represents a divalent aromatic hydrocarbon group or a divalent aromatic heterocyclic group, each of which may have a substituent; and n denotes an integer from 1 to 5, in which when n is 2 or more, plural $B^1$'s may be the same or different from each other.

Further, the present invention resides in a liquid crystal display device having the polarizing element.

Furthermore, the present invention resides in a method of producing the polarizing element, comprising the steps of: (1) rubbing or irradiating with light the transparent support or an alignment film formed on the support; (2) applying the dichroic dye composition dissolved in an organic solvent, to the transparent support or alignment film rubbed or irradiated with light; (3) vaporizing the organic solvent to align the dichroic dye composition, thereby forming said light absorption anisotropic layer; and (4) applying a curable transparent resin composition to the surface of the light absorption anisotropic layer or an oxygen-shielding layer, followed by curing.

Other and further features and advantages of the invention will appear more fully from the following description.

DETAILED DESCRIPTION OF THE INVENTION

According to the present invention, there is provided the following means:

<1> A polarizing element, comprising:
a transparent support;
a light absorption anisotropic layer formed of a dichroic dye composition; and
a transparent resin cured layer,
with the light absorption anisotropic layer and the transparent resin cured layer being laminated in this order on the transparent support, and
with the dichroic dye composition containing at least one dichroic dye, which is represented by formula (I) and which has nematic mesomorphism, but containing no liquid crystalline achromatic compound:

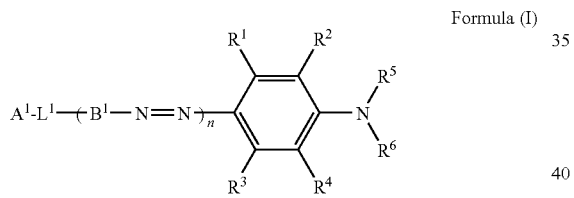

Formula (I)

wherein $R^1$, $R^2$, $R^3$, and $R^4$ each independently represent a hydrogen atom or a substituent; $R^5$ and $R^6$ each independently represent a hydrogen atom or an alkyl group which may have a substituent; $L^1$ represents —N=N—, —CH=N—, —N=CH—, —C(=O)O—, —OC(=O)— or —CH=CH—; $A^1$ represents a phenyl group, a naphthyl group or an aromatic heterocyclic group, each of which may have a substituent; $B^1$ represents a divalent aromatic hydrocarbon group or a divalent aromatic heterocyclic group, each of which may have a substituent; and n denotes an integer from 1 to 5, in which when n is 2 or more, plural $B^1$s may be the same or different from each other.

<2> The polarizing element described in the above item <1>, wherein the at least one dichroic dye which is represented by formula (I) and which has nematic mesomorphism is an azo dye represented by formula (Ia):

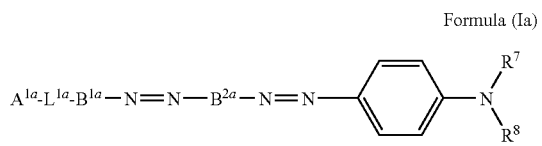

Formula (Ia)

wherein $R^7$ and $R^8$ each independently represent a hydrogen atom, a methyl group or an ethyl group; $L^{1a}$ represents —N=N—, —CH=N—, —N=CH—, —C(=O)O—, —OC(=O)— or —CH=CH—; $A^{1a}$ represents a group represented by formula (IIa) or (IIIa); $B^{1a}$ and $B^{2a}$ each independently represent a group represented by any one of formulae (IVa), (Va) and (VIa):

(IIa)

(IIIa)

wherein $R^9$ represents a substituted or unsubstituted alkyl group, a substituted or unsubstituted aryl group, a substituted or unsubstituted alkoxy group, a substituted or unsubstituted alkyl- or aryl-oxycarbonyl group, or a substituted or unsubstituted acyloxy group:

(IVa)

(Va)

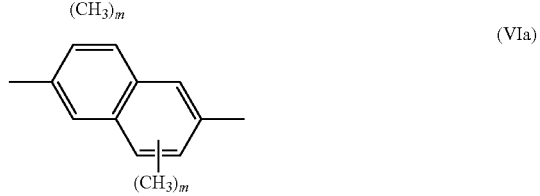
(VIa)

wherein m represents an integer of 0 to 2.

<3> The polarizing element described in the above item <1>, wherein the at least one dichroic dye which is represented by formula (I) and which has nematic mesomorphism is an azo dye represented by formula (Ib):

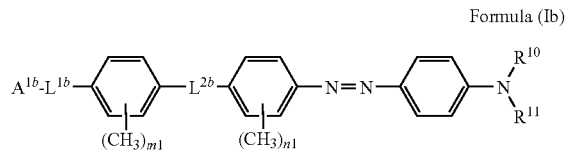

Formula (Ib)

wherein $R^{10}$ and $R^{11}$ each independently represent a hydrogen atom, a methyl group or an ethyl group; $L^{1b}$ represents —N=N— or —C(=O)O—; $L^{2b}$ represents —CH=N—, N=CH—, —C(=O)O— or —OC(=O)—; $A^{1b}$ represents a group represented by the above formula (IIa) or (IIIa); and m1 and n1 each independently represent an integer of 0 to 2.

<4> The polarizing element described in the above item <1>, wherein the at least one dichroic dye which is represented by formula (I) and which has nematic mesomorphism is an azo dye represented by formula (Ic):

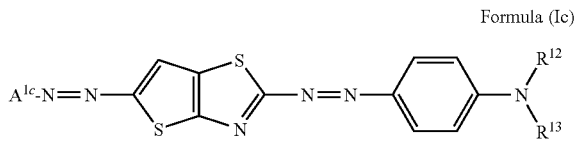

Formula (Ic)

wherein $R^{12}$ and $R^{13}$ each independently represent a hydrogen atom, a methyl group or an ethyl group; and $A^{1c}$ represents a group represented by the above formula (IIa) or (IIIa).
<5> The polarizing element described in any one of the above items <1> to <4>, wherein the transparent resin cured layer has a layer thickness of 1 µm to 30 µm.
<6> The polarizing element described in any one of the above items <1> to <5>, wherein the transparent resin cured layer has an optically negative refractive index anisotropy, and an in-plane retardation value (Re) of 10 nm or less and a retardation value (Rth) of 100 nm to 300 nm in the direction of the thickness for the visible light.
<7> The polarizing element described in the above item <6>, wherein the transparent resin cured layer is formed of a composition containing a disk-like liquid crystalline compound.
<8> The polarizing element described in any one of the above items <1> to <7>, comprising an oxygen-shielding layer formed of a composition containing a polyvinyl alcohol as its major component, between the light absorption anisotropic layer and the transparent resin cured layer.
<9> A liquid crystal display device, having the polarizing element described in any one of the above items <1> to <8>.
<10> A method of producing the polarizing element described in any one of the above items <1> to <8>, which comprises the steps of:
(1) rubbing or irradiating with light the transparent support or an alignment film formed on the support;
(2) applying the dichroic dye composition dissolved in an organic solvent, to the transparent support or alignment film rubbed or irradiated with light;
(3) vaporizing the organic solvent to align the dichroic dye composition, thereby forming said light absorption anisotropic layer; and
(4) applying a curable transparent resin composition to the surface of the light absorption anisotropic layer or an oxygen-shielding layer, followed by curing.
<11> The method of producing the polarizing element described in the above item <10>, further comprising the step of: (5) polymerizing polymerizable groups in the dichroic dye composition by means of light or heat, to fix the alignment.
<12> The method of producing the polarizing element described in the above item <10> or <11>, further comprising the step of: (6) applying a composition containing a polyvinyl alcohol as its major component, to the surface of the light absorption anisotropic layer, followed by drying, to form said oxygen-shielding layer.

The dichroic dye composition in the present invention contains at least one of the dichroic dyes which are represented by formula (I) and which have nematic mesomorphism, and contains no liquid crystalline achromatic compound. Thus, in the polarizing element of the present invention, the dye molecule aligns by its own alignment ability, and the resultant aligned state is fixed, which results in the function as a polarizing element. Therefore, the polarizing element of the present invention is distinguished from the so-called guest-host (GH) type polarizing element. The GH type polarizing element means, for example, one which utilizes a composition containing a liquid crystalline compound (a liquid crystalline achromatic compound) together with a dichroic dye, to align molecules of the dichroic dye along the alignment of molecules of the liquid crystalline compound, to thereby attain a predetermined dichroic ratio.

The explanations of the structural requirements described below are for an example (typical example) of an embodiment of the present invention, and the present invention is not limited by these explanations.

Herein, the term "from (a numerical value A) to (a numerical value B)" as used herein for expressing, for example, a physical value or a characteristic value means that the numerical values A and B are included in the intended range as the lower limit and the upper limit. The term "(meth)acryloyl" means "acryloyl or methacryloyl or the both". This is the same to "(meth)acrylate", "(meth)acrylic acid", "(meth)acrylamide" and the like expression.

Herein, the Re(λ) and the Rth(λ) indicate the in-plane retardation and the retardation in the direction of the thickness, respectively, at the wavelength λ (nm). The measuring wavelength λ nm may be any wavelength insofar as it is in the range of the visible light region and specifically in a range from 400 to 800 nm, and it is preferably in a range from 400 to 750 nm and more preferably in a range from 400 to 700 nm. Herein, unless otherwise specified, the Re and the Rth each mean a value measured at a wavelength range from 530 to 600 nm (or a value calculated based on the measured value). The in-plane retardation, Re(λ), can be measured by making light of wavelength λ nm incident in the direction of the normal of the film, in KOBRA 21ADH or WR (each trade name, manufactured by Oji Scientific Instruments). In the case where the film to be measured can be expressed by a uniaxial or biaxial refractive index ellipsoid (polarizability ellipsoid), the Rth(λ) thereof is calculated as follows.

Rth(λ) is calculated using KOBRA 21ADH or WR on the basis of: the above-described Re(λ); retardation values in total six directions measured by making light of wavelength λ nm incident in the normal direction and directions inclined to 50° at an interval of 10° over the normal direction of the film with the in-plane retardation axis (judged by the KOBRA 21ADH or WR) as an inclined axis (a rotation axis) (or with an arbitrary direction in the film plane as a rotation axis when there is no retardation axis); the estimated average refractive index; and, the input value of the film thickness.

In the above-described method, when the film has a retardation value of zero in a direction inclined to a certain degree over the normal direction with the in-plane retardation axis as a rotation axis, the retardation value in a direction inclined to a larger degree than the above-described direction is calculated by KOBRA 21ADH or WR, after the sign of the retardation value is converted to negative.

Alternatively, Rth may also be calculated by mathematical formulae (1) and (2), on the basis of: retardation values measured from arbitrary inclined two directions, with the retardation axis as an inclined axis (a rotation axis) (or with the in-plane arbitrary direction as a rotation axis when there is no retardation axis); the estimated average refractive index; and the input value of the film thickness (d).

Mathematical formula (1)

$$Re(\theta) = \left[nx - \frac{ny \times nz}{\sqrt{\left(ny\sin\left(\sin^{-1}\left(\frac{\sin(-\theta)}{nx}\right)\right)\right)^2 + \left(nz\cos\left(\sin^{-1}\left(\frac{\sin(-\theta)}{nx}\right)\right)\right)^2}}\right] \times \frac{d}{\cos\left(\sin^{-1}\left(\frac{\sin(-\theta)}{nx}\right)\right)}$$

The above Re(θ) represents a retardation value in the direction inclined by an angle θ from the normal direction. In the mathematical formula (1), nx represents a refractive index in the retardation axis direction in the plane, ny represents a refractive index in the direction orthogonal to nx in the plane, and nz represents a refractive index in the direction orthogonal to nx and ny.

$$Rth=((nx+ny)/2-nz) \times d \qquad \text{Mathematical formula (2)}$$

In the case where the film to be measured cannot be expressed by a uniaxial or biaxial index ellipsoid, i.e. a film having no so-called optic axis, the Rth(λ) thereof is calculated as follows.

Rth(λ) and Re(λ) are calculated using KOBRA 21ADH or WR, on the basis of: the above-described Re(λ); retardation values measured in eleven directions, by making light of wavelength λ nm incident in the directions inclined to −50° to +50° at an interval of 10° over the normal direction of the film with the in-plane retardation axis (judged by the KOBRA 21ADH or WR) as an inclined axis (a rotation axis); the estimated average refractive index; and the input value of the film thickness. From the thus-calculated nx, ny, and nz, Nz= (nx−nz)/(nx−ny) is further calculated. Herein, the measuring wavelength is 590 nm and the measurement is conducted at 25° C. under 60% RH, unless otherwise specified.

First, the structure of the polarizing element of the present invention will be explained.
(Dichroic Dye Composition)
[Azo Dye]

The light absorption anisotropic layer according to the present invention is characterized by the feature that it is one formed of a dichroic dye composition containing at least one dichroic dye which has nematic mesomorphism and is represented by the formula (I), and containing no liquid crystalline achromatic compound.

In the present invention, the term "dichroic dye" means a dye which is changed in its light absorption wavelength depending on the direction in which introduced light is incident to the molecule of said dye. Also, the term "dichroic ratio" is calculated as the ratio of the absorbance of polarizing light in the direction of the absorption axis with respect to the absorbance of polarizing light in the direction of the polarization axis, when the dichroic dye composition is used to form the light absorption anisotropic film.

Formula (I)

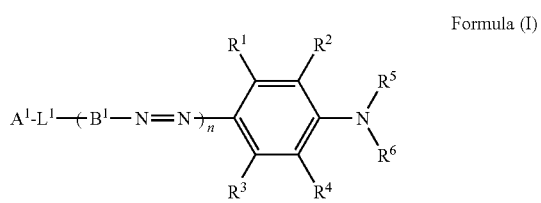

In formula (I), $R^1$ to $R^4$ each independently represent a hydrogen atom or a substituent; $R^5$ and $R^6$ each independently represent a hydrogen atom or an alkyl group which may have a substituent; $L^1$ represents —N=N—, —CH=N—, —N=CH—, —C(=O)O—, —OC(=O)— or —CH=CH—; $A^1$ represents a phenyl group which may have a substituent, a naphthyl group which may have a substituent or an aromatic heterocyclic group which may have a substituent; $B^1$ represents a divalent aromatic hydrocarbon group or a divalent aromatic heterocyclic group, each of which may have a substituent; and n denotes an integer from 1 to 5, in which when n is 2 or more, plural $B^1$s may be the same or different each other.

Examples of the substituents represented by $R^1$, $R^2$, $R^3$, and $R^4$ in formula (I) include an alkyl group (preferably an alkyl group having from 1 to 20, more preferably from 1 to 12, and particularly preferably from 1 to 8 carbon atoms, e.g., a methyl group, an ethyl group, an iso-propyl group, a tert-butyl group, an n-octyl group, an n-decyl group, an n-hexadecyl group, a cyclopropyl group, a cyclopentyl group, a cyclohexyl group), an alkenyl group (preferably an alkenyl group having from 2 to 20, more preferably from 2 to 12, and particularly preferably from 2 to 8 carbon atoms, e.g., a vinyl group, an allyl group, a 2-butenyl group, a 3-pentenyl group), an alkynyl group (preferably an alkynyl group having from 2 to 20, more preferably from 2 to 12, and particularly preferably from 2 to 8 carbon atoms, e.g., a propargyl group, a 3-pentynyl group), an aryl group (preferably an aryl group having from 6 to 30, more preferably from 6 to 20, and particularly preferably from 6 to 12 carbon atoms, e.g., a phenyl group, a 2,6-diethylphenyl group, a 3,5-di(trifluoromethyl)phenyl group, a naphthyl group, a biphenyl group), a substituted or unsubstituted amino group (preferably an amino group having from 0 to 20, more preferably from 0 to 10, and particularly preferably from 0 to 6 carbon atoms, e.g., an unsubstituted amino group, a methylamino group, a dimethylamino group, a diethylamino group, an anilino group), an alkoxy group (preferably an alkoxy group having from 1 to 20, more preferably from 1 to 10, and particularly preferably from 1 to 6 carbon atoms, e.g., a methoxy group, an ethoxy group, a butoxy group), an alkyl- or aryl-oxycarbonyl group (preferably an alkyl- or aryl-oxycarbonyl group having from 2 to 20, more preferably from 2 to 15, and particularly preferably from 2 to 10 carbon atoms, e.g., a methoxycarbonyl group, an ethoxycarbonyl group, a phenoxycarbonyl group), an acyloxy group (preferably an acyloxy group having from 2 to 20, more preferably from 2 to 10, and particularly preferably from 2 to 6 carbon atoms, e.g., an acetoxy group, a benzoyloxy group), an acylamino group (preferably an acylamino group having from 2 to 20, more preferably from 2 to 10, and particularly preferably from 2 to 6 carbon atoms, e.g., an acetylamino group, a benzoylamino group), an alkoxycarbonylamino group (preferably an alkoxycarbonylamino group having from 2 to 20, more preferably from 2 to 10, and particularly preferably from 2 to 6 carbon atoms, e.g., a methoxycarbonylamino group), an aryloxycarbonylamino group (preferably an aryloxycarbonylamino group having from 7 to 20, more preferably from 7 to 16, and particularly preferably from 7 to 12 carbon atoms, e.g., a phenyloxycarbonylamino group), a sulfonylamino group (preferably a sulfonylamino group having from 1 to 20, more preferably from 1 to 10, and particularly preferably from 1 to 6 carbon atoms, e.g., a methanesulfonylamino group, a benzenesulfonylamino group), a sulfamoyl group (preferably a sulfamoyl group having from 0 to 20, more preferably from 0 to 10, and particularly preferably from 0 to 6 carbon atoms, e.g., a sulfamoyl group, a methylsulfamoyl group, a dimethylsulfamoyl group, a phenylsulfamoyl group), a carbamoyl group (preferably a carbamoyl group having from 1 to 20, more preferably from 1 to 10, and particularly preferably from 1 to 6 carbon atoms, e.g., an unsubstituted carbamoyl group, a methylcarbamoyl group, a diethylcarbamoyl group, a phenylcarbamoyl group), an alkylthio group (preferably an alkylthio group having from 1 to 20, more preferably from 1 to 10, and particularly preferably from 1 to 6 carbon atoms, e.g., a methylthio group, an ethylthio group), an arylthio group (preferably an arylthio group having from 6 to 20, more preferably from 6 to 16, and particularly preferably from 6 to 12 carbon atoms, e.g., a phenylthio group), a sulfonyl group (preferably a sulfonyl group having from 1 to 20, more preferably from 1 to 10, and particularly preferably from 1 to 6 carbon atoms, e.g., a mesyl group, a tosyl group), a sulfinyl group (preferably a sulfonyl group having from 1 to 20, more preferably from 1 to 10, and particularly preferably from 1 to 6 carbon atoms, e.g., a methanesulfinyl group, a benzenesulfinyl group), a ureido group (preferably a ureido group having from 1 to 20, more preferably from 1 to 10, and particularly preferably from 1 to 6 carbon atoms, e.g., an unsubstituted ureido group, a methylureido group, a phenylureido group), a phosphoric acid amido group (preferably a phosphoric acid amido group having from 1 to 20, more preferably from 1 to 10, and particularly preferably from 1 to 6 carbon atoms, e.g., a diethylphosphoric acid amido group, a phenylphosphoric acid amido group), a hydroxy group, a mercapto group, a halogen atom (e.g., a fluorine atom, a chlorine atom, a bromine atom, or an iodine atom), a cyano group, a nitro group, a hydroxamic acid group, a sulfino group, a hydrazino group, an imino group (—CH=N— or —N=CH—), an azo group, a heterocyclic group (preferably a heterocyclic group having from 1 to 30, and more preferably from 1 to 12 carbon atoms; containing, as a hetero atom(s), for example, a nitrogen atom, an oxygen atom, or a sulfur atom, and specifically, e.g., an imidazolyl group, a pyridyl group, a quinolyl group, a furyl group, a piperidyl group, a morpholino group, a benzoxazolyl group, a benzimidazolyl group, a benzthiazolyl group can be exemplified), and a silyl group (preferably a silyl group having 3 to 40, more preferably 3 to 30, and particularly preferably 3 to 24 carbon atoms, e.g. a trimethylsilyl group, a triphenylsilyl group).

These substituents may further be substituted. When two or more substituents are present, the substituents may be the same as or different from each other. Alternatively, they may bind to each other, to form a ring, if possible.

$R^1$ to $R^4$ each are preferably a hydrogen atom, an alkyl group, an alkoxy group or a halogen atom; more preferably a hydrogen atom, an alkyl group or an alkoxy group; and most preferably a hydrogen atom or a methyl group.

Examples of the alkyl group which is represented by $R^5$ or $R^6$ and which may have a substituent, include alkyl groups having preferably 1 to 20, more preferably 1 to 12 and even more preferably 1 to 8 carbon atoms, for example, a methyl group, an ethyl group, and an n-octyl group. The substituent of the alkyl group which is represented by $R^5$ or $R^6$ has the same meaning as the substituent represented by the above $R^1$ to $R^4$, and is preferably a group having a polymerizable group introduced to fix the alignment, and more preferably a group having a radical polymerizable group. When $R^5$ or $R^6$ represents an alkyl group, it may be combined with $R^2$ or $R^4$ to form a cyclic structure. $R^5$ and $R^6$ each are preferably a hydrogen atom or an alkyl group, and more preferably a hydrogen atom, a methyl group or an ethyl group.

$A^1$ is a phenyl group, a naphthyl group, or an aromatic heterocyclic group, each of which may have a substituent.

The substituent which may be possessed by the phenyl group or the naphthyl group, is preferably a group which is introduced to raise nematic mesomorphism or a solubility of the azo compound, a group having an electron attractive property or an electron withdrawing property which is introduced to adjust color tone as a dye, or a group having a polymerizable group which is introduced to fixate alignment. Specific examples have the same meaning as the substituent represented by $R^1$, $R^2$, $R^3$, and $R^4$. Preferred examples of the substituent include a substituted or unsubstituted alkyl group, a substituted or unsubstituted alkenyl group, a substituted or unsubstituted alkynyl group, a substituted or unsubstituted aryl group, a substituted or unsubstituted alkoxy group, a substituted or unsubstituted alkyl- or aryl-oxycarbonyl group, a substituted or unsubstituted acyloxy group, a substituted or unsubstituted acylamino group, a substituted or unsubstituted amino group, a substituted or unsubstituted alkoxycarbonylamino group, a substituted or unsubstituted sulfonylamino group, a substituted or unsubstituted sulfamoyl group, a substituted or unsubstituted carbamoyl group, a substituted or unsubstituted alkylthio group, a substituted or unsubstituted sulfonyl group, a substituted or unsubstituted ureido group, a nitro group, a hydroxy group, a cyano group, an imino group, an azo group, and a halogen atom. Among them, particularly preferable are a substituted or unsubstituted alkyl group, a substituted or unsubstituted alkenyl group, a substituted or unsubstituted aryl group, a substituted or unsubstituted alkoxy group, a substituted or unsubstituted alkyl- or aryl-oxycarbonyl group, a substituted or unsubstituted acyloxy group, a nitro group, imino group, and an azo group. With regard to substituents having carbon atoms among these substituents, the preferable range of the number of carbon atoms is the same as that of the substituent represented by $R^1$ to $R^4$.

The number of substituents which the phenyl group or the naphthyl group may have is generally 1 to 5, preferably 1. The phenyl group more preferably has one substituent at the para-position with respect to $L^1$.

The aromatic heterocyclic group is preferably a group derived from a hetero-monoring or a hetero-diring. Examples of the atom excluding a carbon atom which composes the aromatic heterocyclic group include a nitrogen atom, a sulfur atom and an oxygen atom. When the aromatic heterocyclic group has a plurality of ring-constituting atoms excluding the carbon atom, those atoms may be the same with, or different from each other. Specific examples of the aromatic heterocyclic group include a pyridyl group, a quinolyl group, a thiophenyl group, a thiazolyl group, a benzothiazolyl group, a thiadiazolyl group, a quinolonyl group, a naphthalimidoyl group, a thienothiazolyl group.

The aromatic heterocyclic group is preferably a pyridyl group, a quinolyl group, a thiazolyl group, a benzothiazolyl group, a thiadiazolyl group or a thienothiazolyl group, more preferably a pyridyl group, a benzothiazolyl group, a thiadiazolyl group or a thienothiazolyl group, and further preferably a pyridyl group, a benzothiazolyl group, or a thienothiazolyl group.

$A^1$ is particularly preferably a phenyl group, a pyridyl group, a benzothiazolyl group, or a thienothiazolyl group, each of which may have a substituent.

$B^1$ represents a divalent substituted or unsubstituted aromatic hydrocarbon group or a divalent substituted or unsubstituted aromatic heterocyclic group. n denotes an integer from 1 to 5. When n is 2 or more, plural $B^1$s may be the same or different from each other.

The divalent aromatic hydrocarbon group represented by $B^1$ is preferably a phenylene group or a naphthylene group. Examples of the substituent which the divalent aromatic hydrocarbon group may have include a substituted or unsubstituted alkyl group, a substituted or unsubstituted alkoxy group, a hydroxy group, a nitro group, a halogen atom, a substituted or unsubstituted amino group, a substituted or unsubstituted acylamino group, and a cyano group. The substituent which the divalent aromatic hydrocarbon group may have, is preferably an alkyl group which may have a substituent, an alkoxy group which may have a substituent, a hydroxyl group, and a halogen atom, more preferably an alkyl group which may have a substituent, an alkoxy group which may have a substituent, and a halogen atom, and further preferably a methyl group and a halogen atom.

The divalent aromatic heterocyclic group represented by $B^1$ is preferably a divalent group derived from a hetero-monoring or a hetero-diring. Examples of the atoms constituting the divalent aromatic heterocyclic group excluding the carbon atom, include a nitrogen atom, a sulfur atom and an oxygen atom. When the divalent aromatic heterocyclic group has a plurality of atoms constituting the ring excluding the carbon atom, those atoms may be the same with, or different from each other. Specific examples of the divalent aromatic heterocyclic group include a divalent group derived from pyridine, quinoline, isoquinoline, benzothiadiazole, phthalimide, thienothiazole, and the like. Among those, a divalent group derived from thienothiazole is particularly preferable.

Examples of the substituent which may be possessed by the divalent aromatic heterocyclic group include an alkyl group, such as a methyl group and an ethyl group; an alkoxy group, such as a methoxy group and an ethoxy group; an unsubstituted amino group; an alkylamino group, such as a methylamino group; an acylamino group, such as an acetylamino group, a nitro group, a hydroxy group, a cyano group, and a halogen atom. Among these substituents having carbon atoms, the preferable range of the number of carbon atoms is the same as that of the substituent represented by $R^1$ to $R^4$.

Preferable examples of the dichronic dye (azo dye) represented by formula (I) include azo dyes represented by any one of formulae (Ia) to (Ic).

Formula (Ia)

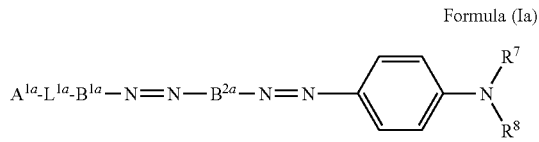

In formula (Ia), $R^7$ and $R^8$ each independently represent a hydrogen atom, a methyl group or an ethyl group; $L^{1a}$ represents —N=N—, —CH=N—, —N=CH—, —C(=O)O—, —OC(=O)— or —CH=CH—; $A^{1a}$ represents a group represented by formula (IIa) or (IIIa); $B^{1a}$ and $B^{2a}$ each independently represent a group represented by any one of formulae (IVa), (Va) and (VIa).

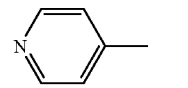
(IIa)

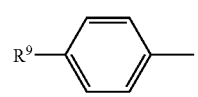
(IIIa)

In formula (IIIa), $R^9$ represents a substituted or unsubstituted alkyl group, a substituted or unsubstituted aryl group, a substituted or unsubstituted alkoxy group, a substituted or unsubstituted alkyl- or aryl-oxycarbonyl group, or a substituted or unsubstituted acyloxy group.

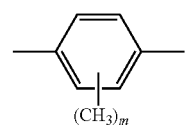
(IVa)

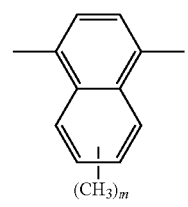
(Va)

(VIa)

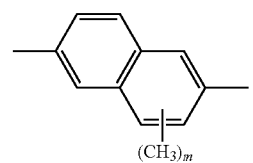

In formulae (IVa), (Va) and (VIa), m represents an integer of 0 to 2.

Formula (Ib)

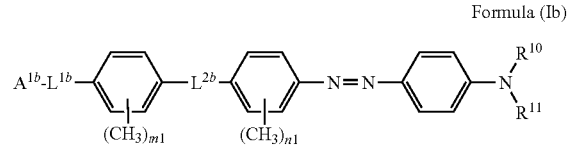

In formula (Ib), $R^{10}$ and $R^{11}$ each independently represent a hydrogen atom, a methyl group or an ethyl group; $L^{1b}$ represents —N=N— or —C(=O)O—; $L^{2b}$ represents —CH=N—, —N=CH—, —C(=O)O— or —OC(=O)—; $A^{1b}$ represents a group represented by formula (IIa) or (IIIa); and m1 and n1 each independently represent an integer of 0 to 2.

Formula (Ic)

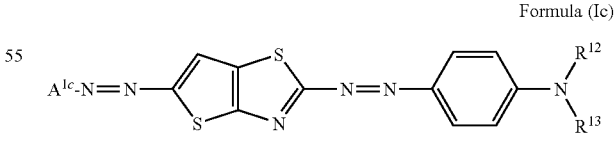

In formula (Ic), $R^{12}$ and $R^{13}$ each independently represent a hydrogen atom, a methyl group or an ethyl group; and $A^{1c}$ represents a group represented by formula (IIa) or (IIIa).

Examples of the substituent which each group has in the above formulae (Ia), (Ib) and (Ic) are the same as the examples of the substituent represented by $R^1$ to $R^4$ in the formula (I). Also, with regard to substituents having carbon atoms such as alkyl groups and the like, the preferable range of the number of carbon atoms is the same as that of the substituent represented by $R^1$ to $R^4$.

The compound represented by formula (I), (Ia), (Ib) or (Ic) may have a polymerizable group as the substituent. It is preferable that the polymerizable group is contained in those compounds, since fixation of alignment of liquid crystal (or film hardening ability) is bettered. Examples of the polymerizable group include an unsaturated polymerizable group, an epoxy group and an aziridinyl group. Among these groups, an unsaturated polymerizable group is preferable, and an ethylenically-unsaturated polymerizable group is more preferable. Examples of the ethylenically-unsaturated polymerizable group include an acryloyl group and a methacryloyl group.

The polymerizable group is preferably positioned at the terminal of the molecule, and specifically preferably exists as the substituent of $R^5$ and/or $R^6$ or as the substituent of $A^1$ in formula (I).

Specific examples of the compound represented by formula (I) will be given below, though the present invention is not limited to these specific examples.

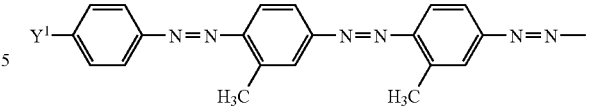

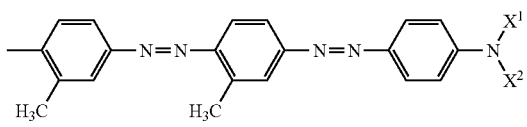

| No. | $X^1$ | $X^2$ | $Y^1$ |
|---|---|---|---|
| A-4 | —$C_2H_5$ | —$C_2H_5$ | 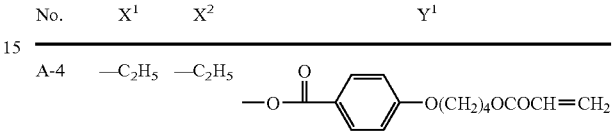 |

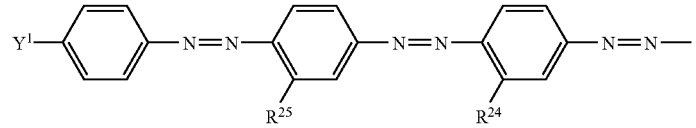

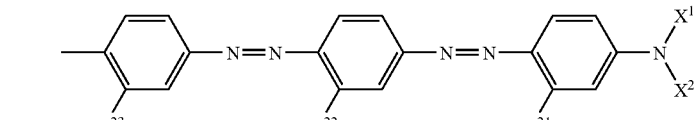

| No. | $X^1$ | $X^2$ | $R^{21}$ | $R^{22}$ | $R^{23}$ | $R^{24}$ | $R^{25}$ | $Y^1$ |
|---|---|---|---|---|---|---|---|---|
| A-1 | —$C_2H_5$ | —$C_2H_5$ | —H | —$CH_3$ | —H | —H | —H | —$C_4H_9$ |
| A-2 | —$C_2H_5$ | —$C_2H_5$ | —H | —$CH_3$ | —$CH_3$ | —$CH_3$ | —H | —$C_4H_9$ |
| A-3 | —$CH_3$ | —$CH_3$ | —H | —$CH_3$ | —H | —H | —H | —$C_4H_9$ |

-continued

| A-5 | —$C_2H_5$ | —$C_2H_5$ | 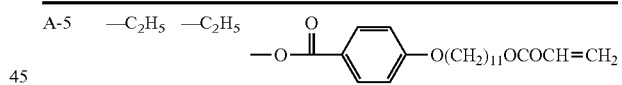 |
|---|---|---|---|

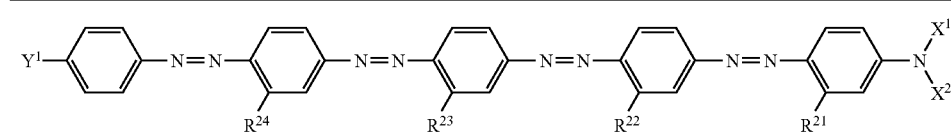

| No. | $X^1$ | $X^2$ | $R^{21}$ | $R^{22}$ | $R^{23}$ | $R^{24}$ | $Y^1$ |
|---|---|---|---|---|---|---|---|
| A-9 | —$C_2H_5$ | —$C_2H_5$ | —H | —$CH_3$ | —H | —H | —$C_4H_9$ |
| A-10 | —$C_2H_5$ | —$C_2H_5$ | —$CH_3$ | —$CH_3$ | —H | —H | —$C_4H_9$ |
| A-11 | —$C_2H_5$ | —$C_2H_5$ | —H | —$CH_3$ | —$CH_3$ | —$CH_3$ | —$C_4H_9$ |
| A-15 | —$C_2H_5$ | —$C_2H_5$ | —H | —$CH_3$ | —$CH_3$ | —$CH_3$ | —O—C(=O)—C$_6$H$_4$—O(CH$_2$)$_4$OCOCH=CH$_2$ |

| No. | X¹ | X² | $R^{21}$ | $R^{22}$ | $R^{23}$ | Y¹ |
|---|---|---|---|---|---|---|
| A-16 | —C₂H₅ | —C₂H₅ | —H | —CH₃ | —H | —C₄H₉ |
| A-17 | —C₂H₅ | —C₂H₅ | —H | —CH₃ | —CH₃ | —C₄H₉ |
| A-18 | —C₂H₅ | —C₂H₅ | —H | —CH₃ | —H | —O-C(=O)-C₆H₄-O(CH₂)₄OCOCH=CH₂ |
| A-19 | —C₂H₅ | —C₂H₅ | —H | —CH₃ | —H | —O-C(=O)-C₆H₄-O(CH₂)₁₁OCOCH=CH₂ |
| A-24 | —C₂H₅ | —C₂H₅ | —OCH₃ | —CH₃ | —H | —C₄H₉ |
| A-25 | —C₂H₅ | —C₂H₅ | —H | —CH₃ | —CH₃ | —O-C(=O)-C₆H₄-O(CH₂)₄OCOCH=CH₂ |
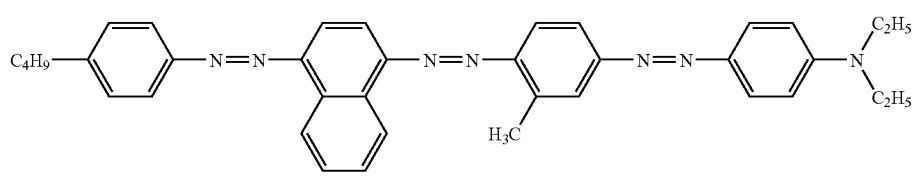
A-27
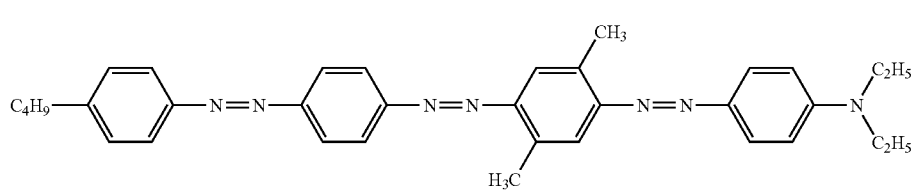
A-28
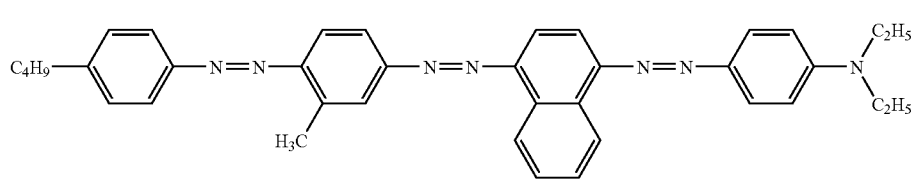
A-29
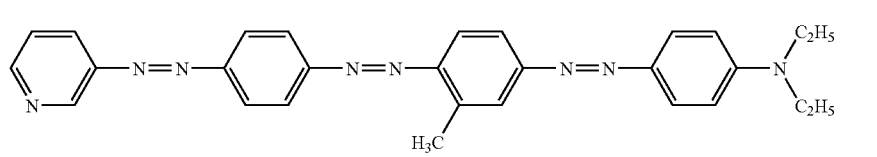
A-30
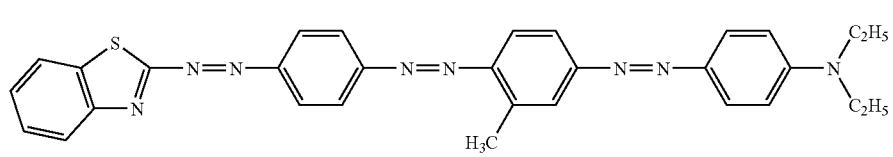
A-31

-continued
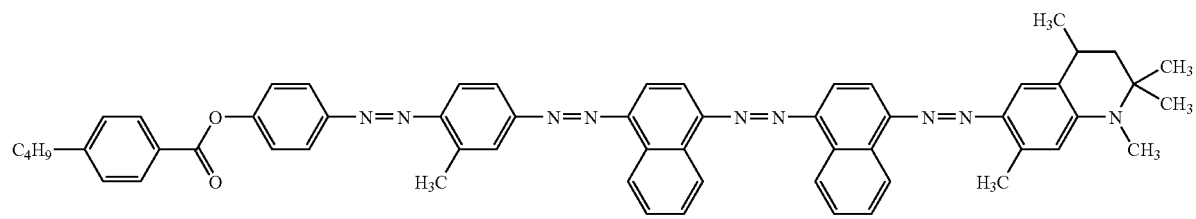
A-32
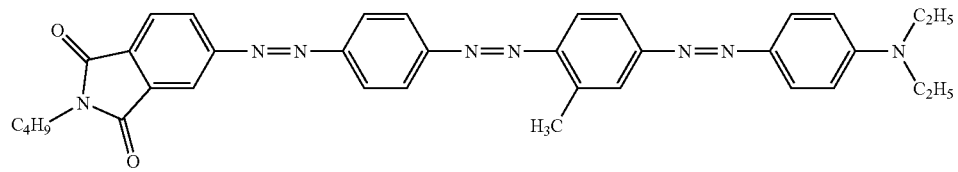
A-33
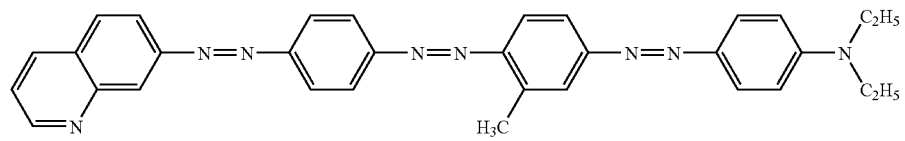
A-34
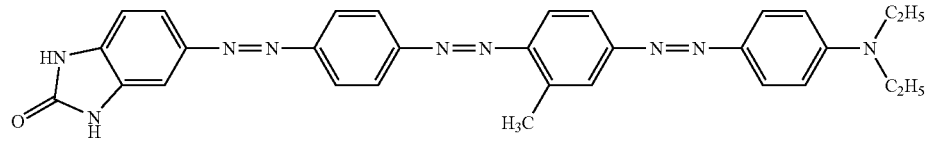
A-35
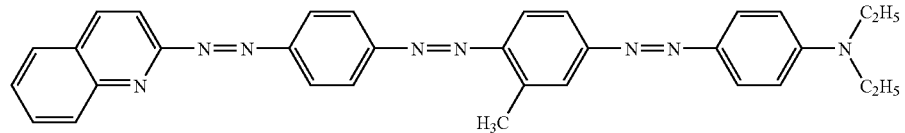
A-36
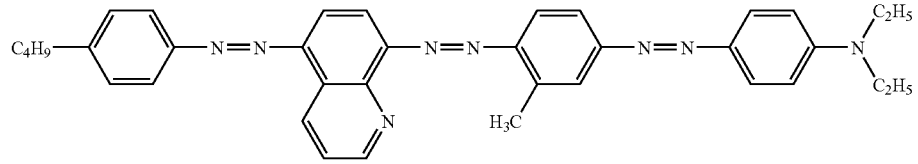
A-37
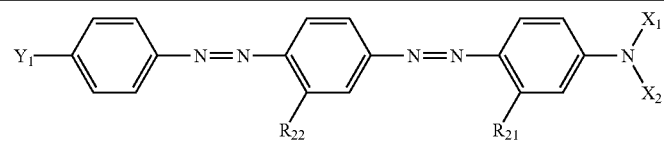
| No. | $X_1$ | $X_2$ | $R_{21}$ | $R_{22}$ | $Y_1$ |
|---|---|---|---|---|---|
| A-38 | —$C_2H_5$ | —$C_2H_5$ | —H | —$CH_3$ | —O—C(O)—C₆H₄—O(CH₂)₄OCOCH=CH₂ |
| A-40 | —$C_2H_5$ | —$C_2H_5$ | —H | —$CH_3$ | —$C_4H_9$ |

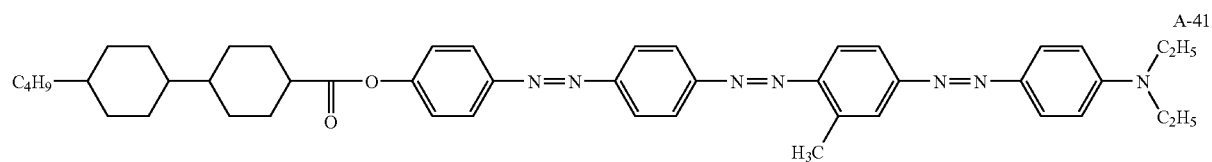
A-41
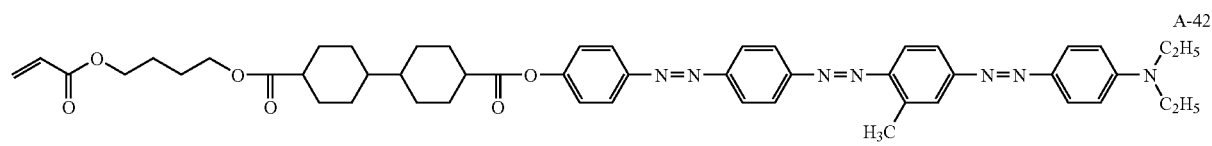
A-42
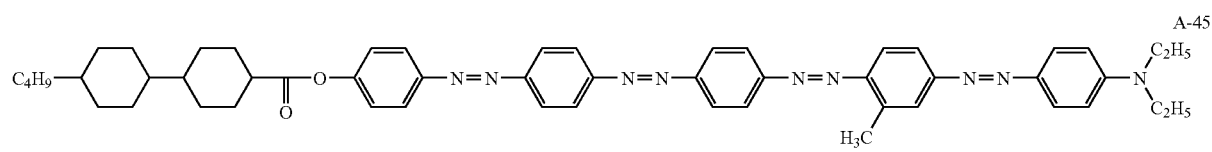
A-45
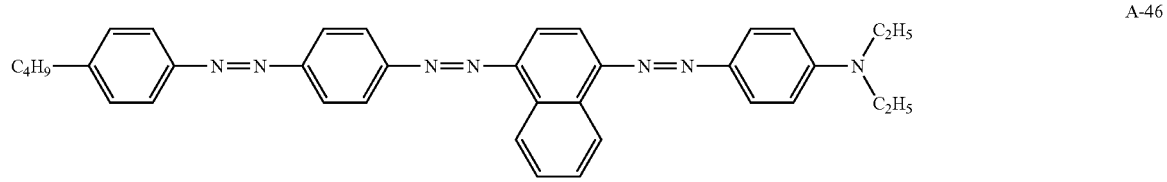
A-46
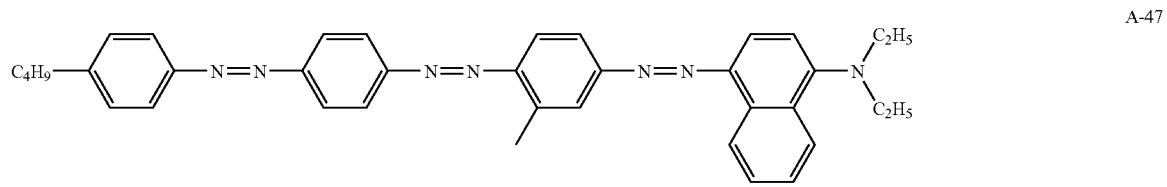
A-47
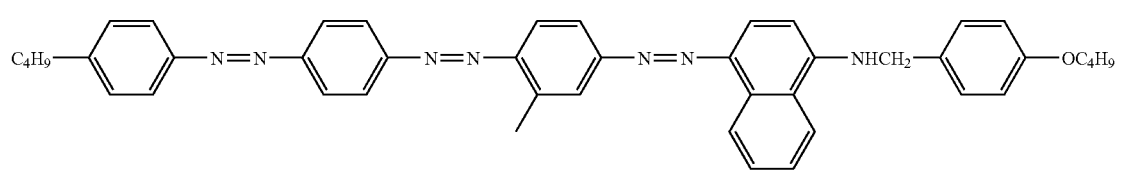
A-48
A-50            A-51
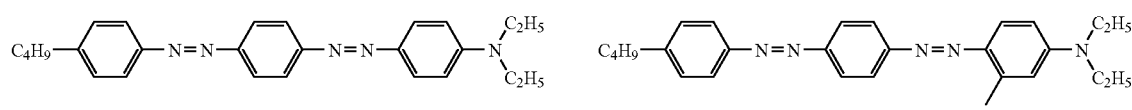
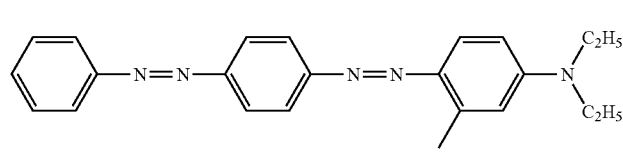
A-52
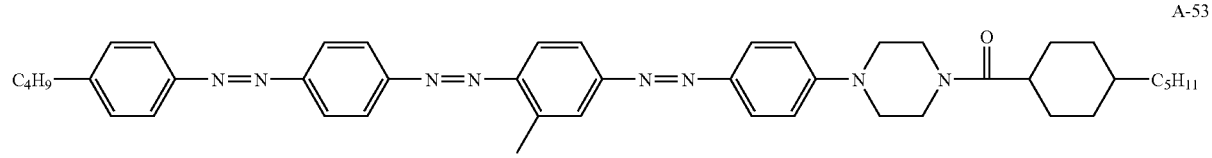
A-53
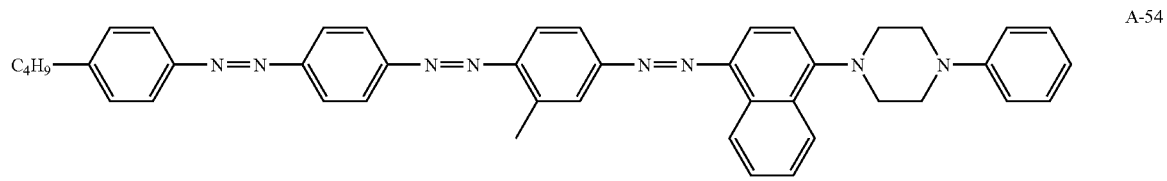
A-54

-continued
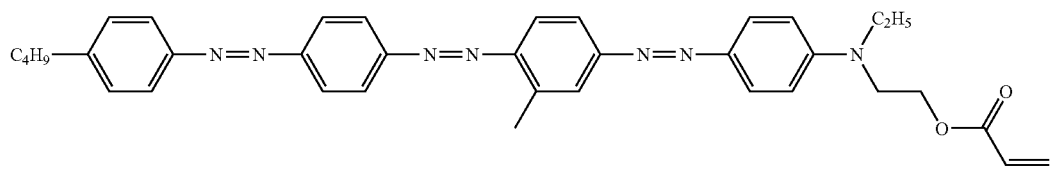
A-55
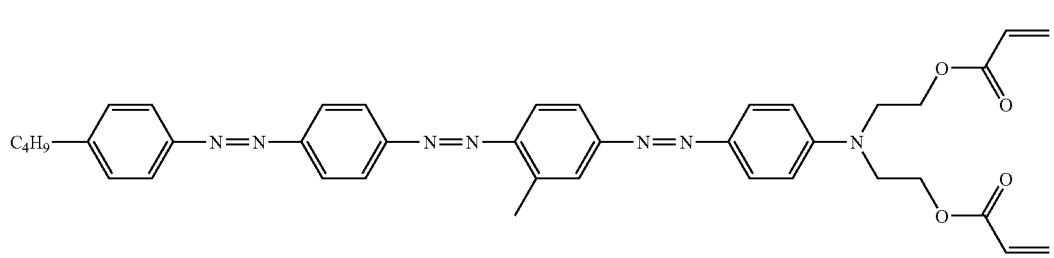
A-56
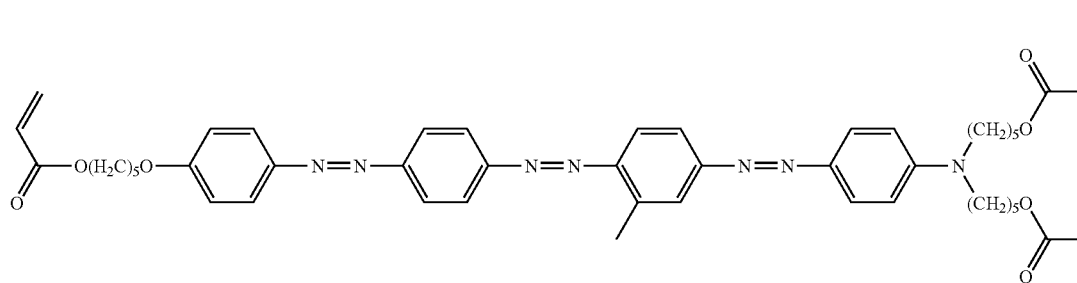
A-57
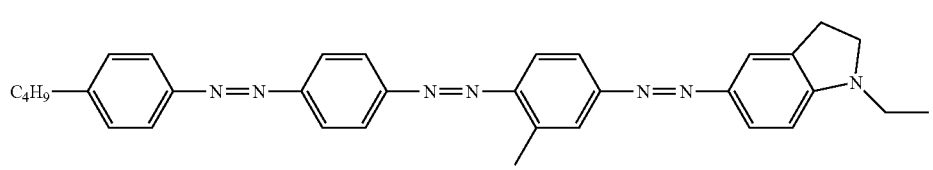
A-58
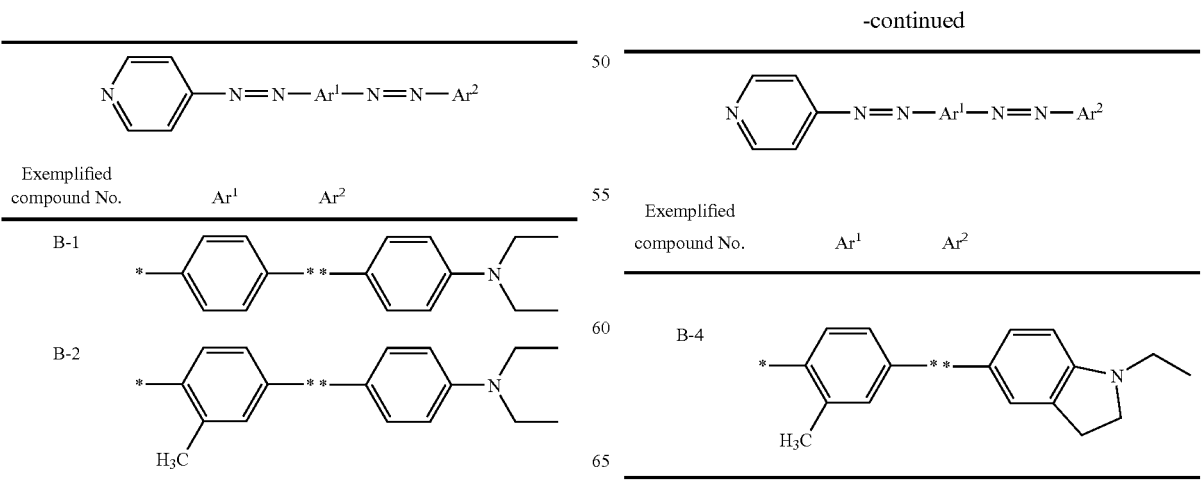

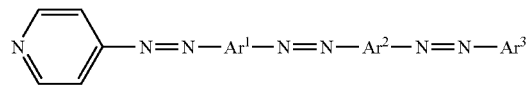
| Exemplified compound No. | Ar¹ | Ar² | Ar³ |
|---|---|---|---|
| B-5 | 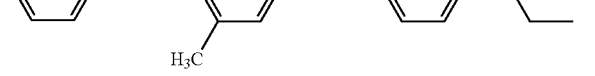 |  | 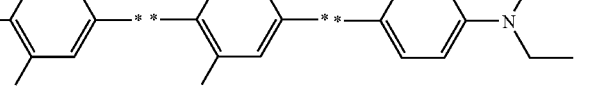 |
| B-6 |  | 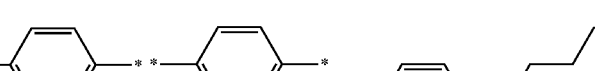 |  |
| B-7 |  | 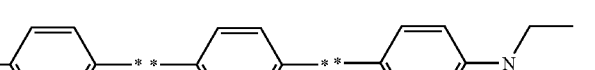 |  |
| B-8 |  | 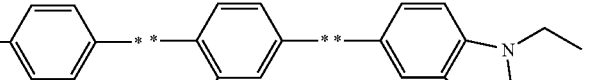 |  |
| B-10 |  | 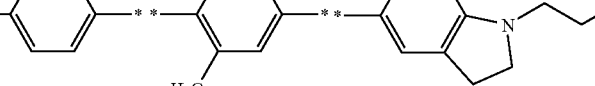 |  |
| B-11 |  |  | 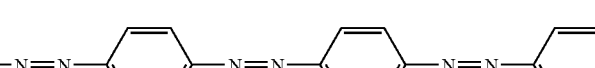 |
Exemplified compound No. B-12
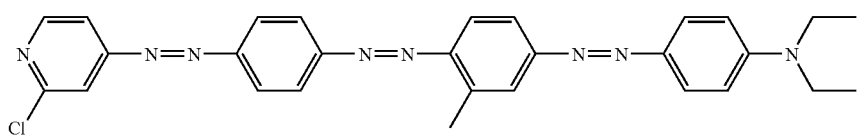
Exemplified compound No. B-13
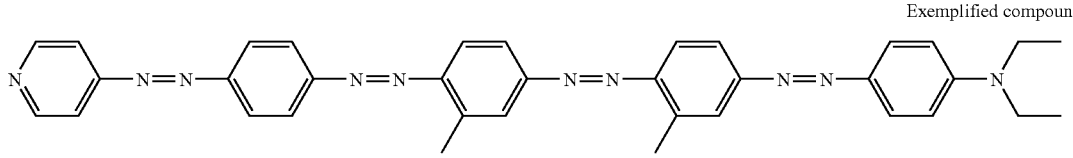

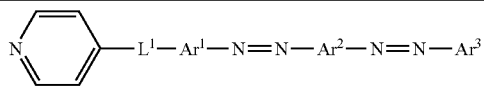
| Exemplified compound No. | L¹ | Ar¹ | Ar² | Ar³ |
|---|---|---|---|---|
| B-14 | —O—C(=O)— | -C6H4- | -C6H3(CH3)- | -C6H4-N(Et)2 |
| B-15 | —C(=O)—O— | -C6H4- | -C6H3(CH3)- | -C6H4-N(Et)2 |
| B-16 | —N=CH— | -C6H4- | -C6H3(CH3)- | -C6H4-N(Et)2 |
| B-17 | —CH=CH— | -C6H4- | -C6H3(CH3)- | -C6H4-N(Et)2 |
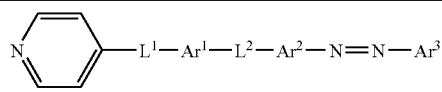
| Exemplified compound No. | L¹ | Ar¹ | L¹ | Ar² | Ar³ |
|---|---|---|---|---|---|
| B-18 | —N=N— | -C6H3(CH3)- | —O—C(=O)— | -C6H4- | -C6H4-N(Et)2 |
| B-20 | —N=N— | -C6H3(CH3)- | —N=CH— | -C6H4- | -C6H4-N(Et)2 |
| B-21 | —CH=CH— | -C6H4- | —O—C(=O)— | -C6H3(CH3)- | -C6H4-N(Et)2 |

C-1
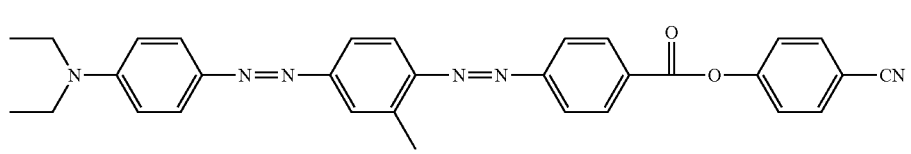
C-2
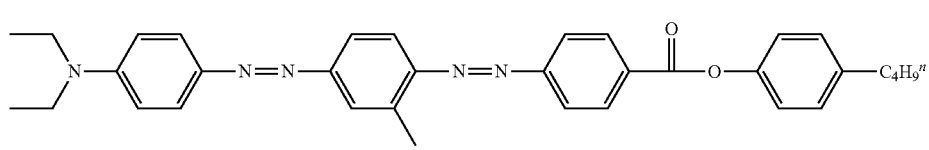
C-3
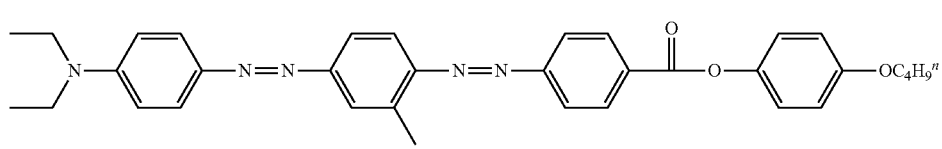
C-4
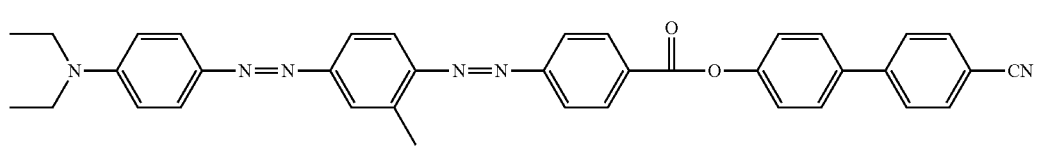
C-5
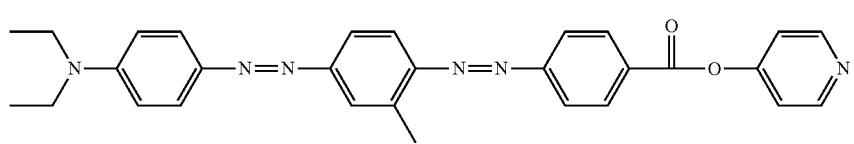
C-6
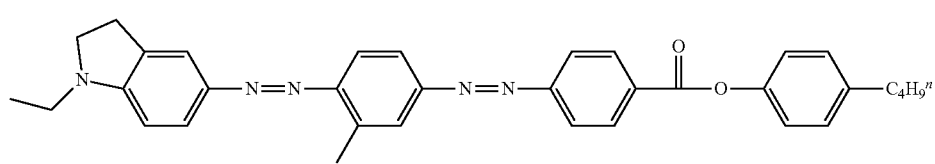
C-7
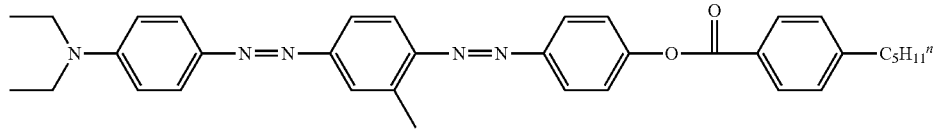
C-8
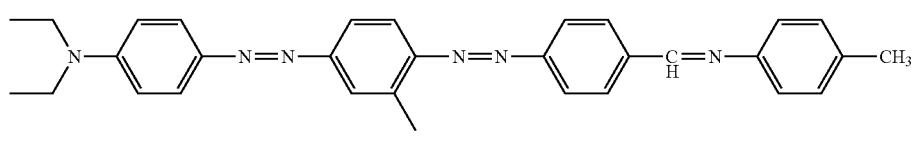
C-9
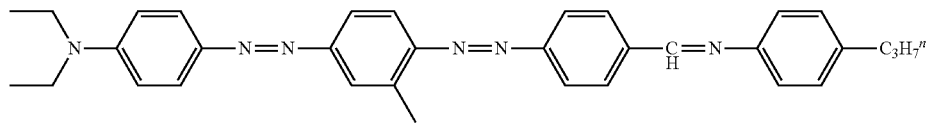
C-10
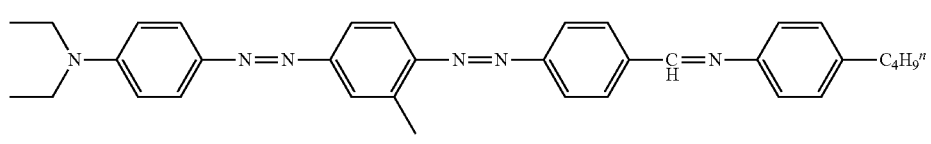
C-11
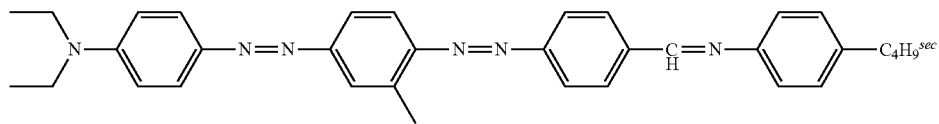

-continued
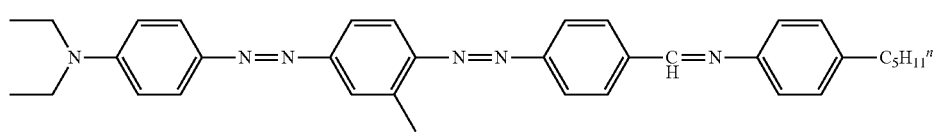 C-12
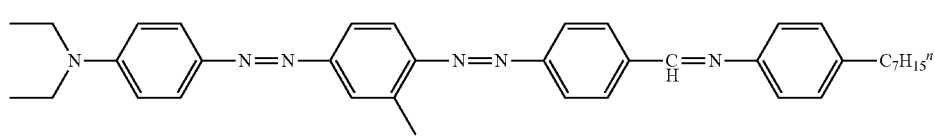 C-13
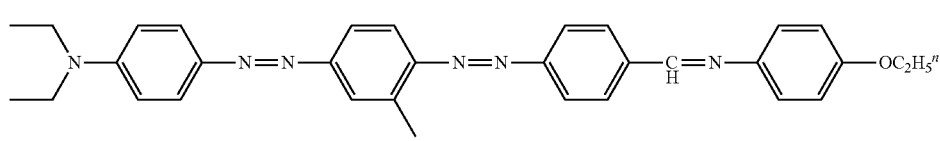 C-14
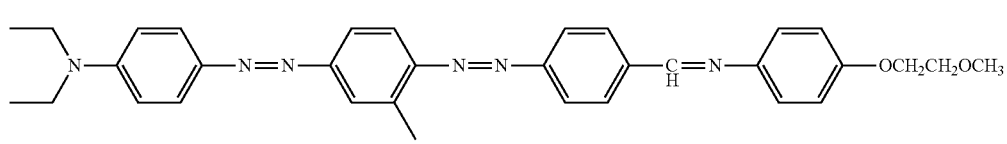 C-15
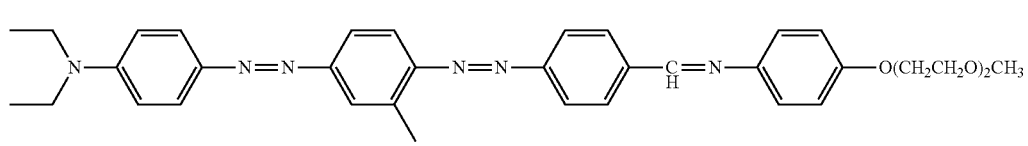 C-16
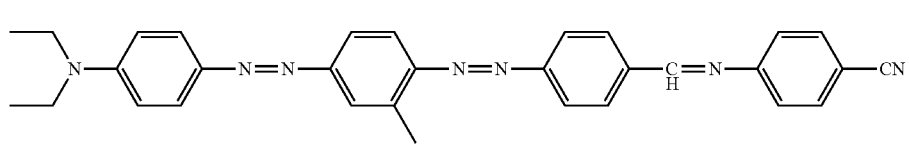 C-17
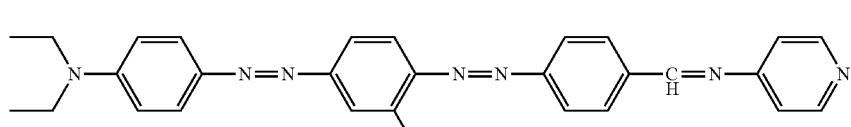 C-18
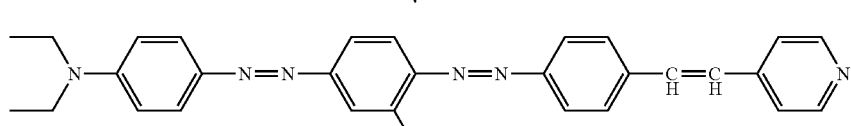 C-19
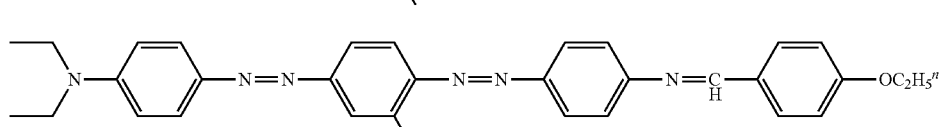 C-20
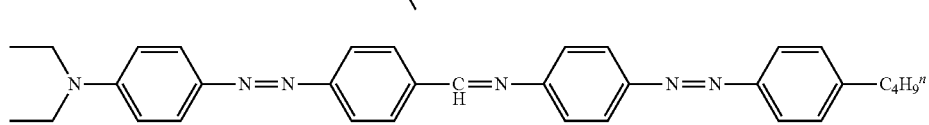 C-21
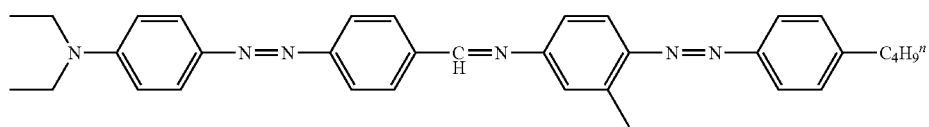 C-22
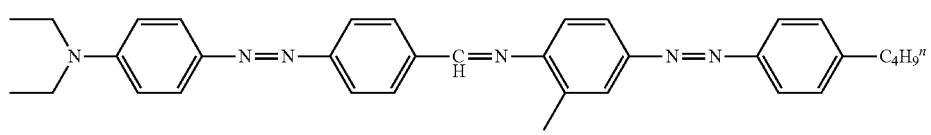 C-23

-continued

C-24
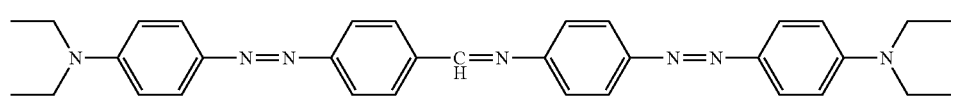

C-25
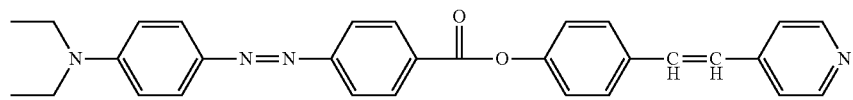

C-26
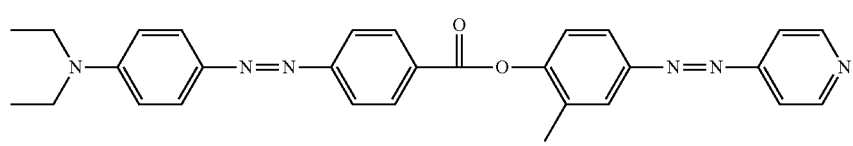

C-27
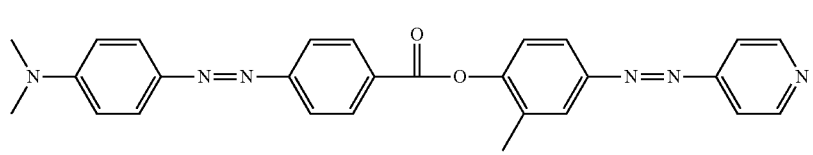

C-28
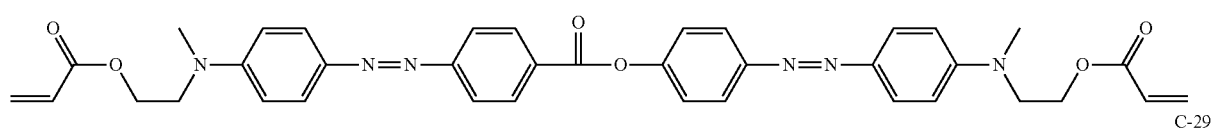

C-29
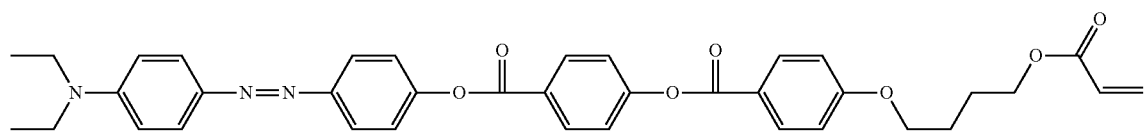

C-30
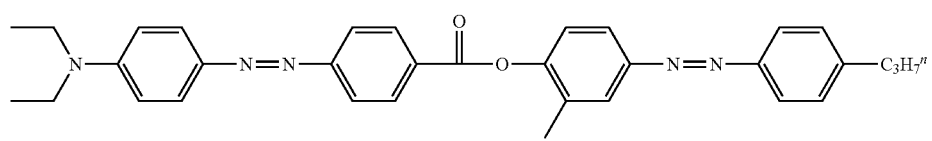

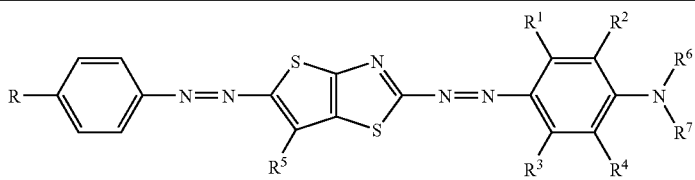

| No. | $R^1$ | $R^2$ | $R^3$ | $R^4$ | $R^5$ | $R^6$ | $R^7$ | R |
|---|---|---|---|---|---|---|---|---|
| D-1 | —H | —H | —H | —H | —H | —$C_2H_5$ | —$C_2H_5$ | —$C_4H_9$ |
| D-2 | —H | —H | —H | —H | —H | —$C_2H_5$ | —$C_2H_5$ | —$C_6H_{13}$ |
| D-3 | —H | —H | —H | —H | —H | —$C_2H_5$ | —$C_2H_5$ | —$OC_4H_9$ |
| D-4 | —H | —H | —H | —H | —H | —$C_2H_5$ | —$C_2H_5$ | —$CF_3$ |
| D-5 | —H | —H | —H | —H | —H | —$C_2H_5$ | —$C_2H_5$ | —OH |
| D-6 | —H | —H | —H | —H | —H | —$C_2H_5$ | —$C_2H_5$ | —CN |
| D-7 | —H | —H | —H | —H | —H | —$C_2H_5$ | —$C_2H_5$ | —$NO_2$ |
| D-8 | —H | —H | —H | —H | —H | —$C_2H_5$ | —$C_2H_5$ | —F |
| D-9 | —H | —H | —H | —H | —H | —$C_2H_5$ | —$C_2H_5$ | —Br |
| D-10 | —H | —H | —H | —H | —H | —$C_2H_5$ | —$C_2H_5$ | —I |
| D-11 | —H | —H | —H | —H | —H | —$CH_3$ | —H | —$C_4H_9$ |
| D-12 | —H | —H | —H | —H | —H | —$CH_3$ | —$CH_3$ | —$C_4H_9$ |
| D-13 | —H | —H | —H | —H | —H | —$CH_3$ | —$C_6H_{13}$ | —$C_4H_9$ |
| D-14 | —H | —H | —H | —H | —H | —$CH_3$ | —$CH_2CH_2OH$ | —$C_4H_9$ |
| D-15 | —H | —H | —H | —H | —H | —$CH_3$ | —$CH_2CH_2OCH_3$ | —$C_4H_9$ |
| D-16 | —H | —H | —H | —H | —H | —$CH_3$ | —$CH_2CH_2OCOCH=CH_2$ | —$C_4H_9$ |
| D-17 | —H | —H | —H | —H | —H | —$CH_3$ | —$CH_2CH_2CN$ | —$C_4H_9$ |
| D-18 | —H | —H | —H | —H | —H | —$CH_2CH_2OCOCH=CH_2$ | —$CH_2CH_2OCOCH=CH_2$ | —$C_4H_9$ |

-continued
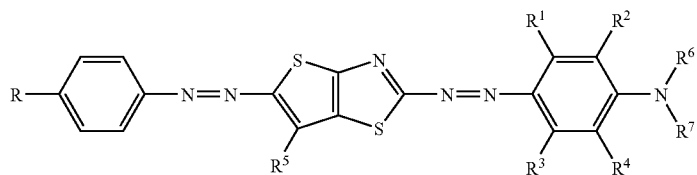
| No. | R¹ | R² | R³ | R⁴ | R⁵ | R⁶ | R⁷ | R |
|---|---|---|---|---|---|---|---|---|
| D-19 | —CH₃ | —H | —H | —H | —H | —C₂H₅ | —C₂H₅ | —C₄H₉ |
| D-20 | —F | —H | —H | —H | —H | —C₂H₅ | —C₂H₅ | —C₄H₉ |
| D-21 | —Cl | —H | —H | —H | —H | —C₂H₅ | —C₂H₅ | —C₄H₉ |
| D-22 | —OH | —H | —H | —H | —H | —C₂H₅ | —C₂H₅ | —C₄H₉ |
| D-23 | —OCH₃ | —H | —H | —H | —H | —C₂H₅ | —C₂H₅ | —C₄H₉ |
| D-24 | —H | —OCH₃ | —OCH₃ | —H | —H | —C₂H₅ | —C₂H₅ | —C₄H₉ |
| D-25 | —H | —H | —H | —H | —CH₃ | —C₂H₅ | —C₂H₅ | —C₄H₉ |
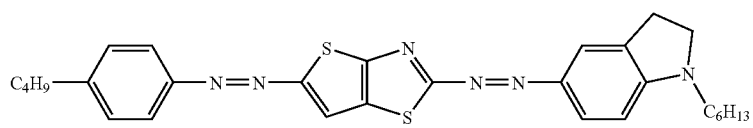
(D-26)
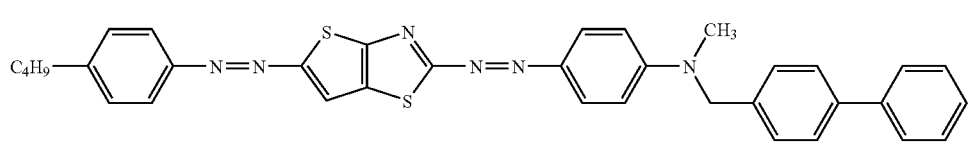
(D-27)
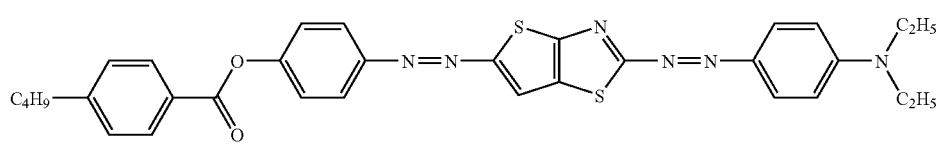
(D-28)
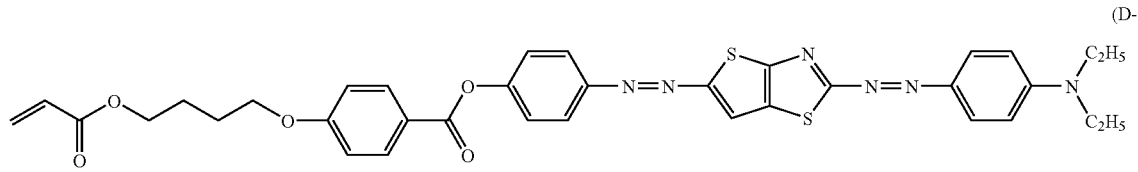
(D-29)
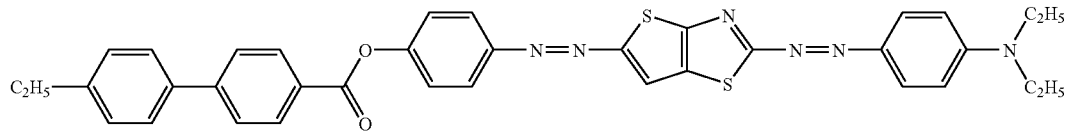
(D-30)
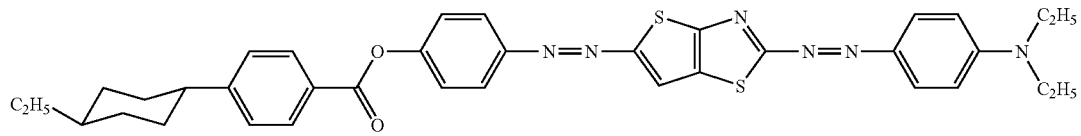
(D-31)
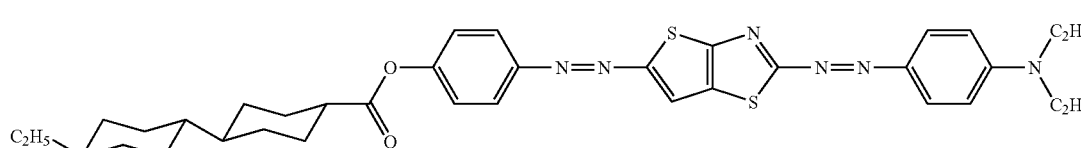
(D-32)
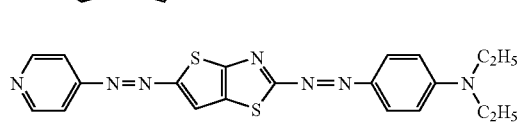
(D-33)
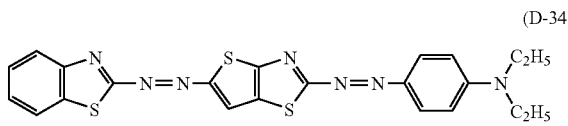
(D-34)

-continued
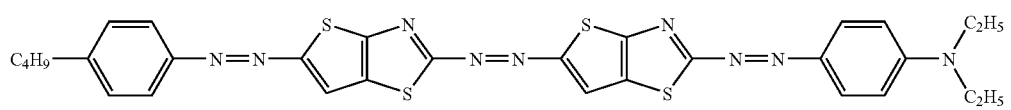
(D-35)
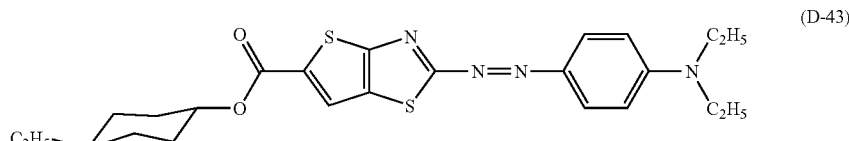
| No. | A | R⁵ | R⁶ | R⁷ | R |
|---|---|---|---|---|---|
| D-36 | S | —H | —C$_2$H$_5$ | —C$_2$H$_5$ | —C$_4$H$_9$ |
| D-37 | S | —H | —C$_2$H$_5$ | —C$_2$H$_5$ | —C$_7$H$_{15}$ |
| D-38 | S | —H | —C$_2$H$_5$ | —C$_2$H$_5$ | —CN |
| D-39 | S | —H | —C$_2$H$_5$ | —C$_2$H$_5$ | —Br |
| D-40 | S | —CH$_3$ | —C$_2$H$_5$ | —C$_2$H$_5$ | —C$_4$H$_9$ |
| D-41 | S | —H | —CH$_3$ | —CH$_3$ | —C$_4$H$_9$ |
| D-42 | O | —H | —C$_2$H$_5$ | —C$_2$H$_5$ | —C$_4$H$_9$ |
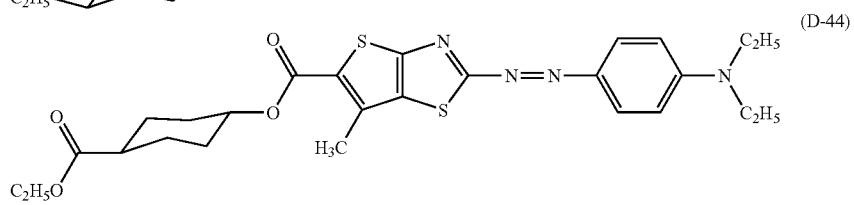
(D-43)
(D-44)
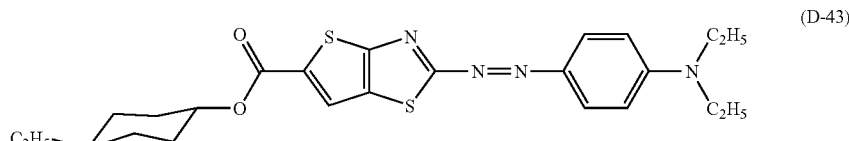
| No. | R⁶ | R⁷ | R |
|---|---|---|---|
| D-45 | —C$_2$H$_5$ | —C$_2$H$_5$ | —C$_4$H$_9$ |
| D-46 | —C$_2$H$_5$ | —C$_2$H$_5$ | —OC$_4$H$_9$ |
| D-47 | —C$_2$H$_5$ | —C$_2$H$_5$ | —CF$_3$ |
| D-48 | —C$_2$H$_5$ | —C$_2$H$_5$ | —F |
| D-49 | —CH$_3$ | —CH$_3$ | —C$_4$H$_9$ |
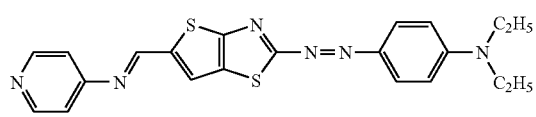
(D-50)
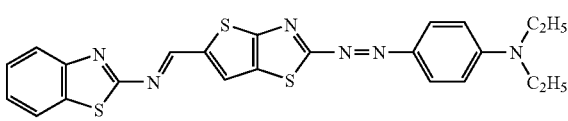
(D-51)

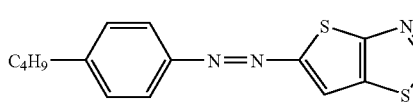 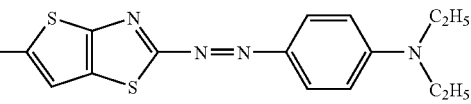

(D-52)

The azo dye represented by formula (I) according to the present invention can be synthesized readily, according to the method described in, for example, Journal of Materials Chemistry (1999), 9 (11), pp. 2755-2763.

As apparent from its molecular structure, the azo dye represented by formula (I) has a planar molecular shape and a favorable linearity, and has a rigid and solid core part and a flexible side-chain part, and also has a polar amino group at its terminal of its molecular long axis of the azo dye. Thus, the azo dye represented by formula (I) has a property easily revealing mesomorphism, especially nematic mesomorphism.

As in the above, in the present invention, the dichroic dye composition containing at least one azo dye of formula (I) can be made to have mesomorphism, i.e. a property of a substance to form a state of liquid crystal (in other words, liquid crystallinity).

Furthermore, since the azo dye represented by formula (I) is high in flatness of the molecule, a strong intermolecular interaction can act. Thus, the azo dye represented by formula (I) also has a property of easily forming an association state of the molecules each other.

The dichroic dye composition containing the azo dye represented by formula (I) according to the present invention not only reveals the high absorbance in a wide visible wavelength region caused by association formation, but also has nematic mesomorphism. Thus, for example, by passing through a lamination process, such as coating over the surface of a polyvinyl alcohol alignment film (orientation film) after rubbing or the surface of a photo alignment film subjected to light irradiation, a high level of molecular alignment state is realizable. Therefore, by employing the dichroic dye composition containing the azo dye represented by formula (I) according to the present invention as a light absorption anisotropic film, it is possible to produce a polarizing element high in polarizing property.

The dichroic ratio (D) calculated by a method described in Examples described later can be raised to 7 or more by the dichroic dye composition to be used in the present invention, and the dichroic ratio (D) is preferably 10 to 100 and more preferably 20 to 100.

The azo dye represented by formula (I) to be used in the present invention exhibits a nematic liquid crystal phase preferably at 10 to 300° C. and more preferably 100 to 250° C.

The above dichroic dye composition more preferably contains two or more azo dyes represented by formula (I). Though no particular limitation is imposed on the combination of these azo dyes, it is preferable to mix these dyes in such a combination that the mixture has a black color to attain production of a polarizer high in a degree of polarization.

In the present invention, the azo dye represented by formula (Ia) is a magenta azo dye, the azo dye represented by formula (Ib) is a yellow or magenta azo dye, and the azo dye represented by formula (Ic) is a cyan azo dye.

Among the above two or more azo dyes represented by formula (I) that can be contained in the composition, at least one azo dye is preferably an azo dye represented by formula (Ia).

Also, among the above two or more azo dyes represented by formula (I) that can be contained in the composition, at least one azo dye is preferably an azo dye represented by formula (Ib) or (Ic).

Also, the composition preferably contains at least one azo dye represented by formula (Ia) and at least one azo dye represented by formula (Ib) or (Ic).

Also, the composition preferably contains at least one azo dye represented by formula (Ib) and at least one azo dye represented by formula (Ic).

Further, the polarizer-forming composition more preferably contains at least one azo dye represented by formula (Ia), at least one azo dye represented by formula (Ib), and at least one azo dye represented by formula (Ic).

The composition may further contain a colorant, such as a dye other than the azo dyes represented by formula (I), to the extent that the effect of the present invention is not impaired. The dye(s) other than the azo dye represented by formula (I) is preferably selected from compounds exhibiting mesomorphism. As the dichroic dye which may be combined, for example, those described in "Dichroic Dyes for Liquid Crystal Display" (A. V. Ivashchenko, CRC, 1994) may be used.

In the composition, the content of the azo dye represented by formula (I) is preferably 80 mass % or more, and more preferably 90 mass % or more, based on the total content of all dyes to be contained. The upper limit of the content of the azo dye represented by formula (I) is 100 mass %, and namely, all the dyes to be contained may be, of course, the azo dyes represented by formula (I).

The content of the azo dye represented by formula (I) based on the total solid matters excluding a solvent contained in the composition, is preferably 20 mass % or more and more preferably 30 mass % or more. Though no particular limitation is imposed on the upper limit of the content, it is necessary to add the azo dye represented by formula (I) to some extent to produce the effect of hardening a polyfunctional monomer sufficiently. In light of this, the content of the azo dye represented by formula (I) in total solid matters excluding a solvent contained in the composition, is preferably 80 mass % or less and more preferably 50 mass % or less.

In the above GH type polarizer, a composition used for the formation thereof generally contains a liquid crystalline compound as the host in an amount of 90 mass % or more and a dye as the guest in an amount of about 1 to 5 mass %, based on the content of total solid matters.

[Polyfunctional Monomer Having a Radical Polymerizable Group]

The dichroic dye composition in the present invention preferably contains a polyfunctional monomer having a non-liquid-crystalline radical polymerizable group.

Any polymerizable polyfunctional monomer may be used as the polymerizable polyfunctional monomer contained in the dichroic dye composition in the present invention without any particular limitation insofar as it has compatibility with the dichroic dye and does not significantly throw a hindrance to the alignment of the dichroic dye.

Also, the above dichroic dye may have a polymerizable group as is clear from the above exemplified specific examples. When the dichroic dye has a polymerizable group, it may have a polymerizable group which causes the polymerizable polyfunctional monomer and dichroic dye to undergo a polymerization reaction to produce a covalent bond, or a polymerizable group which does not cause the polymerizable polyfunctional monomer and dichroic dye to undergo a polymerization reaction. In this case, the polymerizable polyfunctional monomers undergo a polymerization reaction among the polyfunctional monomers, so that the polymerizable dichroic dyes undergo a polymerization reaction among the dichroic dyes.

In the present invention, the polyfunctional monomer having a non-liquid-crystalline radical polymerizable group refers to a polyfunctional monomer with a growth activating species which radically undergoes a polymerization reaction, not showing the mesomorphism. This polyfunctional monomer is preferably one having two or more double bonds in its molecule, the double bond being more preferably an ethylenically (aliphatic) unsaturated double bond. Examples of the polyfunctional monomer may include polyfunctional monomers having functional groups such as alkene, diene, acrylate, methacrylate, diester of unsaturated polyvalent carboxylic acids, α,β-unsaturated carboxylic acid amides, unsaturated nitrile, styrene and its derivatives, vinyl ester and vinyl ether. The number of double bonds in a molecule is preferably 2 to 20, more preferably 2 to 15, and even more preferably 2 to 6. The polyfunctional monomer is preferably esters of polyols having two or more hydroxyl groups in its molecule and unsaturated fatty acids. Examples of the unsaturated fatty acid include acrylic acids, methacrylic acids, maleic acid and itaconic acid; and among these acids, acrylic acids and methacrylic acids are preferable. The polyols having four or more hydroxyl groups in its molecule are preferably tetravalent or higher-valent alcohols or oligomers of trivalent or higher-valent alcohols. The oligomer has a molecular structure in which polyvalent alcohols are connected by an ether bond, ester bond or urethane bond. Oligomers having a molecular structure in which polyvalent alcohols are connected by an ether bond are preferable.

The above polyfunctional monomer is particularly preferably those soluble in an organic solvent.

Examples of such a monomer may include compounds having a boiling point of 100° C. or more (preferably 150° C. to 400° C.) at normal pressure.

Examples of difunctional (meth)acrylate among the above polyfunctional monomers include ethylene glycol di(meth)acrylate, 1,6-hexanedioldi(meth)acrylate, 1,9-nonanedioldi(meth)acrylate, polypropylene glycol di(meth)acrylate, tetraethylene glycol di(meth)acrylate and bisphenoxyethanolfluorenediacrylate. Examples of commercial products thereof include ARONIX M-210, ARONIX M-240, and ARONIX M-6200 (trade names, manufactured by TOAGOSEI), KAYARAD HDDA, KAYARAD HX-220 and KAYARAD R-604 (trade names, manufactured by Nippon Kayaku), and Viscote 260, Viscote 3.12 and Viscote 335HP (trade names, manufactured by Osaka Organic Chemical Industry, Ltd.).

Examples of a tri- or more polyfunctional (meth)acrylate include trimethylolpropane tri(meth)acrylate, pentaerythritol tri(meth)acrylate, tri((meth)acryloyloxyethyl)phosphate, pentaerythritol tetra(meth)acrylate, dipentaerythritol penta(meth)acrylate, and dipentaerythritol hexa(meth)acrylate. Examples of commercial products thereof include ARONIX M-309, ARONIX M-400, ARONIX M-405, ARONIX M-450, ARONIX M-7100, ARONIX M-8030 and ARONIX M-8060 (trade names, manufactured by TOAGOSEI CO., LTD.), KAYARAD TMPTA, KAYARAD DPHA, KAYARAD DPCA-20, KAYARAD DPCA-30, KAYARAD DPCA-60 and KAYARAD DPCA-120 (trade names, manufactured by Nippon Kayaku CO., Ltd.), and Viscote 295, Viscote 300, Viscote 360, Viscote GPT, Viscote 3PA and Viscote 400 (trade names, manufactured by Osaka Organic Chemical Industry Ltd.).

Examples of two, tri- or more polyfunctional (meth)acrylates as another monomer or oligomer include: a polyethylene glycol di(meth)acrylate, polypropylene glycol di(meth)acrylate, trimethylolethane triacrylate, trimethylolpropane diacrylate, trimethylolpropane diacrylate, neopentyl glycol di(meth)acrylate, dipentaerythritol penta(meth)acrylate, hexanediol di(meth)acrylate, trimethylolpropane tri(acryloyloxypropyl)ether, tri(acryloyloxyethyl)isocyanurate, tri(acryloyloxyethyl)cyanurate, glycerin tri(meth)acrylate, tri((meth)acryloyloxyethyl) phosphate, dipentaerythritol penta(meth)acrylate, dipentaerythritol hexa(meth)acrylate; a polyfunctional acrylate or polyfunctional methacrylate which may be obtained by adding ethylene oxide or propylene oxide to a polyfunctional alcohol such as trimethylolpropane or glycerin and converting the adduct into a (meth)acrylate; poly(meth)acrylates of a polyether-series polyol; poly(meth)acrylates of a polyester-series polyol; and poly(meth)acrylates of a polyurethane-series polyol.

The monomers consisted of esters of polyols and acrylic acids are commercially available from Mitsubishi Rayon Co., Ltd., under the trade name of "Dia Beam UK-4154 and from Nippon Kayaku Co., Ltd., under the trade name of "KYARAD DPHA, SR355".

These difunctional or tri- or more functional (meth)acrylates may be used either singly or in combinations of two or more, and may be combined with a monofunctional (meth)acrylate.

Examples of the monofunctional (meth)acrylate include 2-hydroxyethyl(meth)acrylate, carbitol (meth)acrylate, isoboronyl(meth)acrylate, 3-methoxybutyl(meth)acrylate, 2-(meth)acryloyloxyethyl-2-hydroxypropyl phthalate, polyethylene glycol mono(meth)acrylate, polypropylene glycol mono(meth)acrylate, phenoxyethyl(meth)acrylate, and ethylene glycol(meth)acrylate. Examples of commercial products thereof include ARONIX M-101, ARONIX M-111, and ARONIX M-114 (trade names, manufactured by TOAGOSEI), KAYARAD TC-110S, and KAYARAD TC-120S (trade names, manufactured by Nippon Kayaku), and Viscote 158, and Viscote 2311 (trade names, manufactured by Osaka Organic Chemical Industry Ltd.).

It is preferable to fix the state of alignment of the dichroic dye when the light absorption anisotropic film is made as will be mentioned later, and as to the fixing means, the dichroic dye is fixed by utilizing a polymerization reaction. The polymerization reaction includes a thermal polymerization reaction using a thermal polymerization initiator and a photopolymerization reaction using a photopolymerization initiator. Among these methods, the photopolymerization reaction is preferable to prevent the support from being deformed or denatured by heat.

The total content of the dichroic dye and polymerizable polyfunctional monomer is preferably 70 mass %, more preferably 80 mass %, and most preferably 90 mass % in the dichroic dye composition used in the present invention.

Moreover, in the composition used in the present invention, the ratio by mass of the content of the dichroic dye to the content of the polymerizable polyfunctional monomer is preferably (1 to 99): (99 to 1), and more preferably (20 to 80): (80 to 20).

[Polymerization Initiator]

In the dichroic dye composition used in the present invention, a polymerization initiator is preferably contained.

As the polymerization initiator, an ordinary one may be preferably used corresponding to photopolymerization and thermal polymerization. Examples of the photopolymerization initiator include α-carbonyl compounds (described in U.S. Pat. Nos. 2,367,661 and 2,367,670), acyloin ethers (described in U.S. Pat. No. 2,448,828), α-hydrocarbon-substituted aromatic acyloin compounds (described in U.S. Pat. No. 2,722,512), polynuclear quinone compounds (described in U.S. Pat. Nos. 3,046,127 and 2,951,758), combinations of a triarylimidazole dimer with p-aminophenyl ketone (described in U.S. Pat. No. 3,549,367), acridine and phenazine compounds (described in JP-A-60-105667 and U.S. Pat. No. 4,239,850) and oxadiazol compounds (described in U.S. Pat. No. 4,212,970).

It is preferable to use the photopolymerization initiator in an amount of from 0.01 to 20 mass %, more preferably from 1 to 10 mass %, based on the solid matters in the coating liquid.

It is possible to refer to descriptions from paragraph Nos. [0050] to [0051] in JP-A-2001-91741 with respect to various matters of the polymerization initiator such as examples of the photopolymerization initiator, a proper amount of the photopolymerization initiator to be used or proper photo-irradiation energy for polymerization.

(Other Additives in the Dichroic Dye Composition)

Besides the above dichroic dye, organic solvents and optional additives may be formulated and combined in the dichroic dye composition to be used in the present invention. Examples of the additive include an non-liquid-crystalline binder polymer, an anti-unevenness-by-wind agent, an anti-cissing agent, an additive to control the tilt angle of an alignment film (tilt angle of the dichroic dye at the interface of the light absorption anisotropic film/the alignment film), an additive to control the tilt angle of air interface (tilt angle of the dichroic dye at the interface of the light absorption anisotropic film/air), an additive (plasticizers) for decreasing an alignment temperature, saccharides, and a chemical agent or so having at least any function of an antifungal activity, an antibacterial activity and a sterilization activity. In the following, a description will be made about each additive.

[Non-Liquid-Crystalline Binder Polymer]

A non-liquid-crystalline binder polymer may be added to the dichroic dye composition to be used in the present invention. Examples of the non-liquid-crystalline polymer include acryl type resins such as a polyacrylonitrile, polyacrylate and polyacrylamide; polystyrene resins; polyvinylacetal type resins such as a polyvinylacetoacetal and polyvinylbutyral; modified cellulose type resins such as ethyl cellulose, hydroxyethyl cellulose, ethyl hydroxycellulose, hydroxypropyl cellulose, ethyl hydroxyethyl cellulose, methyl cellulose, cellulose acetate, cellulose acetobutyrate, cellulose acetopropionate and cellulose nitrate; cellulose type resins such as nitrocellulose, ethylhydroxyethyl cellulose and ethyl cellulose; polyurethane resins; polyamide resins; polyester resins; polycarbonate resins; phenoxy resins; phenol resins; epoxy resins; and various elastomers. These compounds may be used either independently or in combinations of two or more. Copolymers of these compounds may be used.

As the non-liquid-crystalline binder polymer, particularly, acryl type polymers (resins having an acryl type copolymer or styrene type copolymer as its principle chain) are preferable. These acryl polymers are more preferably soluble in an organic solvent.

For example, a method according to the ordinary radical polymerization method may be applied to the production of an acryl polymer. Polymerization conditions such as temperature, pressure, the type and amount of a radical initiator and the type of solvent in the production using a radical polymerization method can be easily designed by a person skilled in the art and can be determined experimentally.

Specific examples of the copolymer component of the above acryl type copolymer may include unsaturated carboxylic acids (for example, (meth)acrylic acid, crotonic acid, itaconic acid, maleic acid and fumaric acid), aromatic vinyl compounds (for example, styrene, α-methylstyrene, vinyltoluene, 2-vinylpyridine, 4-vinylpyridine and N-vinylimidazole), alkyl(meth)acrylates (for example, methyl(meth)acrylate, ethyl(meth)acrylate, n-butyl(meth)acrylate, i-butyl(meth)acrylate, hexyl(meth)acrylate, cyclohexyl(meth)acrylate and dodecyl(meth)acrylate), alkyl aryl(meth)acrylate (for example, benzyl(meth)acrylate), substituted alkyl(meth)acrylates (for example, glycidyl(meth)acrylate and 2-hydroxyethyl(meth)acrylate), vinyl carboxylates (for example, vinyl acetate and vinyl propionate), vinyl cyanide (for example, (meth)acrylonitrile and α-chloroacrylonitrile) and aliphatic conjugate dienes (for example, 1,3-butadiene and isoprene). Among these compounds, unsaturated carboxylic acids, aromatic vinyl compounds, alkyl(meth)acrylates, alkyl aryl(meth)acrylates and vinyl carboxylates are preferable. Here, the (meth)acrylic acid is a generic name for acrylic acids and methacrylic acids, and similarly, (meth)acrylate is a generic name for acrylate and methacrylate as follows.

Further, acryl type polymers having a (meth)acryloyl group at its side chain and acryl type graft polymers containing, as a copolymer component, a macromonomer (for example, a polystyrene macromonomer, polymethylmethacrylate macromonomer, polyethylene glycol mono(meth)acrylate, polypropylene glycol mono(meth)acrylate and polyethylene glycol polypropylene glycol mono(meth)acrylate) are given as preferable examples.

These compounds may be used either independently or in combinations of two or more.

[Anti-Unevenness-by-Wind Agent]

Fluorine based polymers are suitably employable in general as a material for preventing unevenness by wind in a coating process as a coating liquid consisted of the dichroic composition used together with the dichroic dye used in the present invention. The fluorine based polymers to be used are not particularly limited so long as not furiously obstruct a tilt angle change or alignment of the dichroic dye. JP-A-2004-198511, JP-A-2004-333852, JP-A-2005-179636 and JP-A-2005-206638 disclose about examples of the fluorine based polymer usable as the anti-unevenness-by-wind agent. Using fluorine based polymer together with the dichroic dye enables to display images of high display quality without generating the unevenness. Further, coating properties such as a cissing or so can be also improved. The addition amount of the fluorine based polymer used for the purpose of preventing the unevenness by wind without disturbing the alignment of the dichroic dye is, in general, preferably within the range of 0.1 to 2 mass % with respect to the dichroic dye; more preferably within the range of 0.1 to 1 mass %, and furthermore preferably within the range of 0.4 to 1 mass %.

[Anti-Cissing Agent]

Polymers are usually used as a material for preventing cissing while coating the dichroic dye composition used in the present invention. Any polymers, which can be mixed with the dichroic dye compatibly, can be used unless they change the tilt angle of the dichroic dye or inhibit alignment of the dichroic dye substantially. Examples of the polymer, which can be used as an anti-cissing agent, include the polymers disclosed in JP-A-8-95030, and especially preferred examples of the polymer include cellulose esters. Examples of the cellulose ester include cellulose acetate, cellulose acetate propionate, hydroxypropyl cellulose and cellulose acetate butyrate. Preventing the anti-cissing agent from inhibiting alignment of the dichroic dye, in usual, the amount of the polymer as the anti-cissing agent is preferably from 0.1 to 10 mass %, more preferably from 0.1 to 8 mass % and much more preferably from 0.1 to 5 mass % with respect to the amount of the dichroic dye.

[Agent for Controlling Tilt Angle of Alignment Film]

Any compound having both of a polar group and a non-polar group in its molecule may be added to the dichroic dye composition used in the present invention for controlling a tilt angle of an alignment film. Examples of the compound having both of a polar group and a non-polar group in its molecule include $P^O$—OH, $P^O$—COOH, $P^O$—O—$P^O$, $P^O$—$NH_2$, $P^O$—NH—$P^O$, $P^O$—SH, $P^O$—S—$P^O$, $P^O$—CO—$P^O$, $P^O$—COO—$P^O$, $P^O$—CONH—$P^O$, $P^O$—CONHCO—$P^O$, $P^O$—$SO_3H$, $P^O$—$SO_3$—$P^O$, $P^O$—$SO_2NH$—$P^O$, $P^O$—$SO_2NHSO_2$—$P^O$, $P^O$—C=N—$P^O$, HO—P(—$OP^O$)$_2$, (HO—)$_2$PO—$OP^O$, P(—$OP^O$)$_3$, HO—PO(—$OP^O$)$_2$, (HO—)$_2$PO—$OP^O$, PO(—$OP^O$)$_3$, $P^O$—$NO_2$ and $P^O$—CN; and organic salts thereof. Examples of the organic salts include organic salts of the above-described compound such as ammoniums, carboxylates, sulfonates; and pyridinium salts. Among these, $P^O$—OH, $P^O$—COOH, $P^O$—O—$P^O$, $P^O$—$NH_2$, $P^O$—$SO_3H$, HO—PO(—$OP^O$)$_2$, (HO—)$_2$PO—$OP^O$, PO(—$OP^O$)$_3$ and organic salts thereof are preferred. Herein, $P^O$ represents a non-polar group. When there are plurality of $P^O$, each $P^O$ may be the same with, or different from each other.

Examples of $P^O$ include an alkyl group (preferably a linear, branched or cyclic, substituted or unsubstituted alkyl group having 1 to 30 carbon atoms), an alkenyl group (preferably a linear, branched or cyclic, substituted or unsubstituted alkenyl group having 1 to 30 carbon atoms), an alkynyl group (preferably a linear, branched or cyclic, substituted or unsubstituted alkynyl group having 1 to 30 carbon atoms), an aryl group (preferably a substituted or unsubstituted aryl group having 6 to 30 carbon atoms) and a silyl group (preferably a substituted or unsubstituted silyl group having 3 to 30 carbon atoms). The non-polar group may have a substituent such as a halogen atom, an alkyl group (whose meaning includes a cycloalkyl group such as a monocyclo or bicyclo alkyl group), an alkenyl group (whose meaning include a cycloalkenyl group such as monocyclo or bicyclo alkenyl group), an alkynyl group, an aryl group, a heterocyclic group, a cyano group, a hydroxyl group, a nitro group, a carboxyl group, an alkoxy group, an aryloxy group, a silyloxy group, a heterocyclic oxy group, an acyloxy group, a carbamoyloxy group, an alkoxycarbonyloxy group, aryloxycarbonyloxy group, an amino group (whose meaning includes an anilino group), an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic thio group, a sulfamoyl group, a sulfo group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an arylazo group, a heterocyclic azo group, an imido group, a phosphino group, a phosphinyl group, a phosphinyloxy group, a phosphinylamino group and a silyl group.

In the present invention, adding an agent for controlling a tilt angle of an alignment film into the coating liquid containing the dichroic dye composition and aligning the dichroic dye in the presence of the agent for controlling a tilt angle of an alignment film enable to adjust the tilt angle of the dichroic dye at an alignment film interface. The addition amount of the agent for controlling a tilt angle of an alignment film is, in general, preferably from 0.0001 mass % to 30 mass % with respect to the mass of the dichroic dye, more preferably from 0.001 mass % to 20 mass %, and further more preferably from 0.005 mass % to 10 mass %. In the present invention, an agent for controlling a tilt angle of an alignment film disclosed in JP-A-2006-58801 can be usable.

[Saccharides]

Saccharides may be added into the dichroic dye composition used in the present invention. The addition of the saccharides will enhance the association degree of a dye association, and will be able to elevate a molecular alignment of the dye as a result.

Examples of the saccharides include monosaccharides, disaccharides, polysaccharides and derivatives of them such as sugar alcohol. For the purpose of revealing the effect of the present invention, it is preferable that the number of hydroxy groups in the saccharides is usually 2 or more, preferably 3 or more and 18 or less, further preferably 12 or less in the viewpoint of the molecular association property. When the hydroxy group is too many, it is not preferable because mutual action with the dye becomes so strong that the hydroxy group precipitates and deteriorates the alignment of the dye film. When the hydroxy group is too few, it is also not preferable because the mutual action with the dyes is not enough to improve the alignment property.

The molecular weight of the saccharides is preferably 1,000 or less, and more preferably 700 or less. When the molecular weight of the saccharides is too large, a phase separation from the dye will occur, and it is not preferable because there is a fear of deteriorating the alignment property of the dye film.

The number of carbon atoms in the saccharides is usually 36 or less and preferably 24 or less. When the number of carbon atoms in the saccharides is too large, the molecular weight of the saccharides becomes so many that the phase separation from the dye will occur and it is not preferable because there is a fear of deteriorating the alignment property of the dye film.

Among the saccharides that can be used in the present invention, monosaccharides, oligosaccharides, and monosaccharide alcohol are preferable because they satisfy the above-mentioned optimum number of hydroxy groups and the optimum range of the molecular weight.

Examples of the monosaccharide include xylose, ribose, glucose, fructose, mannose, sorbose, and galactose.

Examples of the oligosaccharide include trehalose, kojibiose, nigerose, maltose, maltotriose, isomaltotriose, maltotetraose, isomaltose, sophorose, laminaribiose, cellobiose, gentiobiose, lactose, sucrose, melibiose, rutinose, primeverose, turanose, panose, isopanose, cellotriose, mannitriose, solatriose, melezitose, planteose, gentianose, umbelliferose, raffinose, and stachyose.

Examples of the sugar alcohol include compounds made by reducing the above-mentioned monosaccharides or oligosaccharides such as threitol, xylitol, ribitol, arabinitol, sorbitol, and mannitol.

Particularly preferable saccharides are xylose, mannose, maltose, maltotriose, and arabinitol.

There are optical isomers respectively in these saccharides and sugar alcohol. However, the optical isomer may be used alone in the composition used in the present invention; or both of the isomers may be contained into the composition used in the present invention. Further, only one kind of saccharide may be used in the composition used in the present invention, or two or more kinds of saccharides may be used in combination.

It is preferable that the content of the saccharides in the composition used in the present invention with respect to the dye is within the range of from 0.1 to 1 in mass ratio. The lower limit of the above content is more preferably 0.2, further preferably 0.3. The upper limit is more preferably 0.7, further preferably 0.6. When the content of the saccharide exceeds the upper limit, it is not preferable because there is a fear that an alignment degree of the association decreases. When the content is under the lower limit, it is also not preferable because there is a fear that the content is insufficient for increasing the association degree of the dye association.

[Antifungal Agent, Antibacterial Agent and Sterilizer]

A chemical agent having at least any of the function among antifungal activity, antibacterial activity and sterilization activity may be added into the dichroic dye composition used in the present invention. An addition of these additives enables to improve a storage stability of the composition.

The chemical agent having at least any of the function among the antifungal activity, the antibacterial activity and the sterilization activity in the present invention may be the one having at least any of antifungal capability of suppressing development/growth/breeding of mold, sterilization capability causing extinct of microorganism, and antibacterial capability of suppressing development/growth/breeding of microorganism; and ordinary antifungal agent, bactericide, and antibacterial agent can be used. However, it is preferable that they do not deteriorate optical performance of the light absorption anisotropic film used in the present invention. Examples of the chemical agent having at least any of the function among antifungal activity, antibacterial activity and sterilization activity that can be used in the present invention include phenolic series such as conventional 2,4,4'-trichloro-2'-hydroxydiphenyl, chloride series such as chlorine dioxide, iodine series such as iodine, and quaternary ammonium salt series such as benzalkonium chloride.

Further, the examples include Proxel BDN, Proxel BD20, Proxel GXL, Proxel LV, Proxel XL, Proxel XL2 and Proxel Ultra10 (manufactured by Avecia Ltd., trade names) as the chemical agent containing, as an effective component, 1,2-benzisothiazoline-3-one; Proxel IB (manufactured by Avecia Ltd, trade name) as the chemical agent containing, as an effective component, polyhexamethylene biguanide hydrochloride; and Densil P (manufactured by Avecia Ltd, trade name) as the chemical agent containing, as an effective component, dithio-2,2'-bis(benzmethylamide).

Also, the following compounds are more preferable because they have an antibacterial effect even in a very small amount.

No. Name of the Compound
1. 2-chloromethyl-5-chloro-3-isothiazolon
2. 2-cyanomethyl-5-chloro-3-isothiazolon
3. 2-hydroxymethyl-5-chloro-3-isothiazolon
4. 2-(3-methylcyclohexyl)-3-isothiazolon
5. 2-(4-chlorophenyl)-4,5-dichloro-3-isothiazolon
6. 2-(4-ethylphenyl)-3-isothiazolon
7. 2-(4-nitrophenyl)-5-chloro-3-isothiazolon
8. 2-chloromethyl-3-isothiazolon
9. 2-methoxyphenyl-4-methyl-5-chloro-3-isothiazolon
10. 2-morpholinomethyl-5-chloro-3-isothiazolon Those compounds are possibly synthesized with reference to, for example, JP-A-2-278. Alternatively, commercially available marketing products such as Tribactran (trade name; manufactured by Hoechst AG) are also utilizable.

In addition, only a single chemical agent having at least any of the function among the antifungal activity, antibacterial activity and sterilization activity to be used in the present invention may be used, or two or more kinds of chemical agents may be used in combination.

Although the content of the chemical agent having at least any of the function among the antifungal, the antibacterial activity and the sterilization activity contained in the dichroic dye composition is not limited in particular, it is usually 0.01 mass % or more, preferably 0.001 mass % or more and on the other hand, usually 0.5 mass % or less and preferably 0.3 mass % or less. When the content of the chemical agent having at least any of the function among the antifungal activity, the antibacterial activity and the sterilization activity is too little, the dichroic dye composition does not have a sufficient antifungal effect, antibacterial effect or sterilization effect. When the content is too much, because the chemical agent precipitates among the dichroic dye composition, and there is a fear that a phase separation occurs when the anisotropic dye film is formed, there is an anxiety of causing optical defect such as a point defect, light scattering or so.

Because the light absorption anisotropic film in the present invention has a high dichroic ratio, it is preferable that the dichroic dye composition used in the present invention contains Electron-Deficient disk-like compound and Electron-Rich compound. In the present invention, for example, compounds disclosed in JP-A-2006-323377 are usable as the Electron-Deficient disk-like compound and Electron-Rich compound.

When the total mass of the composition is settled to be 100 mass parts, the ratio of the Electron-Deficient disk-like compound in the composition used in the present invention is usually 0.1 mass parts or more, preferably 0.2 mass parts or more, usually 50 mass parts or less, and preferably 40 mass parts or less. When the amount of the above compound is too little, there is a fear that any effect due to the use of Electron-Deficient disk-like compound cannot be achieved. When the amount is too large, the viscosity of the composition as a solution becomes high, and it is not preferable because of its uneasy treating.

When the total mass of the composition is settled to be 100 mass parts, the ratio of the Electron-Rich compound in the composition used in the present invention is usually 50 mass parts or less, preferably 40 mass parts or less. When the amount of the compound is too large, the viscosity of the composition as a solution becomes high, and it is not preferable because of its uneasy treating.

Further, it is preferable that mass fraction of Electron-Deficient disk-like compound and Electron-Rich compound is usually within the range of from 10/90 to 90/10. When the mass fraction is not within the above range, it is not preferable because there is a fear that any effect due to the use of Electron-Deficient disk-shape compound or Electron-Rich compound cannot be achieved.

<Light Absorption Anisotropic Layer>

In the present invention, a coating liquid containing the above dichroic dye composition is applied to the surface of the support provided with an alignment film according to the need to form a light absorption anisotropic layer put into a wet state and then, the anisotropic layer is treated under reduced pressure to vaporize the organic solvent to dry the layer. A light absorption anisotropic layer having a high dichroic ratio can be thereby constituted.

The light absorption anisotropic layer in the present invention is formed of the above dichroic dye composition and there is the case where it also functions as the alignment layer of a transparent resin cured layer which will be explained later. A rod-like liquid crystalline compound or disk-shape liquid crystalline compound of a transparent resin cured layer which will be explained later is applied to the light absorption anisotropic layer, with the result that liquid crystalline compound is easily aligned.

<Support>

The support to be used for the present invention is a transparent support. The support preferably has a light transmission of 80% or more. The support is preferably selected from glasses or films formed of optically isotropic polymers. Alternatively, a color filter may be used as the support. Examples of such polymers or preferred embodiments of the support are same as those described in paragraph No. [0013] in JP-A-2002-22942. The films formed of the polymers, which are commonly known as easy to develop birefringence, such as polycarbonates or polysulfones, may be also used after being modified by the process described in WO00/26705 thereby to reduce the development of birefringence.

Polymer films of cellulose acetates having an acetylation rate from 55.0% to 62.5%, preferably from 57.0% to 62.0%, are preferably employed in the present invention. The preferred scope of acetylation rates and the preferred chemical structures of cellulose acetates are same as those described in paragraph No. [0021] in JP-A-2002-196146. It is disclosed in Journal of Technical Disclosure (Hatsumei Kyoukai Koukai Gihou) No. 2001-1745, published by Japan Institute of Invention and Innovation, cellulose acylate films produced by using chlorine-free solvents, and the cellulose acetate films described therein can be employed in the present invention.

The preferred scopes of the depth-retardation value and the birefringence value of the cellulose ester film to be used as a transparent support are described in paragraph Nos. [0018] to [0019] in JP-A-2002-139621.

In order to control the retardation of a polymer film as the transparent support, especially a cellulose acylate film, aromatic compounds having at least two aromatic rings may be used as an agent for increasing retardation. The preferred scope and the preferred amount of the aromatic compound are same as those describe in paragraph Nos. [0021] to [0023] in JP-A-2002-139621. Examples of such an agent for increasing retardation are described in WO 01/88574, WO 00/2619, JP-A-2000-111914, JP-A-2000-275434, JP-A-2002-70009, or the like.

The cellulose acylate film, produced by a solvent-casting method using a cellulose acylate solution (dope), is preferably used. The dope may further comprise the agent for increasing retardation, and such a dope is preferred. Multi-layered films can be produced by using the cellulose acylate solution (dope). The production of the films can be carried out according to the descriptions in paragraph Nos. [0038] to [0040] in JP-A-2002-139621.

Stretching treatment of the cellulose acylate film may be carried out in order to control its retardations. The stretch ratio is desirably from 3% to 100%. The cellulose acylate film is preferably stretched by tenders. For controlling the slow axis of the film to high accuracy, the deference in velocities, departure times and the like between of the left and right tenter clips are preferably as small as possible.

Plasticizers may be added to the cellulose ester films in order to improve the mechanical properties of the films and the drying speed. Examples of the plasticizer and the preferred scope of the plasticizers are same as those described in paragraph Nos. [0043] in JP-A-2002-139621.

Anti-degradation agents such as antioxidants, decomposers of peroxides, inhibitors of radicals, in-activators of metals, trapping agents of acids or amines, and UV ray protective agents, may be added to the cellulose acetate film. The anti-degradation agents are described in, for example, paragraph No. [0044] in JPA-2002-139621. The preferred example of the anti-degradation agent is butylated hydroxy toluene (BHT). The UV ray protective agents are described in, for example, JP-A-7-11056.

Surface treatment or measurement of solid-surface energy for the cellulose acylate film can be carried out according to the descriptions in paragraph Nos. [0051] to [0052] in JP-A-2002-196146.

The preferred thickness of the cellulose acylate film may vary depending on the application of the film, and, in usually, the thickness of the film is preferably from 5 to 500 μm, more preferably from 20 to 250 μm and most preferably from 30 to 180 μm. Especially, for being used in optical applications, the thickness of the cellulose acylate film is preferably from 30 to 110 μm.

<Alignment Film>

The alignment film which may be formed on the above support according to the need may be any layer insofar as it can provide desired alignment to the dichroic dye of the light absorption anisotropic layer provided on the alignment film. There have been provided the alignment film formed of various materials by various methods such as subjecting a film made of an organic compound (preferably a polymer) to a rubbing treatment, obliquely depositing an inorganic compound, forming a layer having microgrooves, or accumulating an organic compound (e.g., ω-trichosanic acid, dioctadecylmethylammonium chloride, methyl stearate) by Langmuir-Blodgett method (LB film). Alignment films having an alignment effect under an electric or magnetic field or photoirradiation are also known. Among them, alignment films prepared by subjecting a film of a polymer to a rubbing treatment are preferred from the view of controllability of a pretilt angle at an alignment film interface. The rubbing treatment is usually performed by rubbing the surface of the polymer layer in a direction several times with a paper or a cloth. And it is especially preferred that the rubbing treatment is carried out according to the method described in "Handbook of liquid Crystal (Ekisyo Binran)" published by MARUZEN on Oct. 30, 2000.

The thickness of the alignment film is preferably from 0.01 to 10 μm, and more preferably from 0.05 to 1 μm.

Various types of polymers which can be used for producing alignment films are described in various documents, and various polymers are commercially available. According to the present invention, alignment layers formed of polyvinyl alcohols or derivatives thereof are preferably used. Especially, alignment films formed of modified polyvinyl alcohols bonding with hydrophobic groups are preferable. Regarding various matters of the alignment film, it is possible to refer to the descriptions from line 24 of p. 43 to line 8 of p. 49 in WO 01/88574 A1.

There are many descriptions as to photo-alignment materials used for the alignment film to be formed by photo irradiation. Examples of the materials include azo compounds described in JP-A-2006-285197, JP-A-2007-76839, JP-A-2007-138138, JP-A-2007-94071, JP-A-2007-121721, JP-A-2007-140465, JP-A-2007-156439, JP-A-2007-133184, JP-A-2009-109831, Japanese Patent No. 3883848 and Japanese Patent No. 4151746; aromatic ester compounds described in JP-A-2002-229039; maleimide- and/or alkenyl-substituted nadiimide compound having a photo-alignment unit as described in JP-A-2002-265541 and JP-A-2002-

317013; photo-crosslinking silane derivatives described in Japanese Patent No. 4205195 and Japanese Patent No. 4205198; and photo-crosslinking polyimides, polyamides or esters described in JP-T-2003-520878, JP-T-2004-529220 and Japanese Patent No. 4162850. More preferable examples include azo compounds; and photo-crosslinking polyimide, polyamides and esters.

<Transparent Resin Cured Layer>

In the present invention, a transparent resin cured layer may be formed on the surface of the light absorption anisotropic layer to impart physical strength, durability or optical characteristics to the polarizing element. The layer thickness of the transparent resin cured layer is preferably 1 to 30 μm and more preferably 1 to 10 μm.

The transparent resin cured layer is preferably formed by a crosslinking reaction or polymerization reaction of an ionizing radiation-curable compound. The transparent resin cured layer in the present invention may be formed by applying a coating composition containing an ionizing radiation-curable polyfunctional monomer or polyfunctional oligomer to the surface of the light absorption anisotropic layer, and by allowing the polyfunctional monomer or polyfunctional oligomer to undergo a crosslinking reaction or polymerization reaction.

The functional group in the ionizing radiation-curable polyfunctional monomer or polyfunctional oligomer is preferably a photopolymerizable, electron ray-polymerizable or radiation-polymerizable functional group; particularly preferably photopolymerizable functional group.

Examples of the photopolymerizable functional group include unsaturated polymerizable functional groups such as (meth)acryloyl group, vinyl group, styryl group and allyl group. Preferred among these photopolymerizable functional groups is (meth)acryloyl group. Also, inorganic microparticles may be contained.

Specific examples of the photopolymerizable polyfunctional monomer having a photopolymerizable functional group include (meth)acrylic acid diesters of an alkylene glycol such as neopentyl glycol acrylate, 1,6-hexanediol(meth)acrylate and propylene glycol di(meth)acrylate; (meth)acrylic acid diesters of a polyoxyalkylene glycol such as triethyleneglycol di(meth)acrylate, dipropyleneglycol di(meth)acrylate, polyethyleneglycol di(meth)acrylate and polypropyleneglycol di(meth)acrylate; (meth)acrylic acid diesters of a polyvalent alcohol such as pentaerythritol di(meth)acrylate; and (meth)acrylic acid diesters of an ethylene oxide or propylene oxide adduct such as 2,2-bis{4-(acryloxy/diethoxy)phenyl}propane and 2-2-bis{4-(acryloxy/polypropoxy)phenyl}propane.

Further, epoxy(meth)acrylates, urethane(meth)acrylates and polyester(meth)acrylates are preferably used as photopolymerizable polyfunctional monomers.

In particular, esters of a polyvalent alcohol with a (meth)acrylic acid are preferred. Even more desirable are polyfunctional monomers having three or more (meth)acryloyl groups per molecule. Specific examples of these polyfunctional monomers include trimethylolpropane tri(meth)acrylate, trimethylolethane tri(meth)acrylate, 1,2,4-cyclohexane tetra(meth)acrylate, pentaglycerol triacrylate, pentaerythritol tetra(meth)acrylate, pentaerythritol tri(meth)acrylate, (di)pentaerythritol triacrylate, (di)pentaerythritol pentaacrylate, (di)pentaerythritol tetra(meth)acrylate, (di)pentaerythritol hexa(meth)acrylate, tripentaerythritol triacrylate, and tripentaerythritol hexatriacrylate. Two or more kinds of polyfunctional monomers may be used in combination.

(Polymerization Initiator)

As the polymerization initiator, a photopolymerization initiator is preferably used. Preferred examples of the photopolymerization initiator include photoradical polymerization initiator and photocationic polymerization initiator. Particularly preferred among these photopolymerization initiators is photoradical polymerization initiator.

Examples of the photoradical polymerization initiator include acetophenones, benzophenones, Michler's benzoyl benzoate, α-amyloximester, tetramethylthiuram monosulfide, and thioxanthones.

Examples of commercially available photoradical polymerization initiators include KAYACURE (e.g., DETX-S, BP-100, BDMK, CTX, BMS, 2-EAQ, ABQ, CPTX, EPD, ITX, QTX, BTC, and MCA (trade names)), produced by NIPPON KAYAKU; Irgacure (e.g., 651, 184, 127, 500, 907, 369, 1173, 2959, 4265, and 4263 (trade names)), produced by Ciba Specialty Chemicals; and Esacure (e.g., KIP100F, KB1, EB3, BP, X33, KT046, KT37, KIP150, and TZT (trade names)), produced by Sartomer Company, etc.

In particular, photo-cleavable photoradical polymerization initiators are preferred. These photo-cleavable photoradical polymerization initiators are described in Kazuhiro Takabo, "Saishin UV Koka gijutsu (Modern UV Curing Technology)", K. K. Gijutsu Joho Kyokai, page 159, 1991.

Examples of commercially available photo-cleavable photoradical polymerization initiators include Irgacure (e.g., 651, 184, 127, and 907 (trade names)), produced by Ciba Specialty Chemicals, Inc.

The photopolymerization initiator is preferably used in an amount of from 0.1 to 15 mass parts, more preferably from 1 to 10 mass parts based on 100 mass parts of the curable resin.

In addition to the photopolymerization initiator, a photosensitizer may be used. Specific examples of the photosensitizer include n-butylamine, triethylamine, tri-n-butylphosphine, Michler's ketone, and thioxanthone.

Examples of commercially available photosensitizers include KAYACURE (e.g., DMBI and EPA (trade names)), produced by NIPPON KAYAKU CO., LTD., etc.

The photopolymerization reaction is preferably carried out by irradiation with ultraviolet rays after the application and drying of the high refraction layer, to cure the resin.

An oligomer and/or polymer having a weight average molecular weight of 500 or more may be added to the transparent resin cured layer to impart brittleness.

Examples of the oligomer or polymer include a (meth)acrylate type, cellulose type or styrene type polymers; urethaneacrylate and polyesteracrylate. Preferable examples of the oligomer or polymer include a poly(glycidyl(meth)acrylate) and poly(allyl(meth)acrylate) having a functional group in its side chain.

The total amount of the oligomer and polymer in the transparent resin cured layer is preferably 5 to 80 mass %, more preferably 25 to 70 mass % and even more preferably 35 to 65 mass % based on the total mass of the resin layer.

The mechanical strength of the transparent resin cured layer is preferably H or harder, further preferably 2H or harder, and most preferably 3H or harder, in terms of the pencil hardness test, according to JIS K5400.

Further, it is preferable that the transparent resin cured layer is less in an abraded amount in a taber test according to JIS K7204, which means a test piece made of said transparent resin cured layer is less in the abraded amount after the test.

As to the formation of the transparent resin cured layer, when it is formed by a crosslinking reaction or polymerization reaction of an ionizing radiation-curable compound, the crosslinking reaction or polymerization reaction is preferably carried out in an atmosphere containing 10% by volume or less of oxygen. When the layer formation process is carried out in such an atmosphere, containing 10% by volume or less of oxygen, this is preferable because a transparent resin cured layer excellent in physical strength and durability can be formed.

The transparent resin cured layer is formed by a crosslinking reaction or polymerization reaction of an ionizing radiation-curable compound in an atmosphere containing, preferably 6% by volume or less of oxygen, more preferably 4% by volume or less of oxygen, even more preferably 2% by volume or less of oxygen and most preferably 1% by volume or less of oxygen.

As to the measures taken to reduce the concentration of oxygen to 10% by volume or less, it is preferable to substitute the atmosphere (concentration of nitrogen: about 79% by volume; concentration of oxygen: about 21% by volume) with other gaseous materials and more preferably with nitrogen (nitrogen purging).

The transparent resin cured layer is preferably constituted by applying a transparent resin cured layer-forming coating composition to the surface of the light absorption anisotropic layer.

The transparent resin cured layer in the present invention may be newly provided with an optical anisotropic function. Its details will be explained below.

[Transparent Resin Cured Layer Having an Optical Anisotropic Function]

As the compound contained in the composition used to form the transparent resin cured layer having an optical anisotropic function, a rod-like liquid crystalline compound or disk-like liquid crystalline compound having a polymerizable group is preferable; and a disk-like liquid crystalline compound having a polymerizable group is more preferable.

Specifically, the transparent resin cured layer having an optical anisotropic function preferably contains the disk-like liquid crystalline compound having a polymerizable group and at least one kind of compound represented by any one of formulae (1) to (3). Also, the transparent resin cured layer preferably has negative refractive index anisotropy and has an in-plane retardation of 0 to 10 nm, more preferably 0 to 5 nm and even more preferably 0 to 3 nm for the visible light. The retardation in the direction of the thickness is preferably 100 to 300 nm, more preferably 120 to 270 nm and even more preferably 150 to 240 nm. The transparent resin cured layer having such an optical anisotropy is useful as a VA-mode liquid crystal cell polarizing element.

[Transparent Resin Cured Layer Made of a Disk-Like Liquid Crystalline Compound]

The transparent resin cured layer may be constituted of, for example, a disk-like liquid crystalline compound. The transparent resin cured layer preferably contains the disk-like liquid crystalline compound and at least one kind of compound represented by any one of formulae (1), (2) and (3) which will be explained later as a horizontally aligning agent.

The disk-like liquid crystalline compound can be aligned substantially horizontally (average angle of inclination ranging from 0° to 10°) to the surface of the polymer film by combining at least one kind of compound represented by any one of formulae (1) to (3) which will be explained later. The disk-like liquid crystals are described in many references (for example, C. Destrade et al., Mol. Crysr. Liq. Cryst., Vol. 71, p. 111 (1981); Nippon Kagaku Kai (The Chemical Society of Japan), "Kikan Kagaku Sosetsu, No. 22, Ekisyo no Kagaku (Quaternary Chemical Review, No. 22, Chemistry of Liquid crystal)", Chapter 5 and Chapter 10, Subchapter 2 (1994); B. Kohne et al., Angew. Chem. Soc. Comm., p. 1794 (1985); J. Zhanget et al., J. Am. Chem. Soc., Vol. 116, p. 2655 (1994)). For the details of polymerization of disk-like liquid crystalline compound, reference can be made to JP-A-8-27284.

In order to fix the disk-like liquid crystalline compound by polymerization, the disk-like liquid crystalline compound preferably has polymerizable groups. In order to fix the disk-like liquid crystalline compound by polymerization, it is necessary that polymerizable groups be connected to the disk-shaped core of the disk-like liquid crystalline compound as substituents. However, when polymerizable groups are directly connected to the disk-shaped core, it is difficult to keep the disk-like liquid crystal molecules aligned as desired in the polymerization reaction. It is therefore preferred that connecting groups be incorporated in between the disk-shaped core and the polymerizable groups. That is, the disk-like liquid crystalline compound is preferably a compound represented by formula (4).

$$D(\text{-}L\text{-}P)_n \qquad \text{Formula (4)}$$

In formula (4), D represents a disc core; L represents a divalent linking group; P is a polymerizable group; and n represents an integer of 4 to 12.

Preferable examples of the disc core (D), the divalent linking group (L) and the polymerizable group (P) in formula (4) are (D1) to (D15), (L1) to (L25), and (P1) to (P18), respectively, described in JP-A-20014837; and the contents of the patent publication are preferably employed in the present invention.

Specifically, compounds represented by formula TE-8 are given as examples.

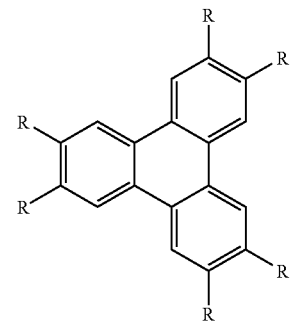

TE-8

(1)

$n\text{-}C_mH_{2m+1}O\text{---}$ (m = an integer of 2 to 15)

(2)

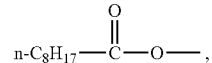

(3)

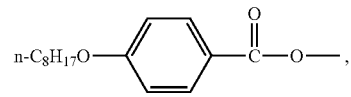

(4)

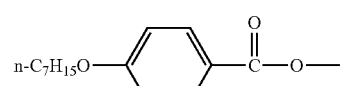

(5)

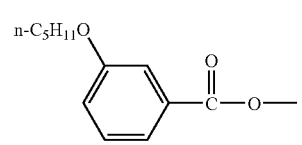

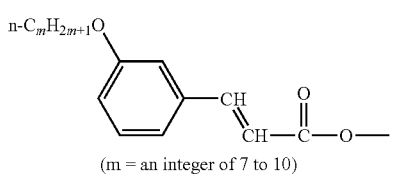

(6)

(m = an integer of 7 to 10)

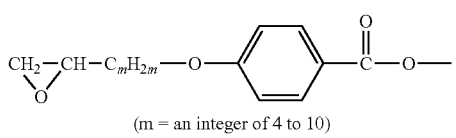

(7)

(m = an integer of 4 to 10)

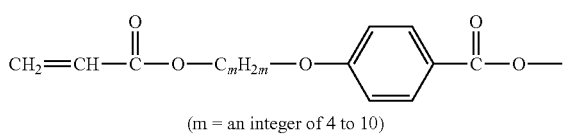

(8)

(m = an integer of 4 to 10)

In the case of a disk-like liquid crystalline compound having a polymerizable group, the liquid crystal is also preferably aligned substantially horizontally. The term "substantially horizontally" means that the average angle (average angle of inclination) of the disk plane of the disk-like liquid crystalline compound with the surface of the optical anisotropic layer is in a range from 0° to 10°.

Preferred examples of the disk-like liquid crystalline compound include those described from on line 6 of page 58 to on line 8 of page 65 in WO 01/88574 A1.

[Horizontally Aligning Agent]

The disk-like liquid crystalline compound forming the transparent resin cured layer can substantially attain horizontal alignment by combining at least one kind of compound represented by any one of formulae (1) to (3). The term "horizontal alignment" in the present invention means that the longitudinal direction (namely, the disk-plane of the core) of the disk-like liquid crystalline compound is parallel to the horizontal plane of the liquid crystal layer (the surface of an optical film when, for example, the liquid crystal layer is formed on the optical film). However, it is not required for the disk-like liquid crystalline compound to be strictly parallel to the horizontal plane of the liquid crystal layer. In this specification, the term "horizontal alignment" means that the disk-like liquid crystalline compound is aligned such that the horizontal plane of the core forms an angle of less than 10° with the horizontal plane. The angle of inclination is preferably 5° or less, more preferably 3° or less, even more preferably 2° or less and most preferably 1° or less.

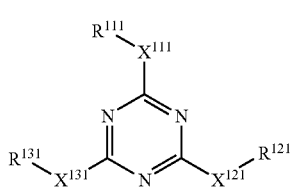

Formula (1)

In formula (1), $R^{111}$, $R^{121}$ and $R^{131}$ each independently represent a hydrogen atom or a substituent; and $X^{111}$, $X^{121}$ and $X^{131}$ each independently represent a single bond or a divalent linking group.

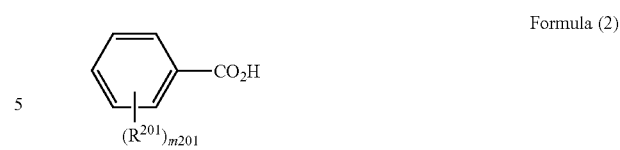

Formula (2)

In formula (2), $R^{201}$ represents a substituent; m201 represents an integer of 0 to 5; and when $m_{201}$ is an integer of 2 or more, $R^{201}$s are the same as or different from each other.

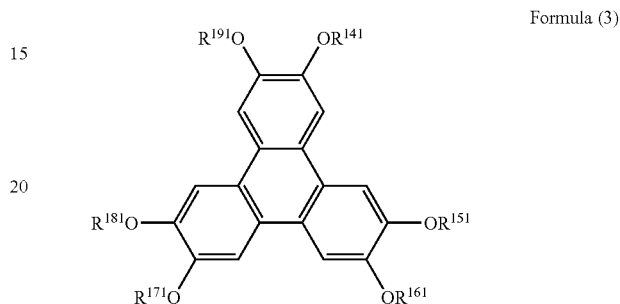

Formula (3)

In formula (3), $R^{141}$, $R^{151}$, $R^{161}$, $R^{171}$, $R^{181}$ and $R^{191}$ each independently represent a hydrogen atom or a substituent.

The compounds represented by any one of formulae (1) to (3) are described below in detail.

Examples of the substituent represented by $R^{111}$, $R^{121}$ or $R^{131}$ include alkyl groups (e.g., alkyl groups preferably having 1 to 40 carbon atoms, more preferably 1 to 30, and particularly preferably 1 to 20, such as methyl, ethyl, isopropyl, tert-butyl, n-octyl, n-decyl, n-hexadecyl, cyclopropyl, cyclopentyl and cyclohexyl groups, and the like), alkenyl groups (e.g., alkenyl groups preferably having 2 to 40 carbon atoms, more preferably 2 to 30, and particularly preferably 2 to 20, such as vinyl, allyl, 2-butenyl and 3-pentenyl groups, and the like), alkynyl groups (e.g., alkynyl groups preferably having 2 to 40 carbon atoms, more preferably 2 to 30, and particularly preferably 2 to 20, such as propargyl and 3-pentynyl groups, and the like), aryl groups (e.g., aryl groups preferably having 6 to 30 carbon atoms, more preferably 6 to 20, and particularly preferably 6 to 12, such as phenyl, p-methylphenyl and naphthyl groups and the like), substituted or unsubstituted amino groups (e.g., amino groups preferably having 0 to 40 carbon atoms, more preferably 0 to 30, and particularly preferably 0 to 20, such as unsubstituted amino, methylamino, dimethylamino, diethylamino and anilino groups and the like), alkoxy groups (e.g., alkoxy groups preferably having 1 to 40 carbon atoms, more preferably 1 to 30, and particularly preferably 1 to 20, such as methoxy, ethoxy and butoxy groups and the like), aryloxy groups (e.g., aryloxy groups preferably having 6 to 40 carbon atoms, more preferably 6 to 30, and particularly preferably 6 to 20, such as phenyloxy and 2-naphthyloxy groups and the like), acyl groups (e.g., acyl groups preferably having 1 to 40 carbon atoms, more preferably 1 to 30, and particularly preferably 1 to 20, such as acetyl, benzoyl, formyl and pivaloyl groups and the like), alkoxycarbonyl groups (e.g., alkoxycarbonyl groups preferably having 2 to 40 carbon atoms, more preferably 2 to 30, and particularly preferably 2 to 20, such as methoxycarbonyl and ethoxycarbonyl groups and the like), aryloxycarbonyl groups (e.g., aryloxycarbonyl groups preferably having 7 to 40 carbon atoms, more preferably 7 to 30, and particularly preferably 7 to 20, such as phenyloxycarbonyl group and the like), acyloxy groups (e.g., acyloxy groups preferably having 2 to 40 carbon atoms, more preferably 2 to 30, and particularly preferably 2 to 20, such as acetoxy and benzoyloxy groups and the like), acylamino groups (e.g., acylamino groups preferably having 2 to 40 carbon atoms, more preferably 2 to 30, and particularly preferably 2 to 20, such as acetylamino and benzoylamino groups, and the like), alkoxycarbonylamino groups (e.g., alkoxycarbonylamino groups preferably having 2 to 40 carbon atoms, more preferably 2 to 30, and particularly preferably 2 to 20, such as methoxycarbonylamino group and the like), aryloxycarbonylamino groups (e.g., aryloxycarbonylamino groups preferably having 7 to 40 carbon atoms, more preferably 7 to 30, and particularly preferably 7 to 20, such as phenyloxycarbonylamino group and the like), sulfonylamino groups (e.g., sulfonylamino groups preferably having 1 to 40 carbon atoms, more preferably 1 to 30, and particularly preferably 1 to 20, such as methanesulfonylamino and benzenesulfonylamino groups, and the like), sulfamoyl groups (e.g., sulfamoyl groups preferably having 0 to 40 carbon atoms, more preferably 0 to 30, and particularly preferably 0 to 20, such as sulfamoyl, methylsulfamoyl, dimethylsulfamoyl and phenylsulfamoyl groups, and the like), carbamoyl groups (e.g., carbamoyl groups preferably having 1 to 40 carbon atoms, more preferably 1 to 30, and particularly preferably 1 to 20, such as unsubstituted carbamoyl, methylcarbamoyl, diethylcarbamoyl and pheylcarbamoyl groups, and the like), alkylthio groups (e.g., alkylthio groups preferably having 1 to 40 carbon atoms, more preferably 1 to 30, and particularly preferably 1 to 20, such as phenylthio group and the like), sulfonyl groups (e.g., sulfonyl groups preferably having 1 to 40 carbon atoms, more preferably 1 to 30, and particularly preferably 1 to 20, such as mesyl and tosyl groups and the like), sulfinyl groups (e.g., sulfinyl groups preferably having 1 to 40 carbon atoms, more preferably 1 to 30, and particularly preferably 1 to 20, such as methanesulfinyl and benzenesulfinyl groups, and the like), ureido groups (e.g., ureido groups preferably having 1 to 40 carbon atoms, more preferably 1 to 30, and particularly preferably 1 to 20, such as unsubstituted ureido, methylureido and phenylureido groups, and the like), phosphoramido groups (e.g., phosphoramido groups preferably having 1 to 40 carbon atoms, more preferably 1 to 30, and particularly preferably 1 to 20, such as diethylphosphoramido and phenylphosphoramido groups and the like), a hydroxy group, a mercapto group, halogen atoms (e.g., fluorine atom, chlorine atom, bromine atom, iodine atom), a cyano group, a sulfo group, a carboxyl group, a nitro group, a hydroxamic acid group, a sulfino group, a hydrazino group, an imino group, heterocyclic groups (e.g., heterocyclic groups preferably having 1 to 30 carbon atoms, more preferably 1 to 12, and having one or more heteroatoms such as of nitrogen, oxygen, and sulfur, such as imidazolyl, pyridyl, quinolyl, furyl, piperidyl, morpholino, benzoxazolyl, benzimidazolyl, benzothiazolyl and 1,3,5-triazyl groups and the like), silyl groups (e.g., silyl groups preferably having 3 to 40 carbon atoms, more preferably 3 to 30, and particularly preferably 3 to 24, such as trimethylsilyl, triphenylsilyl groups and the like), and others. These substituents may further be substituted. When two or more substituents are present, the substituents may be the same as or different from each other. Alternatively, they may bind to each other, forming a ring, if possible.

The substituent represented by any one of $R^{111}$, $R^{121}$ and $R^{131}$ is preferably an alkyl group, an aryl group, a substituted or unsubstituted amino group, an alkoxy group, an alkylthio group or a halogen atom.

The divalent linking group represented by $X^{111}$, $X^{121}$ and $X^{131}$ is preferably an alkylene group, an alkenylene group, a divalent aromatic group, a divalent heterocyclic residual group, —CO—, —$NR^a$—, ($R^a$ represents an alkyl group having 1 to 5 carbon atoms or a hydrogen atom), —O—, —S—, —SO—, —$SO_2$— or a divalent connecting group selected from the group consisting of combinations of these groups. The divalent linking group is more preferably an alkylene group, a phenylene group, —CO—, —$NR^a$—, —O—, —S—, —$SO_2$— or a group obtained by combining at least two divalent linking groups selected from the group consisting of these groups. The number of carbon atoms of the alkylene group is preferably 1 to 12. The number of carbon atoms of the alkenylene group is preferably 2 to 12. The number of carbon atoms of the divalent aromatic group is preferably 6 to 10. The alkylene group, alkenylene group and divalent aromatic group may be substituted with the group exemplified by the substituent (for example, an alkyl group, a halogen atom, a cyano group, an alkoxy group and an acyloxy group) of the aforementioned $R^{111}$, $R^{121}$ and $R^{131}$.

The compound represented by formula (1) is particularly preferably a compound represented by formula (1a) or (1b).

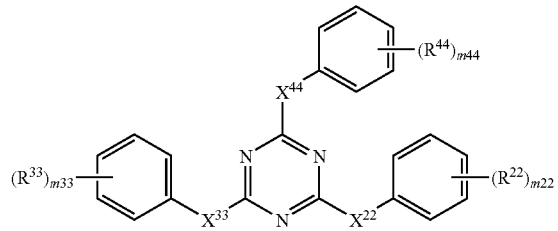

Formula (1a)

In formula (1a), $R^{22}$, $R^{33}$ and $R^{44}$ each independently represent a hydrogen atom or a substituent; $X^{22}$, $X^{33}$ and $X^{44}$ each independently represent —NH—, —O— or —S—; and $m_{22}$, $m_{33}$ and $m_{44}$ each independently represent an integer of 1 to 3.

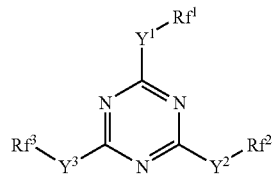

Formula (1b)

In formula (1b), $Rf^1$, $Rf^2$ and $Rf^3$ each independently represent an alkyl group having $CF_3$ group(s) or $CF_2H$ group(s) at its terminal; $Y^1$, $Y^2$ and $Y^3$ each independently represent an alkylene group, —CO—, —NH—, —O—, —S—, —$SO_2$— or a group obtained by combining at least two divalent linking groups selected from the group consisting of these groups.

First, the compound represented by formula (1a) is explained.

$R^{22}$, $R^{33}$ and $R^{44}$ have the same meanings as $R^{111}$, $R^{121}$ and $R^{131}$ in the formula (1), respectively, and the preferable ranges thereof are also the same. $R^{22}$, $R^{33}$ and $R^{44}$ each are preferably an alkoxy group having $CF_3$ group(s) or $CF_2H$ group(s) at its terminal. The alkoxy group may be a straight chain form or a branched chain form. The number of carbon atoms in the alkoxy group is preferably from 4 to 20, more preferably from 4 to 16, and particularly preferably from 6 to 16. The alkoxy group having $CF_3$ group(s) or $CF_2H$ group(s) at its terminal is an alkoxy group in which hydrogen atoms are partially or entirely replaced by fluorine atoms. In this case, the hydrogen atoms in the alkoxy group are replaced by fluorine atoms in a ratio of preferably 50% or more, more preferably 60% or more, and particularly preferably 70% or more. Specific examples of the alkoxy group having $CF_3$ group(s) or $CF_2H$ group(s) at its terminal represented by $R^{22}$, $R^{33}$ and $R^{44}$ are shown below, but the present invention is not limited to these.

R1: n-$C_8F_{17}$—O—
R2: n-$C_6F_{13}$—O—
R3: n-$C_4F_9$—O—
R4: n-$C_8F_{17}$—$(CH_2)_2$—O—$(CH_2)_2$—O—
R5: n-$C_6F_{13}$—$(CH_2)_2$—O—$(CH_2)_2$—O—
R6: n-$C_4F_9$—$(CH_2)_2$—O—$(CH_2)_2$—O—
R7: n-$C_8F_{17}$—$(CH_2)_3$—O—
R8: n-$C_6F_{13}$—$(CH_2)_3$—O—
R9: n-$C_4F_9$—$(CH_2)_3$—O—
R10: H—$(CF_2)_8$—O—
R11: H—$(CF_2)_6$—O—
R12: H—$(CF_2)_4$—O—
R13: H—$(CF_2)_8$—$(CH_2)$—O—
R14: H—$(CF_2)_6$—$(CH_2)$—O—
R15: H—$(CF_2)_4$—$(CH_2)$—O—
R16: H—$(CF_2)_8$—$(CH_2)$—O—$(CH_2)_2$—O—
R17: H—$(CF_2)_6$—$(CH_2)$—O—$(CH_2)_2$—O—
R18: H—$(CF_2)_4$—$(CH_2)$—O—$(CH_2)_2$—O—

In formula (1a), $X^{22}$, $X^{33}$ and $X^{44}$ each preferably represent —NH— or —O—; more preferably —NH—. $m_{22}$, $m_{33}$ and $m_{44}$ each are preferably 2.

Next, the compounds represented by formula (1b) are explained.

The alkyl group having $CF_3$ group(s) or $CF_2H$ group(s) at its terminal represented by $Rf^1$, $Rf^2$ and $Rf^3$ each independently represent a substituted or unsubstituted alkyl group. The alkyl group may be a straight chain form or a branched chain form. The number of carbon atoms in the alkyl group is preferably from 4 to 20, more preferably from 4 to 16, and particularly preferably from 6 to 16. The alkyl group having $CF_3$ group(s) or $CF_2H$ group(s) at its terminal is an alkyl group in which hydrogen atoms are partially or entirely replaced by fluorine atoms. In this case, the hydrogen atoms in the alkyl group are replaced by fluorine atoms in a ratio of preferably 50% or more, more preferably 60% or more, and particularly preferably 70% or more. Specific examples of the alkyl group having $CF_3$ group(s) or $CF_2H$ group(s) at its terminal represented by $Rf^1$, $Rf^2$ and $Rf^3$ are shown below, but the present invention is not limited to these.

Rf1: n-$C_8F_{17}$—
Rf2: n-$C_6F_{13}$—
Rf3: n-$C_4F_9$—
Rf4: n-$C_8F_{17}$—$(CH_2)_2$—
Rf5: n-$C_6F_{13}$—$(CH_2)_2$—
Rf6: n-$C_4F_9$—$(CH_2)_2$—
Rf7: H—$(CF_2)_8$—
Rf8: H—$(CF_2)_6$—
Rf9: H—$(CF_2)_4$—
Rf10: H—$(CF_2)_8$—$(CH_2)$—
Rf11: H—$(CF_2)_6$—$(CH_2)$—
Rf12: H—$(CF_2)_4$—$(CH_2)$—

$Y^1$, $Y^2$ and $Y^3$ each independently preferably represent an alkylene group, —NH—, —O—, —S— or a group obtained by combining at least two divalent linking groups selected from the group consisting of these groups; more preferably an alkylene group, —NH—, —O— or a group obtained by combining at least two divalent linking groups selected from the group consisting of these groups; and most preferably —NH—, —O—, —NH$(CH_2)_n$—O— (in which n represents an integer from 1 to 8, most preferably 3; and this group is connected to the triazine ring through the nitrogen atom).

Next, the compounds represented by formula (2) are explained.

The substituent represented by $R^{201}$ has the same meaning as those represented by $R^{111}$, $R^{121}$ and $R^{131}$ in the formula (1), and the preferable range thereof is also the same. $m_{201}$ is preferably an integer of 1 to 3, more preferably an integer of 2 or 3.

The compound represented by formula (2) is particularly preferably a compound represented by formula (2a).

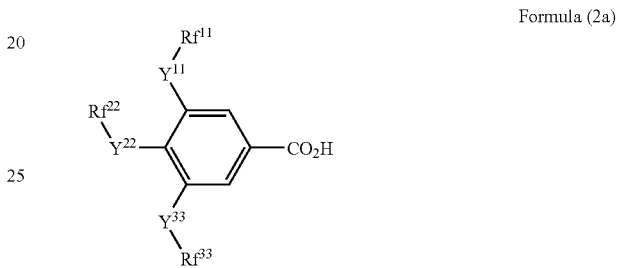

Formula (2a)

In formula (2a), $Rf^{11}$, $Rf^{22}$ and $Rf^{33}$ each independently represent an alkyl group having $CF_3$ group(s) or $CF_2H$ group(s) at its terminal; $Y^{11}$, $Y^{12}$ and $Y^{13}$ each independently represent an alkylene group, —CO—, —NH—, —O—, —S—, —$SO_2$— or a group obtained by combining at least two divalent linking groups selected from the group consisting of these groups.

The alkyl group having $CF_3$ group(s) or $CF_2H$ group(s) at its terminal represented by $Rf^{11}$, $Rf^{22}$ and $Rf^{33}$ have the same meanings as that of the alkyl group having $CF_3$ group(s) or $CF_2H$ group(s) at its terminal represented by $Rf^1$, $Rf^2$ and $Rf^3$ in the formula (1b), respectively, and the preferable ranges thereof are also the same.

$Y^{11}$, $Y^{22}$ and $Y^{33}$ have the same meanings as $Y^1$, $Y^2$ and $Y^3$ in the formula (1b), respectively, and the preferable ranges thereof are also the same. $Y^{11}$, $Y^{22}$ and $Y^{33}$ each are most preferably an alkylene group, —O— or a group obtained by combining at least two divalent linking groups selected from these groups.

Next, the compounds represented by formula (3) are explained.

Examples of the substituent represented by $R^{141}$, $R^{151}$, $R^{161}$, $R^{171}$, $R^{181}$ and $R^{191}$ include an alkyl group, an alkenyl group, an alkynyl group, an aryl group, a substituted or unsubstituted amino group, an acyl group, an alkoxycarbonyl group, an aryloxycarbonyl group, an acylamino group, an alkoxycarbonylamino group, an aryloxycarbonylamino group, a sulfonylamino group, a sulfamoyl group, a carbamoyl group, a sulfonyl group, a heterocyclic group and a silyl group, among the substituents given as the substituent represented by $R^{111}$, $R^{121}$ and $R^{131}$ in formula (1), and the preferable range is also the same.

The compound represented by formula (3) is particularly preferably a compound represented by formula (3a).

Formula (3a)

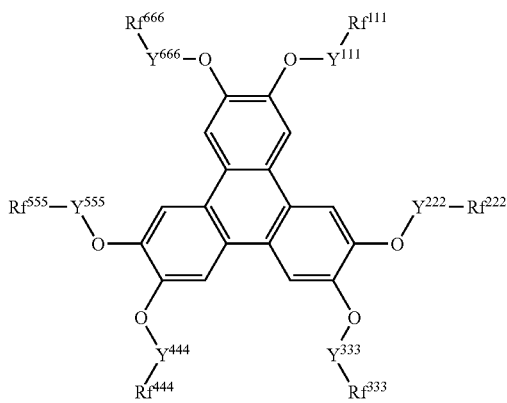

In formula (3a), $Rf^{111}$, $Rf^{222}$, $Rf^{333}$, $Rf^{444}$, $R^{555}$ and $Rf^{666}$ each represent an alkyl group having $CF_3$ group(s) or $CF_2H$ group(s) at its terminal; $Y^{111}$, $Y^{222}$, $Y^{333}$, $Y^{444}$, $Y^{555}$, and $Y^{666}$ each independently represent an alkylene group, —CO—, —NH—, —O—, —S—, —$SO_2$— or a group obtained by combining at least two divalent linking groups selected from the group consisting of these groups.

The alkyl group having $CF_3$ group(s) or $CF_2H$ group(s) at its terminal represented by $Rf^{111}$, $Rf^{222}$, $Rf^{333}$, $Rf^{444}$, $Rf^{555}$ and $Rf^{666}$ have the same meanings as $Rf^1$, $Rf^2$ and $Rf^3$ in the formula (1b), respectively, and the preferable ranges thereof are also the same. $Y^{111}$, $Y^{222}$, $Y^{333}$, $Y^{444}$, $Y^{555}$, and $Y^{666}$ each are most preferably an alkylene group, —O— or a group obtained by combining at least two divalent linking groups selected from these groups.

Specific examples of the compound represented by any one of formulae (1), (2) or (3) are shown below, but the invention is not meant to be limited to these. In the following specific examples, No. I-1 to I-39 are examples of the compound represented by the formula (1), No. I-40 to I-50 are examples of the compound represented by the formula (2) and No. I-51 to I-59 are examples of the compound represented by the formula (3).

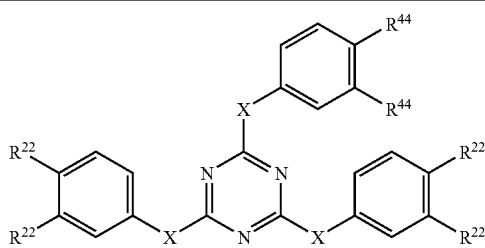

| Compound No. | $R^{44}$ | $R^{22}$ | X |
|---|---|---|---|
| I-1 | $O(CH_2)_3(CF_2)_4F$ | $O(CH_2)_3(CF_2)_4F$ | NH |
| I-2 | $O(CH_2)_3(CF_2)_6F$ | $O(CH_2)_3(CF_2)_6F$ | NH |
| I-3 | $O(CH_2)_3(CF_2)_8F$ | $O(CH_2)_3(CF_2)_8F$ | NH |
| I-4 | $OCH_2(CF_2)_6H$ | $OCH_2(CF_2)_6H$ | NH |
| I-5 | $OCH_2(CF_2)_8H$ | $OCH_2(CF_2)_8H$ | NH |
| I-6 | $O(CH_2)_2O(CH_2)_2(CF_2)_6F$ | $O(CH_2)_2O(CH_2)_2(CF_2)_6F$ | NH |
| I-7 | $O(CH_2)_2O(CH_2)_2(CF_2)_4F$ | $O(CH_2)_2O(CH_2)_2(CF_2)_4F$ | NH |
| I-8 | $O(CH_2)_3S(CH_2)_2(CF_2)_6F$ | $O(CH_2)_3S(CH_2)_2(CF_2)_6F$ | NH |
| I-9 | $O(CH_2)_3S(CH_2)_2(CF_2)_4F$ | $O(CH_2)_3S(CH_2)_2(CF_2)_4F$ | NH |
| I-10 | $O(CH_2)_6S(CH_2)_2(CF_2)_6F$ | $O(CH_2)_6S(CH_2)_2(CF_2)_6F$ | NH |
| I-11 | $O(CH_2)_6S(CH_2)_2(CF_2)_4F$ | $O(CH_2)_6S(CH_2)_2(CF_2)_4F$ | NH |

-continued

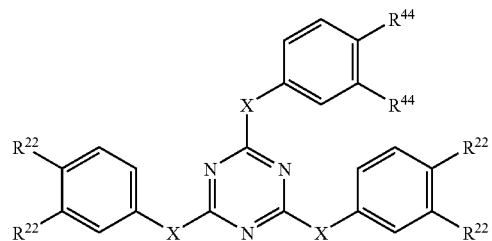

| Compound No. | $R^{44}$ | $R^{22}$ | X |
|---|---|---|---|
| I-12 | $OC_{10}H_{21}$ | $OC_{10}H_{21}$ | NH |
| I-13 | $OC_{12}H_{25}$ | $OC_{12}H_{25}$ | NH |
| I-14 | $OC_8H_{17}$ | $OC_{12}H_{25}$ | NH |
| I-15 | $OC_{16}H_{33}$ | $OC_{12}H_{25}$ | NH |
| I-16 | $OC_{12}H_{25}$ | $OC_{16}H_{33}$ | NH |
| I-17 | $O(CH_2)_2O(CH_2)(CF_2)_6H$ | $O(CH_2)_2O(CH_2)(CF_2)_6H$ | NH |
| I-18 | $O(CH_2)_3(CF_2)_6F$ | $O(CH_2)_3(CF_2)_6F$ | O |
| I-19 | $OCH_2(CF_2)_6H$ | $OCH_2(CF_2)_6H$ | O |
| I-20 | $O(CH_2)_2O(CH_2)_2(CF_2)_6F$ | $O(CH_2)_2O(CH_2)_2(CF_2)_6F$ | O |
| I-21 | $O(CH_2)_3S(CH_2)_2(CF_2)_6F$ | $O(CH_2)_3S(CH_2)_2(CF_2)_6F$ | O |
| I-22 | $O(CH_2)_2O(CH_2)(CF_2)_6H$ | $O(CH_2)_2O(CH_2)(CF_2)_6H$ | O |
| I-23 | $O(CH_2)_3(CF_2)_6F$ | $O(CH_2)_3(CF_2)_6F$ | S |
| I-24 | $OCH_2(CF_2)_6H$ | $OCH_2(CF_2)_6H$ | S |
| I-25 | $O(CH_2)_2O(CH_2)_2(CF_2)_6F$ | $O(CH_2)_2O(CH_2)_2(CF_2)_6F$ | S |
| I-26 | $O(CH_2)_3S(CH_2)_2(CF_2)_6F$ | $O(CH_2)_3S(CH_2)_2(CF_2)_6F$ | S |
| I-27 | $O(CH_2)_2O(CH_2)(CF_2)_6H$ | $O(CH_2)_2O(CH_2)(CF_2)_6H$ | S |

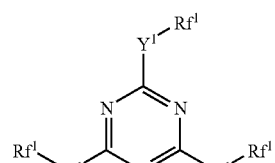

| Compound No. | $Rf^1$ | $Y^1$ |
|---|---|---|
| I-28 | $(CH_2)_2CF_2)_4F$ | O |
| I-29 | $(CH_2)_2(CF_2)_6F$ | O |
| I-30 | $(CH_2)_2(CF_2)_6F$ | O |
| I-31 | $CH_2(CF_2)_6H$ | O |
| I-32 | $CH_2(CF_2)_8H$ | O |
| I-33 | $(CH_2)_2(CF_2)_6F$ | $O(CH_2)_2O$ |
| I-34 | $(CH_2)_2(CF_2)_4F$ | $O(CH_2)_2O$ |
| I-35 | $(CH_2)_2(CF_2)_6F$ | $O(CH_2)_3S$ |
| I-36 | $(CH_2)_2(CF_2)_6F$ | $O(CH_2)_6S$ |
| I-37 | $(CH_2)_3(CF_2)_6F$ | $NH(CH_2)_3O$ |
| I-38 | $CH_2(CF_2)_6H$ | $NH(CH_2)_3O$ |
| I-39 | $CH_2(CF_2)_8H$ | $NH(CH_2)_3O$ |

$Y^1$ in the table is connected to the triazine ring at its left side and to $Rf^1$ at its right side.

[Structure: benzene ring with substituents $Y^{11}$-$Rf^{11}$ (three times) and -CO$_2$H]

| Compound No. | $Rf^{11}$ | $Y^{11}$ |
|---|---|---|
| I-40 | $(CH_2)_3(CF_2)_4F$ | O |
| I-41 | $(CH_2)_3(CF_2)_6F$ | O |
| I-42 | $(CH_2)_3(CF_2)_8F$ | O |
| I-43 | $CH_2(CF_2)_6H$ | O |
| I-44 | $CH_2(CF_2)_8H$ | O |
| I-45 | $(CH_2)_2(CF_2)_6F$ | $O(CH_2)_2O$ |
| I-46 | $(CH_2)_2(CF_2)_4F$ | $O(CH_2)_2O$ |
| I-47 | $(CH_2)_2(CF_2)_6F$ | $O(CH_2)_3S$ |
| I-48 | $(CH_2)_2(CF_2)_6F$ | $O(CH_2)_6S$ |

$Y^{11}$ in the table is connected to the benzene ring at its left side and to $Rf^{11}$ at its right side.

[Structure: benzene ring with two Y-Rf substituents and -CO$_2$H]

| Compound No. | Rf | Y |
|---|---|---|
| I-49 | $(CH_2)_3(CF_2)_6F$ | O |
| I-50 | $(CH_2)_3(CF_2)_6F$ | $O(CH_2)_2O$ |

[Structure: triphenylene with six $O-Y^{111}-Rf^{111}$ substituents]

| Compound No. | $Rf^{111}$ | $Y^{111}$ |
|---|---|---|
| I-51 | $(CF_2)_4F$ | $(CH_2)_3$ |
| I-52 | $(CF_2)_6F$ | $(CH_2)_3$ |
| I-53 | $(CF_2)_8F$ | $(CH_2)_3$ |
| I-54 | $(CF_2)_6H$ | $CH_2$ |
| I-55 | $(CF_2)_8H$ | $CH_2$ |
| I-56 | $(CH_2)_2(CF_2)_6F$ | $(CH_2)_2O$ |
| I-57 | $(CH_2)_2(CF_2)_4F$ | $(CH_2)_2O$ |
| I-58 | $(CH_2)_2(CF_2)_6F$ | $(CH_2)_3S$ |
| I-59 | $(CH_2)_2(CF_2)_8F$ | $(CH_2)_6S$ |

$Y^{111}$ in the table is connected to the oxygen atom at its left side and to $Rf^{111}$ at its right side.

In the present invention, the amount of the compound represented by any one of formulae (1) to (3) to be added is preferably 0.01 to 20 mass %, more preferably 0.05 to 10 mass % and even more preferably 0.1 to 5 mass % based on the amount of the disk-like liquid crystalline compound. The compound represented by any one of formulae (1) to (3) may be used either singly or in combinations of two or more. When two or more kinds of compounds are used together, two or more kinds of these compounds represented by any one of formulae (1) to (3) may be used. Alternatively, at least one kind of compound represented by any one of formulae (1) to (3) may be used in combinations with a known compound other than these compounds. As the compounds to be combined, for example, fluoro-aliphatic group-containing polymers described in JP-A-2008-46436, Paragraphs [0043] to [0055] are preferably used. These fluoro-aliphatic group-containing polymers may be used singly if possible.

[Fixation of the State of Alignment of the Liquid Crystalline Compound]

In the case of forming the transparent resin cured layer from the composition containing the liquid crystalline compound, the aligned liquid crystalline compound is preferably fixed while keeping this aligned state. This fixation is preferably made by a polymerization reaction of a polymerizable group introduced into the liquid crystalline compound. Examples of polymerization reactions include thermal polymerization reactions employing a thermal polymerization initiator and photo-polymerization reactions employing a photo-polymerization initiator; the photo-polymerization reactions are more preferable.

<Oxygen-Shielding Layer>

In a case where two or more layers are formed by a coating process in the production of the polarizing element of the present invention, an intermediate layer is preferably formed for the purpose of preventing the mixing of interlayer components when these layers are applied or stored after these layers are applied. As the intermediate layer, an oxygen-shielding film which is described as "separating layer" in JP-A-5-72724 and has the ability to shield oxygen is preferably used. In this case, the light fastness of the polarizing element is improved. As the oxygen-shielding film, those showing low oxygen permeability, dispersible or soluble in water or an aqueous alkali solution are preferable and an appropriate one can be selected from ordinary oxygen-shielding films. Among these films, a combination of a polyvinyl alcohol and a polyvinyl pyrrolidone is more preferable.

The above oxygen-shielding layer can function as the above alignment film The polyvinyl alcohol and polyvinyl pyrrolidone which are preferably used for the above oxygen-shielding layer are effective as the alignment film and therefore, the intermediate layer and the alignment layer may be united as one layer.

The layer thickness of the oxygen-shielding layer is preferably in a range from 0.1 to 10 μm and more preferably 0.5 to 5 μm.

The polarizing element of the present invention can be produced by a process including:

(1) a step of subjecting a transparent support or an alignment film formed on the support to rubbing treatment or light irradiation treatment;

(2) a step of applying a dichroic dye composition dissolved in an organic solvent to the transparent support or alignment film which has been rubbed or irradiated with light;

(3) a step of vaporizing the above organic solvent to align the above dichroic dye composition, thereby forming a light absorption anisotropic layer; and (4) a step of applying a curable transparent resin composition on the above light absorption anisotropic layer or an oxygen-shielding layer, followed by curing the composition.

It is preferable that the process further includes one or more of the following steps (5) and (6):

(5) a step of polymerizing a polymerizable group in the dichroic dye composition by light or heat to thereby align and fix the dichroic dye; and (6) a step of applying a composition containing a polyvinyl alcohol as its main component to the surface of the above light absorption anisotropic layer, followed by drying to form an oxygen-shielding layer.

As an example of the production method of the present invention, a method of producing the so-called in-cell polarizer is given. In this example, examples of the material of the support include non-alkali glass, soda glass, Pyrex (registered trademark) glass and quartz glass which are used as a liquid crystal cell substrate, and plastic substrates. In an embodiment utilizing the in-cell polarizer to restrain light from being scattered by the cancellation of polarization of light which is caused by the color filter layer, the polarizer is preferably disposed between the color filter layer and the liquid crystal layer. It is therefore preferable to form the color filter on the support and to form the polarizer on the color filter by the above method.

Each of the steps (1) to (6) will be explained in this order.

(1) Aligning Treatment Step (Step of Subjecting the Support or Alignment Film Formed on the Support to Rubbing Treatment or Light Irradiating Treatment)

In the above step of subjecting the support or alignment film formed on the support to a rubbing treatment or light irradiating treatment, the rubbing treatment means an operation for performing alignment treatment in which the surface of the support or the like is rubbed with a buff such as cotton cloth or absorbent cotton in a fixed direction to form microgrooves parallel to that direction. The light irradiating treatment means an operation in which the support or the photo-alignment film formed on the support is irradiated with linear polarized light or non-polarized light and then a dichroic dye is applied to finally allow the dye to adsorb to the surface in an aligned state.

[Rubbing-Density of Alignment Film]

It is possible to vary a rubbing-density of an alignment film by a method described in "Handbook of liquid Crystal (Ekisyo Binran)" published by MARUZEN. A rubbing-density (L) is quantified by a formula (A) below.

$$L = Nl\{1+(2\pi rn/60v)\} \quad \text{Formula (A)}$$

In formula (A), N is a number of rubbing, l is a contact length of a rubbing-roller, r is a roller-radius, n is revolutions per minute (rpm) and v is moving velocity (per second).

The rubbing-density may be increased by increasing the number of rubbing, lengthening the contact length of the rubbing roller, increasing radius of the roller, increasing revolutions per minute of the roller and/or decreasing moving velocity. On the other hand, the rubbing-density may be decreased by doing the reverse thereof.

There is a relationship between a rubbing-density and a pre-tilt angle of the alignment film that the pre-tilt angle is decreased as the rubbing-density is higher, and the pre-tilt angle is increased as the rubbing-density is lower.

[Light Irradiation to the Alignment Film]

As mentioned above, the light alignment film formed of the above material is irradiated with linear polarized light or non-polarized light to produce a photo-alignment film.

In this specification, the term "irradiation with linear polarized light" means an operation which makes the above photo-alignment material undergo a photoreaction. The wavelength of the light to be used differs depending on the type of photo-alignment material, and no particular limitation is imposed on the wavelength of the light insofar as it is a wavelength necessary for the photoreaction. It is preferable to use light having a peak wavelength of preferably 200 nm to 700 nm, and more preferably ultraviolet light having a peak wavelength of 400 nm or less.

Examples of the light source used for the light irradiation may include usually used light sources such as a tungsten lamp, halogen lamp, xenon lamp, xenon flash lamp, mercury lamp, mercury xenon lamp and carbon arc lamp; various lasers (for example, a semiconductor laser, helium neon laser, argon ion laser, helium-cadmium laser and YAG laser); light emitting diode and cathode ray tube.

As measures to take the linearly polarized light, methods using a polarizing plate (for example, an iodine polarizing plate, dichroic dye polarizing plate and wire grid polarizing plate), methods using a prism type element (for example, a Glan-Thompson prism) or a reflection type polarizer utilizing the angle of polarization (Brewstar's angle), or methods using light emitted from a polarized laser light source may be adopted. Also, only light having necessary wavelengths may be selectively applied by using, for example, a filter or wavelength conversion element.

As regards the light to be applied, a method is adopted in which, in the case of linearly polarized light, light is applied to the surface of the alignment film perpendicularly or obliquely from the front surface or backside of the alignment film. The angle of incidence of the light is generally, though differs depending on the type of photo-alignment material, for example, 0° to 90° (perpendicular) and preferably 40° to 90°.

When non-polarized light is utilized, the non-polarized light is applied obliquely. The angle of incidence in this case is generally 10° to 80°, preferably 20° to 60°, and more preferably 30° to 50°.

The irradiation time is preferably 1 minute to 60 minutes, and more preferably 1 minute to 10 minutes.

When patterning is required, a method in which light is applied using a photomask with frequencies necessary to form the pattern or a method in which a pattern is written by scanning using laser light may be adopted.

(2) Coating Step (Step of Applying a Coating Liquid Prepared by Dissolving a Dichroic Dye Composition in an Organic Solvent, to the Support or Alignment Film Subjected to the Alignment Treatment)

This is a step of applying a coating liquid obtained by dissolving a dichroic dye composition in an organic solvent to the above support or alignment film subjected to the alignment treatment.

[Solvent for Preparing a Coating Liquid]

The light absorption anisotropic layer used in the present invention to be formed by using the coating liquid containing the dichroic dye composition described above. The solvent which is used for preparing the coating liquid is desirably selected from organic solvents. Examples of the organic solvent include amides such as N,N-dimethylformamide, sulfoxides such as dimethylsulfoxide, heterocyclic compounds such as pyridine, hydrocarbons such as benzene or hexane, alkyl halides such as chloroform or dichloromethane, esters such as methyl acetate or butyl acetate, ketones such as acetone or methyl ethyl ketone, and ethers such as tetrahydrofuran or 1,2-dimethoxyethane. Among these, alkyl halides or ketones are preferred. Plural kinds of organic solvents may be used in combination.

[Coating Manner]

The coating of the coating liquid of the dichroic dye composition to the front surface of the alignment film may be carried out by ordinary techniques (e.g., slit coating, wire bar coating, extrusion coating, direct gravure coating, reverse gravure coating, die coating and inkjet method). The solid content of the coating liquid of the dichroic dye composition is preferably in an amount from 1 to 20 mass % more preferably from 1 to 10 mass %, and further preferably from 1 to 5 mass %.

It is preferable for the light absorption anisotropic film to be formed in accordance with a wet film-forming method. For the purpose of producing the light absorption anisotropic film in the present invention, after preparing the coating liquid containing the dichroic dye composition described above, publicly known methods of applying the composition onto various substrates such as glass plate, so that the dye is aligned and laminated are adopted.

As the wet film-forming method, for example, a known method as disclosed in e.g. "Coating Engineering", Yuji Harasaki (Asaku Shoten K. K., published on Mar. 20, 1971) pages 253-277 or "Creation and Applications of Harmonized Molecular Materials" supervised by Kunihiro Ichimura (CMC Publishing Co., Ltd., published on Mar. 3, 1998) pages 118-149, or a method of coating on a substrate preliminarily subjected to an alignment treatment by means of e.g. spin coating, spray coating, bar coating, roll coating, blade coating, free span coating, dye coating, or inkjet method may be mentioned.

The temperature at the time of coating is preferably from 0° C. to 80° C.; and the humidity is preferably from 10% RH to 80% RH.

Further, when the light absorption anisotropic layer is applied by the wet process film forming method, the support may be warmed or may be cooled too. The temperature of the support in this occasion is preferably from 10° C. to 60° C. When the temperature is too high, there is a fear that the alignment is disturbed before being dried under reduced pressure as described below in detail. When the temperature is too low, there is a fear that water drop attaches onto the support and obstructs the coating. When the dye film coated in accordance with the wet process film forming method is dried under the reduced pressure, the support may be warmed. The temperature of the support in this occasion is preferably 60° C. or less. When the temperature is too high, there is a fear that the alignment is disturbed before being dried under reduced pressure.

In the present invention, the light absorption anisotropic film can be formed by applying the dichroic dye composition on a support aligned unilaterally in a direction having an angle not parallel with respect to the alignment treatment direction. Further, it is more preferable that the dichroic dye composition is applied in the direction almost the same as longitudinal or lateral direction of the support. By the above process, a light absorption anisotropic film without any optical defect and having high dichroic ratio can be provided. In addition, after applying the dichroic dye composition, cutting out the support for the purpose of providing a necessary polarization angle is not required, and accordingly, the productivity is high.

JP-A-2007-127987, for example, discloses about preferred coating manners for the dichroic dye composition.

(3) Drying and Alignment Step
(Step of Vaporizing the Above Organic Solvent to Thereby Align the Above Dichroic Dye Composition)

This is a step which is carried out in succession to the coating step for vaporizing the organic solvent from the coated film of the organic solvent solution to align the dichroic dye composition. As regards the drying temperature, in this case, the coated film is preferably air-dried at ambient temperature so as not to disorder (to avoid, for example, heat relaxation) the state of alignment of the dye formed by application. It is more preferable to carry out treatment under reduced pressure to vaporize the solvent, thereby drying at a lower temperature.

The treatment under reduced pressure herein means an operation in which the support with the coated film (light absorption anisotropic layer) is placed under reduced pressure to remove the solvent by vaporization. At this moment, it is preferable that the support having the light absorption anisotropic film is maintained to be horizontal without moving from the higher position toward the lower position.

Regarding with the time interval before starting the pressure reduction treatment of the light absorption anisotropic film after coating, the shorter, the better, and it is preferable to be from 1 second to 30 seconds.

Examples of the method for pressure reducing treatment include the following methods. Namely, the light absorption anisotropic film prepared by applying the coating liquid is introduced into a pressure-reducing apparatus and receive the pressure reduction treatment. For example, the pressure reduction apparatus illustrated in FIG. 9 or FIG. 10 of JP-A-2006-201759 can be used. JP-A-2004-169975 discloses about the pressure reducing apparatus in detail.

With regard to the condition of pressure reducing treatment, the pressure among the system in which the light absorption anisotropic film exists is preferably $2 \times 10^4$ Pa or less, further preferably $1 \times 10^4$ Pa or less and particularly preferably $1 \times 10^3$ Pa or less. In addition, it is preferably 1 Pa or more, and further preferably $1 \times 10^1$ Pa or more. Usually, it is preferable for the pressure to which the system reaches finally to be as the above description. When the pressure is too high, there is a fear that the drying becomes impossible and alignment is disturbed. When the pressure is too low, the drying becomes so rapid that there is a fear of generating defects.

Further, the time for pressure reduction treatment is preferably from 5 seconds to 180 seconds. When the time is too long, there is a fear that the rapid drying of the light absorption anisotropic film before relaxation of the alignment becomes impossible and the alignment is disturbed. When the time is too short, there is a fear that the drying becomes impossible and the alignment is disturbed.

Further, with regard to the temperature among the system in the occasion of the pressure reducing treatment, it is preferably from 10° C. to 60° C. When the temperature is too high, there is a fear that convection occurs during the drying and non-uniformity generates in the light absorption anisotropic film. When the temperature is too low, there is a fear that the drying becomes impossible and the alignment is disturbed.

When the above coated film is dried to align the composition, the substrate may be heated to promote the alignment. At this time, the temperature of the substrate is preferably 50° C. or more and 200° C. or less and more preferably 70° C. or more and 180° C. or less. Additives such as a plasticizer may be added to the composition for reducing this alignment temperature.

The thickness of the dried light absorption anisotropic layer is preferably 0.01 to 2 μm, more preferably 0.05 to 2 μm and most preferably 0.1 to 2 μm.

(4) Step of Laminating the Transparent Resin Cured Layer
(Step of Applying a Curable Transparent Resin Composition to the Surface of the Above Light Absorption Anisotropic Layer, Followed by Curing)

Using a coating solvent, a curable transparent resin composition is applied to the surface of the above light absorption anisotropic layer.

[Coating Solvent]

As the coating solvent there is preferably used a liquid having a boiling point of from 60° C. to 170° C. Examples thereof include water, alcohols (e.g., methanol, ethanol, isopropanol, butanol, benzyl alcohol), ketones (e.g., acetone, methyl ethyl ketone, methyl isobutyl ketone, cyclohexanone), esters (e.g., methyl acetate, ethyl acetate, propyl acetate, butyl acetate, methyl formate, ethyl formate, propyl formate, butyl formate), aliphatic hydrocarbons (e.g., hexane, cyclohexane), halogenated hydrocarbons (e.g., methylene chloride, chloroform, carbon tetrachloride), aromatic hydrocarbons (e.g., benzene, toluene, xylene), amides (e.g., dimethylformamide, dimethylacetamide, n-methylpyrrolidone), ethers (e.g., diethyl ether, dioxane, tetrahydrofurane), and ether alcohols (e.g., 1-methoxy-2-propanol). Toluene, xylene, methyl ethyl ketone, methyl isobutyl ketone, cyclohexanone, ethanol and butanol are preferred. Particularly preferred coating solvent are methyl ethyl ketone, methyl isobutyl ketone, cyclohexanone and ethanol.

As regards the amount of the above solvent to be used, the solvent is used such that the solid concentration of the curable transparent resin composition is preferably 2 to 50 mass %, and more preferably 3 to 40 mass %.

[Coating Manner]

When the transparent resin cured layer is formed by using the composition containing the liquid crystalline compound, a coating liquid of the composition is preferably applied to the light absorption anisotropic layer to form the transparent resin cured layer. The coating liquid may be applied by ordinary techniques (e.g., extrusion coating, direct gravure coating, reverse gravure coating and die coating).

[Alignment and Curing]

When the transparent resin cured layer made by using the composition containing the liquid crystalline compound is formed, the light absorption anisotropic layer functions as the alignment film of the transparent resin cured layer. The liquid crystalline compound may be aligned and aged by heating. The curing may be preferably performed by radiation of ultraviolet rays.

(5) Polymerization and Fixation Step
(Step of Polymerizing Polymerizable Groups in the Dichroic Dye Composition by Light or Heat to Align and Fix the Dye Composition)

This is a step of firmly fixing the alignment of the dichroic dye which is aligned and fixed on the support by removing the solvent and drying, wherein a polymerizable group of the dichroic dye and/or the polyfunctional monomer contained in the dichroic dye composition is polymerized by light or heat to produce a polymer in which the dye is kept. Specifically, the polyfunctional monomer is polymerized by irradiation with ultraviolet rays to avoid the occurrence of such a phenomenon that the dichroic dye-containing dry coated film is heated by irradiation with infrared rays and preferably to avoid the occurrence of such a phenomenon that the alignment of the dichroic dye-containing dry coated film is relaxed. This ensures that the aligned dye is fixed by the polymer without fail to prevent the relaxation of the alignment and the disorder of the alignment caused by heat, so that the alignment is stably fixed and a stabilized anisotropic dye film is formed.

(6) Step of Laminating an Oxygen-Shielding Layer
(Step of Applying an Oxygen-Shielding Layer-Forming Composition to the Surface of the Light Absorption Anisotropic Layer, Followed by Drying)

This is a step of forming an intermediate layer having an oxygen-shielding function between the light absorption anisotropic layer and the transparent resin cured layer.

The oxygen-shielding layer-forming composition contains a polyvinyl alcohol as its major component in an amount of preferably 30 mass % or more, and more preferably 50 mass % to 90 mass % based on the composition content excluding the coating solvent. The composition preferably contains a polyvinyl alcohol and a polyvinyl pyrrolidone. The content of the polyvinyl pyrrolidone is preferably 10 to 50 mass % based on the composition.

Using water, an organic solvent such as an alcohol (for example, methanol), or an amide (for example, dimethyl acetamide) as the coating solvent, a coating liquid of the above composition is prepared and applied. The total solid matters in the coating liquid is preferably 0.1 to 10 mass %.

The coating method and the like are the same as those in the coating step of the above (2).

The drying is carried out at a temperature of 50° C. to 150° C. while heating.

As mentioned above, the element (polarizing element) having a function as a polarizing film can be formed. In this case, a protective layer, an adhesive layer, an anti-reflecting layer and the like may be used.

(Characteristics of the Light Absorption Anisotropic Layer)

When a coating liquid of the above dichroic dye composition is applied to the surface of the alignment film, the dichroic dye is aligned at the tilt angle of the alignment film at the dichroic dye-alignment film interface and at the tilt angle of the air at the dichroic dye-air interface. After the dichroic dye composition coating liquid is applied to the surface of the alignment film, the dichroic dye can be uniformly aligned (monodomain alignment), thereby attaining horizontal alignment.

The light absorption anisotropic layer formed by aligning the dichroic dye horizontally and fixing the dye in that aligned state may be utilized as a polarizing element.

[Tilt Angle]

In the present invention, the term of "tilt angle" means an angle formed between the longitudinal direction of the dichroic dye molecule and the interface (alignment film interface or an air interface). Decreasing the tilt angle at the alignment film side to an extent and horizontally aligning provide preferable optical performance as the polarizing element efficiently. Accordingly, from the viewpoints of polarization performance, the tilt angle at the alignment film side is preferably from 0° to 10°, further preferably from 0° to 5°, particularly preferably from 0° to 2°, and the most preferably from 0° to 1°. In addition, preferable tilt angle at the air interface side is from 0° to 10°, further preferably from 0° to 5°, and particularly preferably from 0° to 2°.

Generally, the tilt angle of the dichroic dye on the air interface side can be adjusted by selecting other compounds (for example, a horizontally aligning agent described in JP-A-2005-99248, JP-A-2005-134884, JP-A-2006-126768 and JPA-2006-267183) to be added as desired, so that a horizontal alignment state preferable for the polarizing element of the present invention can be attained.

Also, the tilt angle of the dichroic dye on the alignment film side can be controlled by the above method (alignment film tilt angle control agent).

Any liquid crystal display device may be used as the liquid crystal device of the present invention as long as it uses at least one polarizing element according to the present invention. Specifically, examples of the liquid crystal display device include TN, STN, VA, ECB, IPS or OCB mode transmission type, reflection type or semi-transmission type liquid crystal display devices.

According to the present invention, it is possible to provide the polarizing element excellent in the fastness and the dichroic ratio, in which the polarizing element is produced by laminating the light absorption anisotropic layer, which is formed of the dichroic dye composition, and the transparent resin cured layer, on the transparent support in this order. According to the present invention, it is also possible to provide the liquid crystal display device excellent in the display performance.

The polarizing element of the present invention is provided with the light absorption anisotropic layer formed by applying the dichroic dye composition to the surface of a transparent support to form an extremely thin film containing a dichroic dye, and by utilizing, for example, intermolecular interaction, to align the dichroic dye. Then, the transparent resin cured layer can be formed on the surface of the thus-formed optical absorption anisotropic layer, thereby to produce the polarizing element, without extreme increase in film thickness and without any breakage of the light absorption anisotropic layer. The transparent resin cured layer can protect the light absorption anisotropic layer and can impart new optical properties. Thus, the present invention can provide the polarizing element excellent in the fastness and the dichroic ratio. Also, the present invention can provide the liquid crystal display device which is provided with the polarizing element and which is excellent in display performance.

EXAMPLES

The present invention will be described in more detail based on the following examples, but the present invention is not limited thereto.

In the following examples, the dichroic ratio and the pencil hardness of the light absorption anisotropic layer were measured in the following manner.

<Dichroic Ratio>

A dichroic ratio was calculated using the following equation, after measuring an absorbance of the light absorption anisotropic film with a spectral photometer arranging an iodine-series polarizing element in an incident light optical system.

Dichroic Ratio($D$)=$Az/Ay$ wherein Az is an absorbance of the dye film (i.e. the light absorption anisotropic film) for a polarized light in the absorption axis direction of the dye film; and Ay is an absorbance of the dye film for a polarized light in the polarization axis direction of the dye film.

<Pencil Hardness>

The pencil hardness test was made according to JIS K5400.

Example 1

(Preparation of a Transparent Resin Cured Layer Coating Liquid A)

The following composition was poured into a mixing tank, followed by stirring, to prepare a transparent resin cured layer coating liquid A.

To 7.5 mass parts of trimethylolpropanetriacrylate (trade name: Viscoat #295, manufactured by Osaka Organic Chemical Industry Ltd.), 2.7 mass parts of poly(glycidyl methacrylate) with mass average molecular weight 15,000, 7.3 mass parts of methyl ethyl ketone, 5.0 mass parts of cyclohexanone and 0.5 mass parts of a photopolymeraiztion initiator (trade name: Irugacure 184, Ciba Specialty Chemicals, Inc.) were added, and the mixture was stirred. The resultant mixture was subjected to filtration using a polypropylene filter with hole diameter 0.4 μm, to prepare a hard coat layer coating liquid A.

(Preparation of a Transparent Resin Cured Layer Coating Liquid B)

A coating liquid B containing a disk-like liquid crystalline compound having the following composition was prepared.

(Composition of a Coating Liquid B)

| | |
|---|---|
| Disk-like liquid crystalline compound TE-8 (m = 4, in (8)) | 32.6 mass % |
| Exemplified Compound I-6 | 0.05 mass % |
| Ethylene oxide-modified trimethylolpropane triacrylate (V#360, trade name, manufactured by Osaka Organic Chemical Industry, Ltd.) | 3.2 mass % |
| Sensitizer (Kayacure DETX, trade name, manufactured by Nippon Kayaku) | 0.4 mass % |
| Photopolymerization initiator (Irgacure 907, trade name, manufactured by Nihon Ciba-Geigy K.K.) | 1.1 mass % |
| Methyl ethyl ketone | 62.0 mass % |
| The following fluorine-containing polymer | 0.14 mass % |

Fluorine-containing polymer (Mw = 9,000)

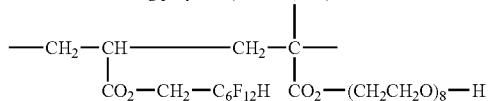

(Preparation of an Oxygen Shielding Layer Coating Liquid)

The following composition was poured into a mixing tank, followed by stirring, to prepare an oxygen shielding layer coating liquid.

That is, 3.2 parts by mass of a polyvinyl alcohol (trade name: PVA 205, manufactured by Kuraray Ltd.), 1.5 parts by mass of a poly(vinyl pyrrolidone) (trade name: PVP K-30, manufactured by Nippon Shokubai Co., Ltd.), 44 parts by mass of methanol and 56 parts by mass of water were added and the mixture was stirred. Then, the thus-obtained mixture was filtered by a polypropylene filter with pore diameter 0.4 μm, to prepare an oxygen shielding layer coating liquid.

(Preparation of Polarizing Element)

To 9.8 mass parts of chloroform, were added 0.096 mass parts of a dichroic azo dye No. (A-46), 0.096 mass parts of a polyfunctional monomer, ethylene oxide-modified trimethylolpropanetriacrylate (trade name: V#360, manufactured by Osaka Organic Chemical Industry Ltd.), and 0.008 mass parts of Irugacure OXE-01 (trade name, manufactured by Ciba Speciality Chemicals, Inc) as a polymerization initiator, and the mixture was stirred and dissolved. The resultant mixture was subjected to filtration to obtain a dichroic dye composition coating liquid. Then, the above coating liquid was applied to the below-mentioned polyvinyl alcohol alignment film which was formed on a glass substrate and rubbed, and the film was dried under the air at room temperature to remove chloroform. Thereafter, the state of alignment of the film was fixed by irradiating the film with ultraviolet rays of intensity 5 J under a nitrogen atmosphere (concentration of oxygen: 100 ppm or less). In succession, the above oxygen shielding layer coating liquid was applied to the surface of the resultant film, followed by drying at 100° C. for 2 minutes, and the above transparent resin cured layer coating liquid A was applied thereto, followed by drying at 100° C. for 2 minutes. After that, the resultant laminated film was irradiated with 5 J ultraviolet rays under a nitrogen atmosphere (concentration of oxygen: 100 ppm or less) to undergo polymerization, thereby to produce a polarizing element in which the oxygen shielding layer of 1 μm thickness and the transparent resin cured layer of 2 μm thickness were laminated on the surface of the light absorption anisotropic layer (layer thickness 0.4 μm).

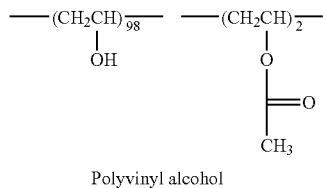

Polyvinyl alcohol

The dichroic ratio (D) calculated from an absorbance (Az) of the thus-obtained polarizing element at the light absorption anisotropic layer for a polarized light having a vibration plane in the absorption axis direction of in-plane of the dye film, and an absorbance (Ay) of the polarizing element at the light absorption anisotropic layer for a polarized light having a vibration plane in the polarization axis direction of in-plane of the dye film; and the pencil hardness of the resultant polarizing element are shown in Table 1. Evaluation of the pencil hardness was performed according to JIS K5400. The composition had nematic mesomorphism, a high physical strength, and a high dichroic ratio (light absorption anisotropic property) sufficiently functional as a polarizing element.

Example 2

To 9.8 mass parts of chloroform, were added 0.096 mass parts of a dichroic azo dye No. (A-46), 0.096 mass parts of a polyfunctional monomer, ethylene oxide-modified trimethylolpropanetriacrylate (trade name: V#360, manufactured by Osaka Organic Chemical Industry Ltd.), and 0.008 mass parts of Irugacure OXE-01 (trade name, manufactured by Ciba Speciality Chemicals, Inc) as a polymerization initiator, and the mixture was stirred and dissolved. The resultant mixture was subjected to filtration to obtain a dichroic dye composition coating liquid. Then, the above coating liquid was applied to the above polyvinyl alcohol alignment film which was formed on a glass substrate and rubbed, and the film was dried under the air at room temperature to remove chloroform. Thereafter, the state of alignment of the film was fixed by irradiating the film with ultraviolet rays of intensity 5 J under a nitrogen atmosphere (concentration of oxygen: 100 ppm or less). In succession, the above transparent resin cured layer coating liquid B was applied thereto, followed by drying under heat at 130° C. for 2 minutes, to align the disk-like liquid crystalline compound horizontally. Then, the resultant coated film was irradiated with ultraviolet rays from a 120 W/cm² high-pressure mercury lamp for 4 seconds at 80° C., to undergo polymerization, thereby preparing a polarizing element in which a 1.5 μm-thick transparent resin cured layer exhibiting optically negative refractive index anisotropy was laminated on the surface of the light absorption anisotropic layer (layer thickness: 0.4 μm).

The dichroic ratio (D) calculated from an absorbance (Az) of the thus-obtained polarizing element at the light absorption anisotropic layer for a polarized light having a vibration plane in the absorption axis direction of in-plane of the dye film, and an absorbance (Ay) of the polarizing element at the light absorption anisotropic layer for a polarized light having a vibration plane in the polarization axis direction of in-plane of the dye film; and the pencil hardness of the resultant polarizing element are shown in Table 1. The composition had nematic mesomorphism, a high physical strength, and a high dichroic ratio (light absorption anisotropic property) sufficiently functional as a polarizing element. Also, the transparent resin cured layer had the following characteristics: Re=0 nm, Rth=200 nm at wavelength 550 nm; and the disk-like liquid crystalline compound was aligned horizontally within ±1° from the plane.

Reference Example 1

A polarizing element was prepared in the similar manner as in Example 1, except that the transparent resin cured layer was not provided to laminate. The dichroic ratio (D) and the pencil hardness of the resultant light polarizing element are shown in Table 1. The composition had nematic mesomorphism, and a high dichroic ratio (light absorption anisotropic property) sufficiently functional as a polarizing element. However, the pencil hardness of the polarizing element was 2B or softer, showing that the physical strength was not enough for a polarizing element.

TABLE 1

| | Azo dye | | Phase transition | Dichroic | Pencil |
|---|---|---|---|---|---|
| No. | No. | Phase transition temperature | temperature of composition | ratio | hardness |
| Example 1 | A-46 | K 158° C. N 240° C. I | N 150° C. I | 23 | H |
| Example 2 | A-46 | K 158° C. N 240° C. I | N 150° C. I | 23 | H |
| Reference Example 1 | A-46 | K 158° C. N 240° C. I | N 150° C. I | 23 | 2B or softer |

K: Crystalline Phase
N: Nematic Phase
I: Isotropic Phase

Example 3

(Preparation of Photo-Alignment Film Composition)

A photo-alignment film composition was prepared, by making a homogeneous solution containing the following constituents, followed by pressure-filtration using a membrane filter of pore size 0.45 μm.

| Material of alignment film: | The following azo compound | 1.00 mass part |
| --- | --- | --- |
| Solvents: | N-methyl-2-pyrolidone | 49.50 mass parts |
| | 2-butoxyethanol | 49.50 mass parts |

Azo compound

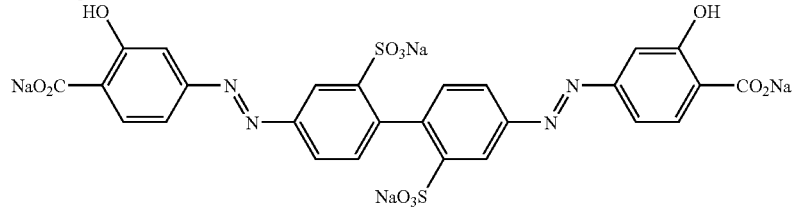

(Preparation of Glass-Substrate with Photo-Alignment Film)

The thus-obtained photo-alignment film composition was applied to the surface of a glass substrate by a wire bar, followed by drying at 100° C. for 1 minute. Then, the substrate was irradiated with linearly polarized ultraviolet rays of wavelength about 365 nm which rays were obtained by passing a light from an extra-high pressure mercury lamp through a band pass filter, from a direction perpendicular to the substrate, to prepare a glass substrate with a photo-alignment film of 0.07 μm thickness. Cumulative light quantity was 5 J/cm².

(Preparation of Polarizing Element)

To 9.9 mass parts of chloroform, were added 0.05 mass parts of a dichroic azo dye No. (C-33), and 0.05 mass parts of a dichroic azo dye No. (D-1), and the mixture was stirred and dissolved. The resultant mixture was subjected to filtration to obtain a dichroic dye composition coating liquid. Then, the above coating liquid was applied to the glass substrate with a photo-alignment film, and the resultant substrate was dried under the air at room temperature to remove chloroform. Thereafter, the above oxygen shielding layer coating liquid was applied to the surface of the resultant substrate, followed by drying at 100° C. for 2 minutes, and the above transparent resin cured layer coating liquid A was applied thereto, followed by drying at 100° C. for 2 minutes. After that, the resultant substrate was irradiated with 5J ultraviolet rays under a nitrogen atmosphere (concentration of oxygen: 100 ppm or less) to undergo polymerization, thereby to produce a polarizing element in which the oxygen shielding layer of 1 μm thickness and the transparent resin cured layer of 2 μm thickness were laminated on the surface of the light absorption anisotropic layer (layer thickness 0.2 μm).

The dichroic ratio (D) calculated from an absorbance (Az) of the thus-obtained polarizing element at the light absorption anisotropic layer for a polarized light having a vibration plane in the absorption axis direction of in-plane of the dye film, and an absorbance (Ay) of the polarizing element at the light absorption anisotropic layer for a polarized light having a vibration plane in the polarization axis direction of in-plane of the dye film; and the pencil hardness of the resultant polarizing element are shown in Table 2. Evaluation of the pencil hardness was performed according to JIS K5400. The composition had nematic mesomorphism, a high physical strength, and a high dichroic ratio (light absorption anisotropic property) sufficiently functional as a polarizing element.

Example 4

A polarizing element was prepared in the same manner as in Example 3 by forming the light absorption anisotropic layer (layer thickness: 0.2 μm), the oxygen shielding layer (layer thickness: 1 μm) and the transparent resin cured layer (layer thickness: 2 μm), except that 0.02 parts by mass of (C-30), 0.04 parts by mass of (C-9) and 0.04 parts by mass of (D-1) were used as the dichroic azo dyes.

The dichroic ratio (D) calculated from an absorbance (Az) of the thus-obtained polarizing element at the light absorption anisotropic layer for a polarized light having a vibration plane in the absorption axis direction of in-plane of the dye film, and an absorbance (Ay) of the polarizing element at the light absorption anisotropic layer for a polarized light having a vibration plane in the polarization axis direction of in-plane of the dye film; and the pencil hardness of the resultant polarizing element are shown in Table 2. Evaluation of the pencil hardness was performed according to JIS K5400. The composition had nematic mesomorphism, a high physical strength, and a high dichroic ratio (light absorption anisotropic property) sufficiently functional as a polarizing element.

TABLE 2

| | Azo dye No. 1 | | Azo dye No. 2 | | Azo dye No. 3 | | | |
| --- | --- | --- | --- | --- | --- | --- | --- | --- |
| No. | No. | Phase transition temperature | No. | Phase transition temperature | No. | Phase transition temperature | Dichroic ratio | Pencil hardness |
| Example 3 | C-30 | K 187° C. N 248° C. I | D-1 | K 200° C. N 237° C. I | — | — | 29 | H |
| Example 4 | C-30 | K 187° C. N 248° C. I | D-1 | K 200° C. N 237° C. I | C-9 | K 167° C. N 288° C. I | 27 | H |

K: Crystalline Phase
N: Nematic Phase
I: Isotropic Phase

The polarizing elements in Examples 3 and 4 utilized no polyfunctional monomer in the dichronic dye composition. It was possible to align those polarizing elements uniformly on the photo-alignment films, as shown in Examples 3 and 4. Thus, the polarizing elements do not cause light leakage due to rubbing. As a result, according to the present invention, it is possible to produce polarizing elements high in contrast.

This non-provisional application claims priority under 35 U.S.C. §119 (a) on Patent Application No. 2008-304985 filed in Japan on Nov. 28, 2008, which is entirely herein incorporated by reference.

Having described our invention as related to the present embodiments, it is our intention that the invention not be limited by any of the details of the description, unless otherwise specified, but rather be construed broadly within its spirit and scope as set out in the accompanying claims.

What we claim is:

1. A polarizing element, comprising:
   a transparent support;
   a light absorption anisotropic layer formed of a dichroic dye composition; and
   a transparent resin cured layer formed of a composition containing a disk-like liquid crystalline compound,
   with the light absorption anisotropic layer and the transparent resin cured layer being laminated in this order on the transparent support, and
   with the dichroic dye composition containing at least one dichroic dye which is represented by formula (I) and which has nematic mesomorphism, but containing no liquid crystalline achromatic compound:

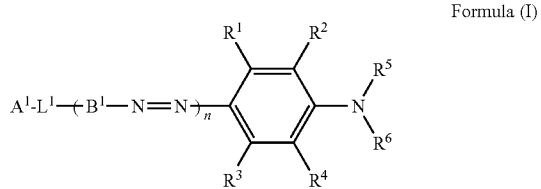

Formula (I)

wherein $R^1$, $R^2$, $R^3$, and $R^4$ each independently represent a hydrogen atom or a substituent; $R^5$ and $R^6$ each independently represent a hydrogen atom or an alkyl group which may have a substituent; $L^1$ represents —N=N—, —CH=N—, —N=CH—, —C(=O)O—, —OC(=O)— or —CH=CH—; $A^1$ represents a phenyl group, a naphthyl group or an aromatic heterocyclic group, each of which may have a substituent; $B^1$ represents a divalent aromatic hydrocarbon group or a divalent aromatic heterocyclic group, each of which may have a substituent; and n denotes an integer from 1 to 5, in which when n is 2 or more, plural $B^1$s may be the same or different from each other.

2. The polarizing element according to claim 1, wherein the at least one dichroic dye which is represented by formula (I) and which has nematic mesomorphism is an azo dye represented by formula (Ia):

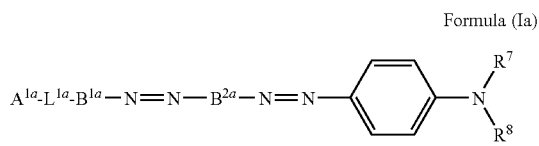

Formula (Ia)

wherein $R^7$ and $R^8$ each independently represent a hydrogen atom, a methyl group or an ethyl group; $L^{1a}$ represents —N=N—, —CH=N—, —N=CH—, —C(=O)O—, —OC(=O)— or —CH=CH—; $A^{1a}$ represents a group represented by formula (IIa) or (IIIa); $B^{1a}$ and $B^{2a}$ each independently represent a group represented by any one of formulae (IVa), (Va) and (VIa):

(IIa)

(IIIa)

wherein $R^9$ represents a substituted or unsubstituted alkyl group, a substituted or unsubstituted aryl group, a substituted or unsubstituted alkoxy group, a substituted or unsubstituted alkyl- or aryl-oxycarbonyl group, or a substituted or unsubstituted acyloxy group:

(IVa)

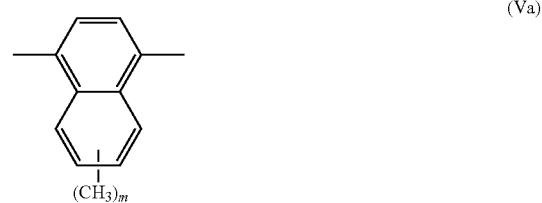

(Va)

(VIa)

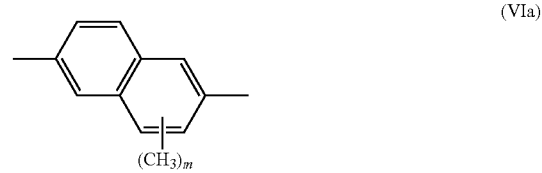

wherein m represents an integer of 0 to 2.

3. The polarizing element according to claim 1, wherein the at least one dichroic dye which is represented by formula (I) and which has nematic mesomorphism is an azo dye represented by formula (Ib):

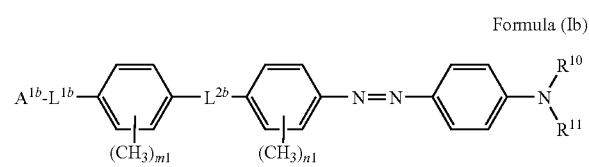

Formula (Ib)

wherein $R^{10}$ and $R^{11}$ each independently represent a hydrogen atom, a methyl group or an ethyl group; $L^{1b}$ represents —N=N— or —C(=O)O—; $L^{2b}$ represents —CH=N—, N=CH—, —C(=O)O— or —OC(=O)—; $A^{1b}$ represents a group represented by formula (IIa) or (IIIa); and m1 and n1 each independently represent an integer of 0 to 2:

(IIa)

-continued

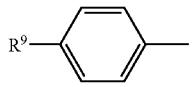

(IIIa)

wherein R⁹ represents a substituted or unsubstituted alkyl group, a substituted or unsubstituted aryl group, a substituted or unsubstituted alkoxy group, a substituted or unsubstituted alkyl- or aryl-oxycarbonyl group, or a substituted or unsubstituted acyloxy group.

4. The polarizing element according to claim 1, wherein the at least one dichroic dye which is represented by formula (I) and which has nematic mesomorphism is an azo dye represented by formula (Ic):

Formula (Ic)

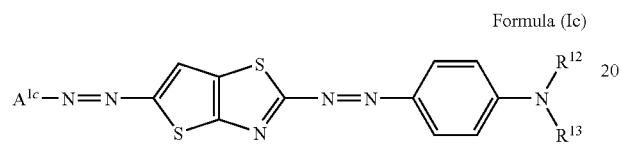

wherein $R^{12}$ and $R^{13}$ each independently represent a hydrogen atom, a methyl group or an ethyl group; and $A^{1c}$ represents a group represented by formula (IIa) or (IIIa):

(IIa)

(IIIa)

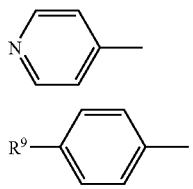

wherein R⁹ represents a substituted or unsubstituted alkyl group, a substituted or unsubstituted aryl group, a substituted or unsubstituted alkoxy group, a substituted or unsubstituted alkyl- or aryl-oxycarbonyl group, or a substituted or unsubstituted acyloxy group.

5. The polarizing element according to claim 1, wherein the transparent resin cured layer has a layer thickness of 1 μm to 30 μm.

6. The polarizing element according to claim 1, wherein the transparent resin cured layer has an optically negative refractive index anisotropy, and an in-plane retardation value (Re) of 10 nm or less and a retardation value (Rth) of 100 nm to 300 nm in the direction of the thickness for the visible light.

7. The polarizing element according to claim 1, comprising an oxygen-shielding layer formed of a composition containing a polyvinyl alcohol as its major component, between the light absorption anisotropic layer and the transparent resin cured layer.

8. A liquid crystal display device, having the polarizing element according to claim 1.

9. A method of producing the polarizing element according to claim 1, which comprises the steps of:
    (1) rubbing or irradiating with light the transparent support or an alignment film formed on the transparent support;
    (2) applying the dichroic dye composition dissolved in an organic solvent, to the transparent support or the alignment film rubbed or irradiated with light, the dichroic dye composition containing at least one dichroic dye which is represented by formula (I) and which has nematic mesomorphism, but containing no liquid crystalline achromatic compound:

Formula (I)

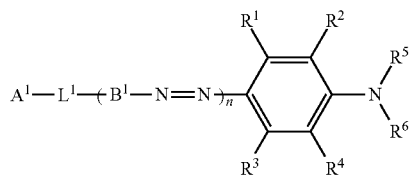

wherein $R^1$, $R^2$, $R^3$, and $R^4$ each independently represent a hydrogen atom or a substituent; $R^5$ and $R^6$ each independently represent a hydrogen atom or an alkyl group which may have a substituent; $L^1$ represents —N=N—, —CH=N—, —N=CH—, —C(=O)O—, —OC(=O)— or —CH=CH—; $A^1$ represents a phenyl group, a naphthyl group or an aromatic heterocyclic group, each of which may have a substituent; $B^1$ represents a divalent aromatic hydrocarbon group or a divalent aromatic heterocyclic group, each of which may have a substituent; and n denotes an integer from 1 to 5, in which when n is 2 or more, plural $B^1$s may be the same or different from each other;
    (3) vaporizing the organic solvent to align the dichroic dye composition, thereby forming said light absorption anisotropic layer; and
    (4) applying the curable transparent resin composition containing the disk-like liquid crystalline compound to the surface of said light absorption anisotropic layer or an oxygen-shielding layer formed of a composition containing a polyvinyl alcohol as its major component on said light absorption anisotropic layer, followed by curing.

10. The method of producing the polarizing element according to claim 9, wherein the dichroic dye represented by the formula (I) and having nematic mesomorphism has a polymerizable group and/or the dichroic dye composition contains the polyfunctional monomer having a polymerizable group, and the method further comprising the step of: (5) polymerizing the polymerizable groups in the dichroic dye composition by means of light or heat, to fix alignment, after the step (3) and before the step (4).

11. The polarizing element according to claim 1, comprising an alignment film between the transparent support and the light absorption anisotropic layer.

12. The polarizing element according to claim 11, wherein the alignment film is a photo-alignment film.

13. The polarizing element according to claim 1, wherein the dichroic dye represented by the formula (I) and having nematic mesomorphism has a polymerizable group and/or the dichroic dye composition contains the polyfunctional monomer having a polymerizable group.

* * * * *